(12) United States Patent
Teraoka

(10) Patent No.: US 8,619,375 B2
(45) Date of Patent: Dec. 31, 2013

(54) IMAGE PICKUP LENS

(75) Inventor: Hiroyuki Teraoka, Kyoto (JP)

(73) Assignees: AAC Technologies Japan R&D Center, Kyoto (JP); AAC Acoustic Technologies (Shenzhen) Co., Ltd., Shenzhen (CN)

( * ) Notice: Subject to any disclaimer, the term of this patent is extended or adjusted under 35 U.S.C. 154(b) by 35 days.

(21) Appl. No.: 13/341,811

(22) Filed: Dec. 30, 2011

(65) Prior Publication Data
US 2012/0194925 A1    Aug. 2, 2012

(30) Foreign Application Priority Data

Jan. 31, 2011  (JP) ................................. 2011-018801

(51) Int. Cl.
*G02B 9/34*    (2006.01)
(52) U.S. Cl.
USPC .......................................... 359/773; 359/715

(58) Field of Classification Search
USPC .................. 359/773, 772, 766, 764, 715, 757
See application file for complete search history.

(56) References Cited

U.S. PATENT DOCUMENTS

| | | | |
|---|---|---|---|
| 8,199,418 B2 * | 6/2012 | Chen et al. | 359/773 |
| 2009/0009889 A1 * | 1/2009 | Teraoka et al. | 359/773 |

* cited by examiner

*Primary Examiner* — Zachary Wilkes
(74) *Attorney, Agent, or Firm* — Anova Law Group, PLLC

(57) ABSTRACT

An image pickup lens includes, in sequence from an object side to an image side, an aperture stop; a first lens having two convex surfaces and having a positive refractive power; a second lens in a meniscus shape whose convex surface faces to the object side having a negative refractive power; a third lens in a meniscus shape with the convex surface facing to the image side having a positive refractive power; a fourth lens in a meniscus shape with the convex surface facing to the object side having a negative refractive power. Predefined conditions are satisfied.

5 Claims, 35 Drawing Sheets

IMAGE PICKUP LENS

FIELD OF THE INVENTION

The present invention relates to a small-sized image pickup lens, which employs a solid-state image pickup element such as a CCD type image sensor or a CMOS type image high-resolution sensor, used in optical sensors, such as camera modules for mobile phones, WEB cameras, having good optical performance of various aberrations correction, wide angle, high brightness. More particularly, the image pickup lens has four lenses each having Fno<2.6, wherein, Fno (focal ratio number) represents brightness of the lens.

DESCRIPTION OF RELATED ART

In recent years, image pickup apparatuses employing solid-state image pickup elements such as CCD (Charge Coupled Device) type image sensors or CMOS (Complementary Metal Oxide Semiconductor) type image sensors have been downsized, and mobile information terminals such as cell-phones equipped with these information pickup apparatuses have come into wide use. Miniaturization of these imaging devices with higher performance and good optical characteristics are required, which also requires the image lens used therein to be downsized. On the other hand, the image pickup lens to be installed in the image pickup apparatus is not only requested to be further smaller but also is requested increasingly to have higher performance, being affected by the trend of higher number of pixels of the image pickup element.

A traditional image pickup lens consists of two lens with a single configuration, which is lighter and smaller. However, optical performance of the two-piece lens is restricted by the lenses used therein. The image lens with two lenses has poor ability of aberration correction. Generally, as known, for obtaining higher performance and good optical characters, an image lens with three lenses are widely used.

As an image pickup lens related to this application, there is disclosed a three-piece image pickup lens wherein a meniscus-shaped positive first lens whose convex surface faces the object side, a meniscus-shaped positive second lens whose convex surface faces the image side and a negative third lens whose concave surface faces the image side are provided in this order from the object side, as one that is capable of having higher performance than that of a one-element or two-element-lens and is not affected by downsizing. However, the image pickup lens described above uses a meniscus-shaped negative third lens whose convex surface faces the image side. Therefore, a peripheral part of the third lens swells toward the image side. It causes that a position of the lens surface on the optical axis recedes greatly from the image pickup element, when the third lens is arranged not to touch a substrate arranged on the rear side. Thus, a back focus cannot be made small and it leaves room for further improvement in downsizing. Further, aberration correction is not sufficient.

JP Patent Publication No. 2009-169005 discloses an image pickup lens having four lenses. However, distributions of the refractive power of the first lens and the second lens are not sufficient, which cannot enable sufficient wide angle and miniature. Further, the brightness Fno=2.8~3.6 is not sufficient.

JP Patent Publication No. 2010-191417 discloses another image pickup lens having four lenses and is configured to be full visual angle, i.e., (2ω)>70°. However, distributions of the refractive power of the first lens and the second lens are not sufficient, which cannot enable sufficient miniature. Further, the brightness Fno=2.69 is not sufficient.

So, it is necessary to provide a new vibrator for solving the problem mentioned above.

DETAILED DESCRIPTION OF THE EXEMPLARY EMBODIMENTS

Reference will now be made to describe the exemplary embodiments of the present invention in detail.

Figure 1:
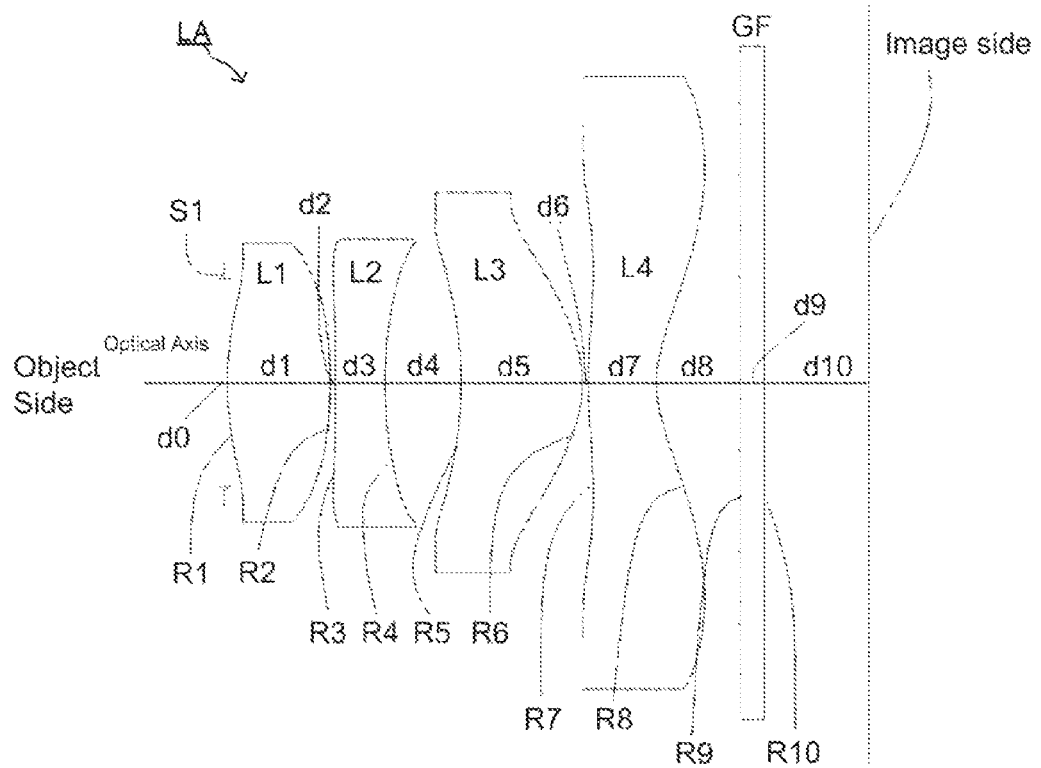
FIG. 1 is an illustration view of an image pickup lens in accordance with the present disclosure.

Referring to FIG. 1, an image pickup lens LA in accordance with the present disclosure includes, in sequence from an object side to an image side, an aperture stop S1, a first lens L1, a second lens L2, a third lens L3, and a fourth lens L4. A glass plate GF is arranged between the fourth lens L4 and the image side. The glass plate GF could be a glass sheet, or an IR filter or optical low-pass filter. Be noted that the glass plate GF is optionally arranged between the fourth lens L4 and the image side, and it can be also arranged at other positions.

The aperture stop S1 is arranged at a position closer to the object side than the first lens L1, which makes the entrance pupil a position far away from the image side. Thus, the high telecentric character is ensured, and further the incidence angle relative to the image side is accordingly ensured.

The first lens L1 has two convex surfaces and has a positive refractive power. The second lens L2 in a meniscus shape whose convex surface faces to the object side has a negative refractive power. The third lens L3 in a meniscus shape with the convex surface facing to the image side has a positive refractive power. The fourth lens L4 in a meniscus shape with the convex surface facing to the object side has a negative refractive power. For enabling the image pickup lens LA more miniature, the refractive powers are configured as a telephoto type (the refractive powers are configured in the sequence of positive, negative, positive, negative.) further, in order to correct the aberration more effectively, the lenses may be configured to have aspherical surfaces.

The following conditions (1)~(5) are satisfied:

$$0.70 \leq f1/f \leq 1.05 \tag{1}$$

$$-1.80 \leq f2/f \leq -1.20 \tag{2}$$

$$-0.70 \leq R1/R2 \leq -0.17 \tag{3}$$

$$4.00 \leq R3/R4 \leq 70.00 \tag{4}$$

$$0.10 \leq d4/f \leq 0.20 \tag{5 where}$$

f is the focal length of the entire lens;
f1 is the focal length of the first lens L1;
f2 is the focal length of the second lens L2;
R1 is the curvature radius of the object side surface of the first lens L1;
R2 is the curvature radius of the image side surface of the first lens L1;
R3 is the curvature radius of the object side surface of the second lens L2;
R4 is the curvature radius of the image side surface of the second lens L2;
d4 is the distance along the optical axis between the image side of the second lens L2 and the object side of the third lens L3.

Condition (1) defines the range of the positive refractive power of the first lens L1. The range disclosed above is appropriate for aberration correction and miniature configuration. If the numerical value exceeds the lower limit, the positive refractive power of the first lens L1 is too powerful to correct aberration and to achieve wide angle. If the numerical value exceeds the upper limit, the positive refractive power of the first lens L1 is too weak to achieve miniature configuration.

Condition (2) defines the range of the negative refractive power of the second lens L2. The range disclosed above is appropriate for aberration correction. If the numerical value exceeds the lower limit, the negative refractive power of the second lens L2 is too weak to correct aberration. If the numerical value exceeds the upper limit, the negative refractive power of the second lens L2 is too powerful to correct aberration.

Condition (3) defines the curvature radiuses of the two convex surfaces of the first lens L1. Beyond the range of condition (3), it is difficult to correct the aberration with the lens having brightness Fno<2.6 when the lens is trending toward miniaturization and wide angle.

Condition (4) defines the curvature radiuses of the object side surface and image side surface of the second lens L2 in a meniscus shape with the convex surface facing the object side. Beyond the range of condition (4), it is difficult to control the refractive power of the second lens L2 and difficult to correct the aberration sufficiently with the lens having brightness Fno<2.6 when the lens is trending toward miniaturization and wide angle.

Condition (5) defines the distance along the optical axis between the image side surface of the second lens L2 and the object side surface of the third lens L3 according to the focal length of the entire lens. If the numerical value exceeds the lower limit, it is good for aberration correction, but it increases the manufacturing difficulty as the distance between the image side surface of the second lens L2 and the object side surface of the third lens L3 is too short. If the numerical value exceeds the upper limit, it is difficult to correct aberration.

The first lens L1 and the third lens L3 corporately share the responsibility of the positive refractive power of the entire lens. In order to achieve miniaturization, the positive refractive power of the first lens should be more powerful. However, if the positive refractive power of the first lens is too much powerful, it will be difficult to correct the aberration and achieve miniaturization. Therefore, the positive refractive power of the third lens L3 should be controlled for limiting the positive refractive power of the first lens L1. For the third lens L3, the following condition (6) is satisfied:

$$0.50 \leq f3/f \leq 0.70 \tag{6 where}$$

f is the focal length of the entire lens;
f3 is the focal length of the third lens L3.

Condition (6) defines the positive refractive power of the third lens L3. If the numerical value exceed the lower limit, the positive refractive power of the third lens L3 is too powerful and will produce serious aberration which leads in axis eccentricity of the third lens L3, further leads in image variation. If the numerical value exceeds the upper limit, the positive refractive power of the third lens L3 is too weak to achieve miniaturization.

The second lens L2 and the fourth lens L4 corporately share the responsibility of the negative refractive power of the entire lens. It is good to aberration correction by make the negative refractive power of the second lens L2 more powerful. However, if the negative refractive power of the second lens L2 is too powerful, it will produce serious aberration which leads in axis eccentricity of the second lens L2, further leads in image variation. Therefore, the negative refractive power of the fourth lens L4 should be controlled for limiting the negative refractive power of the second lens L2. For the fourth lens L4, the following condition (7) is satisfied:

$$-0.90 \leq f4/f \leq -0.50 \tag{7 where}$$

f is the focal length of the entire lens;
f4 is the focal length of the fourth lens L4.

If the numerical value exceeds the lower limit of the condition (7), the negative refractive power of the fourth lens L4 is too weak and it will be difficult to correct aberration. If the numerical value exceeds the upper limit, it will produce serious aberration which leads in axis eccentricity of the fourth lens L4, further leads in image variation.

In addition, the image pickup lens LA should satisfy the following conditions (8)-(9):

$$2.00 \leq R5/R6 \leq 4.20 \tag{8}$$

$$2.00 \leq R7/R8 \leq 13.00 \tag{9 where}$$

R5 is the curvature radius of the object side surface of the third lens L3;
R6 is the curvature radius of the image side surface of the third lens L3;
R7 is the curvature radius of the object side surface of the fourth lens L4;
R8 is the curvature radius of the image side surface of the fourth lens L4.

Condition (8) defines the curvature radiuses of the object side surface and image side surface of the third lens L3 in a meniscus shape with the convex surface facing the image side. Beyond the range of condition (8), it is difficult to control the refractive power of the third lens L3 and difficult to correct the aberration sufficiently with the lens having brightness Fno<2.6 when the lens is trending toward miniaturization and wide angle.

Condition (9) defines the curvature radiuses of the object side surface and image side surface of the fourth lens L4 in a meniscus shape with the convex surface facing the object side. Beyond the range of condition (9), it is difficult to control the refractive power of the fourth lens L4 and difficult to correct the aberration sufficiently with the lens having brightness Fno<2.6 when the lens is trending toward miniaturization and wide angle.

As the image pickup lens LA includes the lenses mentioned above and satisfying the conditions described above, the image pickup lens LA can be configured to have the characters of wide angle, miniaturization, and to have the brightness Fno<2.6.

The lenses are made of glass or resin. When glass is used as the material of the lenses, glass with transformation temperature below 400° C. is preferred for enhancing the durability of the manufacturing tools.

Resin is used to effectively manufacture lens with complicated surface shape. Regarding manufacturing efficiency, resin is better than glass. When resin is used as the material of the lenses, thermoplastic or thermosetting resin could be used, as long as the index of refraction of the resin is 1.500~1.670 (measured by ASTM D542 Standard Test Method for Index of Refraction of Transparent Organic Plastics), and the transmition of light with wavelength 450 nm~600 nm is above 80%, preferred above 85%. The first lens L1, the third lens L3, and the fourth lens L4 could be made from the same resins, or different resins. Generally, the second lens L2 is made from resin different from the first lens L1. The lenses are made by injection molding, compression molding, pour molding, transfer molding, or other public known methods.

Be noted that the index of refraction would vary according to the change of the environment temperature, as known. In order to restrict the variation of the index of refraction, transparent resin containing particles with average diameter below 100 nm, such as particles of $SiO_2$, $NbO_5$, $TiO_2$, $Al_2O_3$ with diameter below 50 nm.

The lens made from resin may defines an edge portion and a rib at the periphery thereof. The thickness of the edge portion is preferred 70%~130% of the thickness of the periphery of the lens. In order to avoid double image or flash, a light transmitting mask could be arranged between the lenses.

Before used in the camera modules, the lenses may be treated by public skills for forming reflection reducing film, anti-IR film. The lenses may also be treated by surface hardening. The image pickup lens may be applied in cameras of mobile phones, web cameras, personal computers, digital cameras, motor bikes, monitors, or other optical sensors.

Specific embodiments will be described as follows. The unit of the distance, radius, or thickness is millimeter. Parameters cited in conditions or descriptions are defined as follows:

F: the focal length of the entire lens;
f1: the focal length of the first lens L1;
f2: the focal length of the second lens L2;
f3: the focal length of the third lens L3;
f4: the focal length of the fourth lens L4;
Fno: the brightness of the lens
2ω: full visual angle
S1: aperture stop
R: curvature radius of optical surface, center curvature radius of lens
R1: the curvature radius of the object side surface of the first lens L1;
R2: the curvature radius of the image side surface of the first lens L1;
R3: the curvature radius of the object side surface of the second lens L2'
R4: the curvature radius of the image side surface of the second lens L2;
R5: the curvature radius of the object side surface of the third lens L3;
R6: the curvature radius of the image side surface of the third lens L3;
R7: the curvature radius of the object side surface of the fourth lens L4;
R8: the curvature radius of the image side surface of the fourth lens L4;
R9: the curvature radius of the object side surface of the glass plate;
R10: the curvature radius of the image side surface of the glass plate;
d: center thickness of the lens, or distance between two lenses;
d0: the distance between the aperture stop S1 and the object side surface of the first lens L1;
d1: the center thickness of the first lens L1;
d2: the distance between the image side surface of the first lens L1 and the object side surface of the second lens L2;
d3: the center thickness of the second lens L2;
d4: the distance between the image side surface of the second lens L2 and the object side surface of the third lens L3;
d5: the center thickness of the third lens L3;
d6: the distance between the image side surface of the third lens L3 and the object side surface of the fourth lens L4;
d7: the center thickness of the fourth lens L4;
d8: the distance between the image side surface of the fourth lens L4 and the object side surface of the glass plate GF;
d9: the center thickness of the glass plate GF;
d10: the distance between the image side surface of the glass plate GF and the image side.
nd: index of refraction (d-line refractive index)
n1: the d-line index of refraction of the first lens L1;
n2: the d-line index of refraction of the second lens L2;
n3: the d-line index of refraction of the third lens L3;
n4: the d-line index of refraction of the fourth lens L4;
n5: the d-line index of refraction of the glass plate GF;
vd: the abbe coefficient of d-line;
v1: the abbe coefficient of the first lens L1;
v2: the abbe coefficient of the second lens L2;
v3: the abbe coefficient of the third lens L3;
v4: the abbe coefficient of the fourth lens L4;
v5: the abbe coefficient of the glass plate GF;
TTL: the distance between the aperture stop and the image side (optical length);
LB: the distance between the image side surface of the fourth lens L4 and the image side (including the thickness of the glass plate);
IH: the image height.

All the lenses are configured to have aspherical surfaces. y is the optical axis (positive direction) along which the light moves, and x the axis perpendicular to the optical axis. The aspherical surface of the lens is expressed by the following multinomial:

$$y=(x^2/R)/[1+\{1-(K+1)(x^2/R^2)\}^{1/2}]+A4x^4+A6x^6+A8x^8+A10x^{10}+A12x^{12}+A14x^{14}+A16x^{16} \quad (10)$$

where, R is the curvature radius near the optical axis, k is the conic coefficient, A4, A6, A8, A10, A12, A14, A16 are the aspherical coefficients.

The First Embodiment

Figure 2:
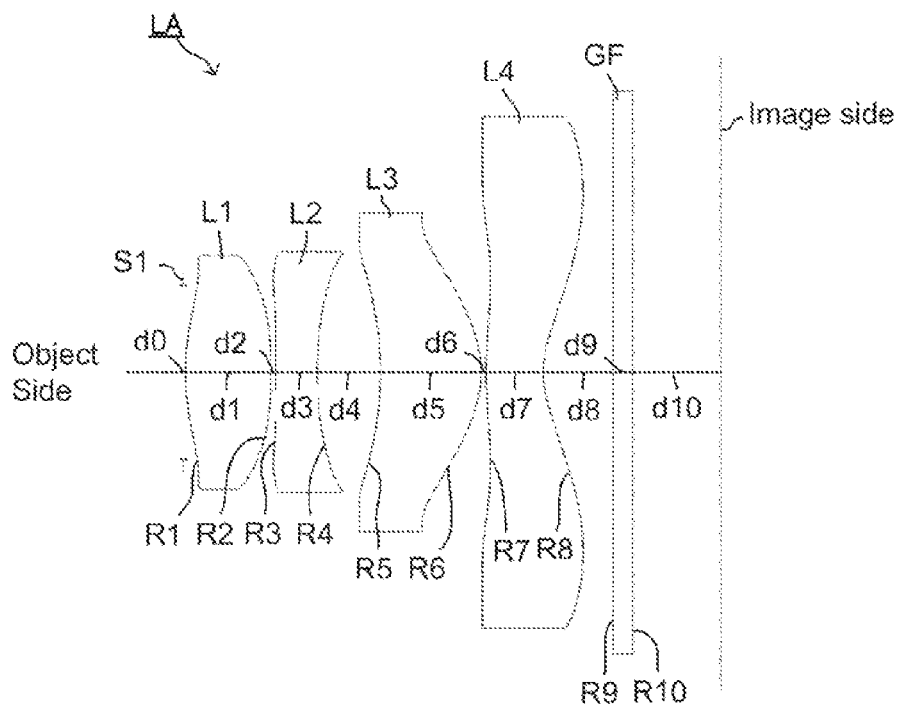
FIG. 2 is an illustration view of an image pickup lens of a first embodiment.

FIG. 2 is an illustration of the image pickup lens in accordance with a first embodiment of the present disclosure. Table 1 shows the curvature radiuses R of the object side surfaces and image side surfaces of the lenses L1~L4, center thickness of the lenses or distance d between lenses, index of refraction nd, the abbe coefficients vd. Table 2 shows the conic coefficients and aspherical coefficients.

TABLE 1

| | R | d | | nd | | vd |
|---|---|---|---|---|---|---|
| S1 | ∞ | d0 = 0.020 | | | | |
| R1 | 1.867 | d1 = 0.615 | n1 | 1.544 | v1 | 56.1 |
| R2 | −2.978 | d2 = 0.030 | | | | |
| R3 | 51.651 | d3 = 0.300 | n2 | 1.640 | v2 | 23.4 |
| R4 | 2.583 | d4 = 0.455 | | | | |
| R5 | −2.269 | d5 = 0.725 | n3 | 1.544 | v3 | 56.1 |
| R6 | −0.725 | d6 = 0.035 | | | | |
| R7 | 3.138 | d7 = 0.410 | n4 | 1.544 | v4 | 56.1 |
| R8 | 0.673 | d8 = 0.500 | | | | |
| R9 | ∞ | d9 = 0.145 | n5 | 1.517 | v5 | 64.17 |
| R10 | ∞ | d10 = 0.629 | | | | |

TABLE 2

| | k | A4 | A6 | A8 | A10 | A12 | A14 | A16 |
|---|---|---|---|---|---|---|---|---|
| R1 | −3.6745E+00 | −2.4523E−02 | 8.8203E−02 | −7.6605E−01 | 7.4333E−01 | 3.3644E−02 | −4.8384E+00 | 7.3137E+00 |
| R2 | 1.1089E+01 | −1.5259E−01 | −1.9989E−01 | 4.8719E−01 | −2.9586E−01 | −9.2789E−03 | 1.7890E+00 | −1.9543E+00 |
| R3 | −7.6833E+02 | −1.2918E−01 | −2.3243E−01 | 3.6201E−01 | 1.0896E+00 | −2.3789E−01 | −1.5081E+00 | 5.5670E−01 |
| R4 | 3.5371E+00 | 9.2791E−03 | −7.9680E−02 | −4.2007E−05 | 4.7837E−02 | 3.3793E−01 | 5.2252E−01 | −7.6758E−01 |
| R5 | −2.0615E+00 | 2.0818E−02 | −4.1388E−02 | 4.3272E−02 | −3.9451E−02 | 1.2096E−02 | 6.9387E−02 | 1.3259E−02 |
| R6 | −3.9912E+00 | −1.6647E−01 | 1.0374E−01 | 1.3379E−02 | 1.1647E−02 | 1.1941E−02 | 3.4965E−03 | −8.9284E−03 |
| R7 | −2.3473E+01 | −1.6618E−01 | 5.3734E−02 | 1.0664E−02 | −4.6021E−03 | −3.5124E−05 | −1.6275E−04 | 5.7104E−05 |
| R8 | −5.5986E+00 | −1.1889E−01 | 5.2258E−02 | −1.6480E−02 | 2.1110E−03 | 8.9110E−05 | 2.4541E−05 | −1.6062E−05 |

Figure 3:
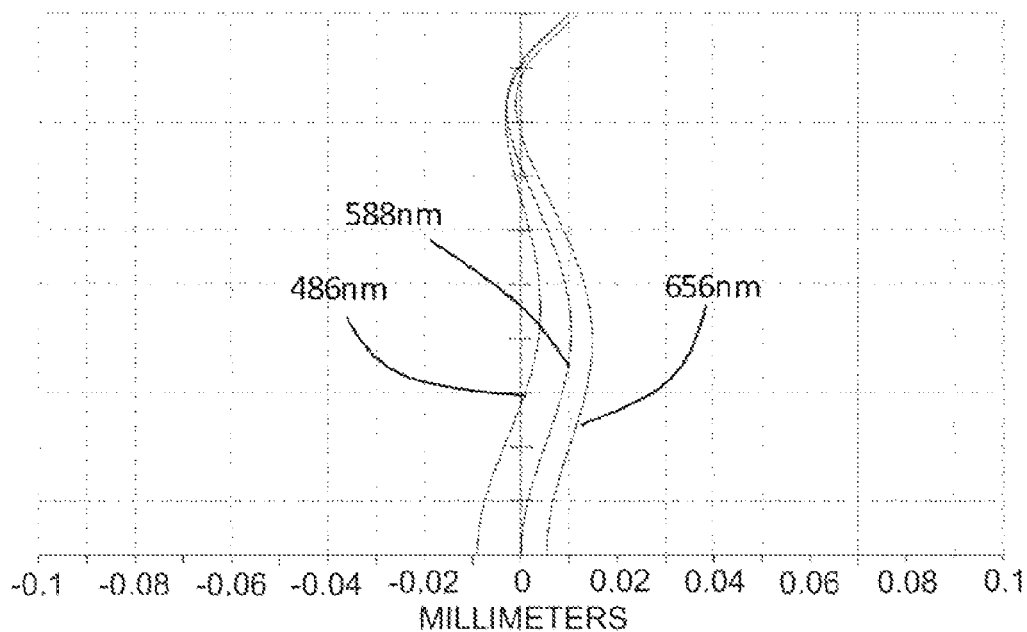
FIG. 3 is a spherical aberration diagram (Axial Chromatic Aberration) of the image pickup lens of the first embodiment.
Figure 4:
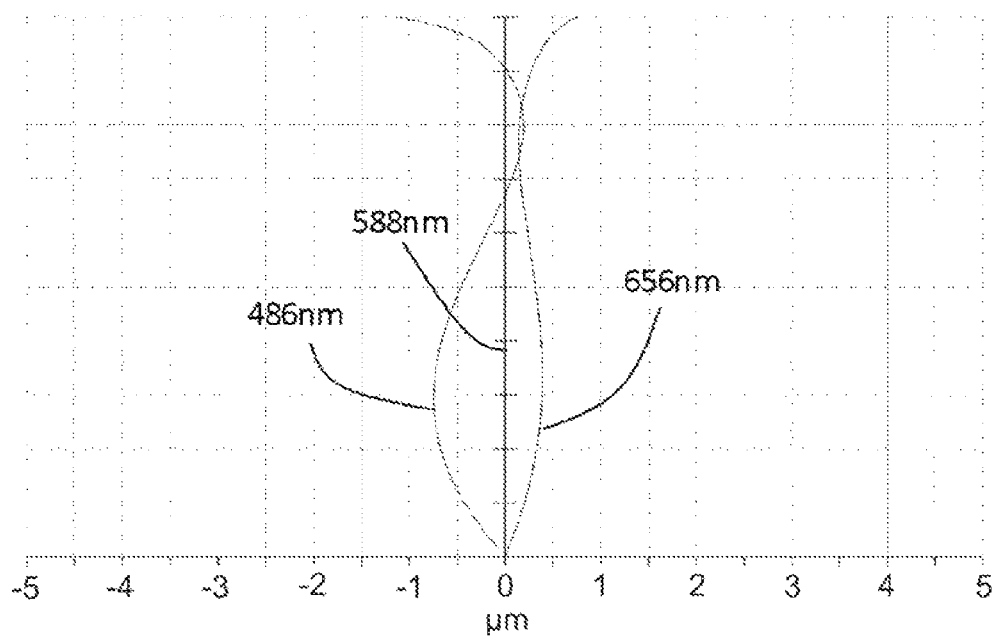
FIG. 4 is a magnification chromatic aberration diagram of the image pickup lens of the first embodiment.
Figure 5:
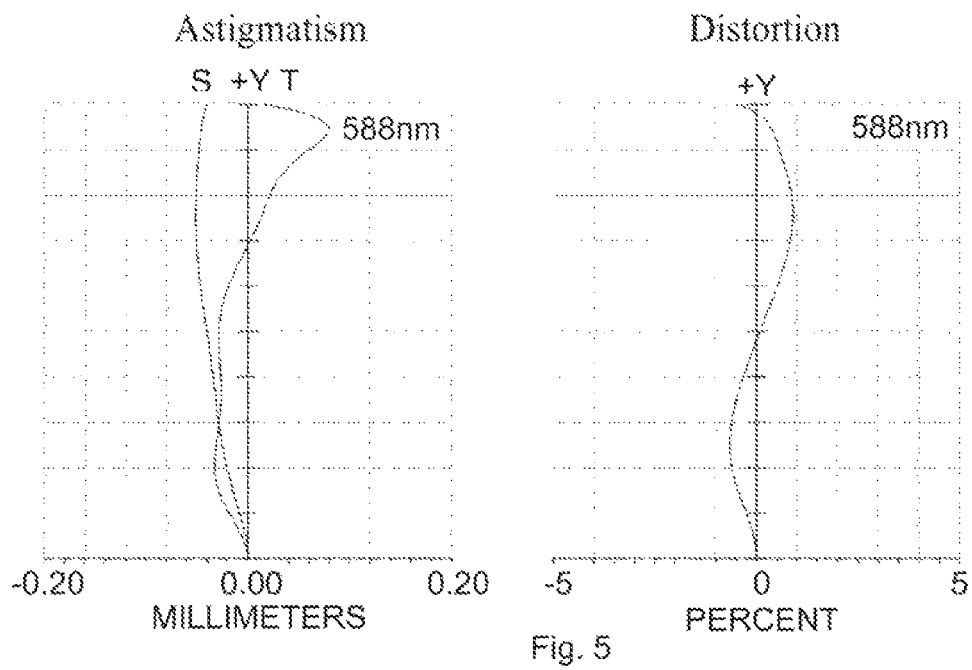
FIG. 5 is an aberration diagram of astigmatism and distortion of the image pickup lens of the first embodiment.

The image pickup lens in the first embodiment, as shown in Table 35, satisfies conditions (1)~(9). Spherical aberration of the image pickup lens LA in the first embodiment is shown in FIG. 3, and the magnification chromatism is shown in FIG. 4. Aberration of astigmatism and distortion of the image pickup lens LA is shown in FIG. 5. According to the figures and table above, the image pickup lens LA in the first embodiment has the characters: 2ω=74.9°, TTL=3.864 mm, which achieves wide angle and miniaturization. Further, the brightness thereof is lower than 2.6, i.e., Fno=2.4. According to FIGS. 3~5, the image pickup lens in the first embodiment has very good optical performance. In addition, in FIG. 5, S of the astigmatism aberration is relative to the sagittal image side, and T is relative to the tangential side surface. The same definitions are reflected on the second through seventeenth embodiments.

Second Embodiment

Figure 6:
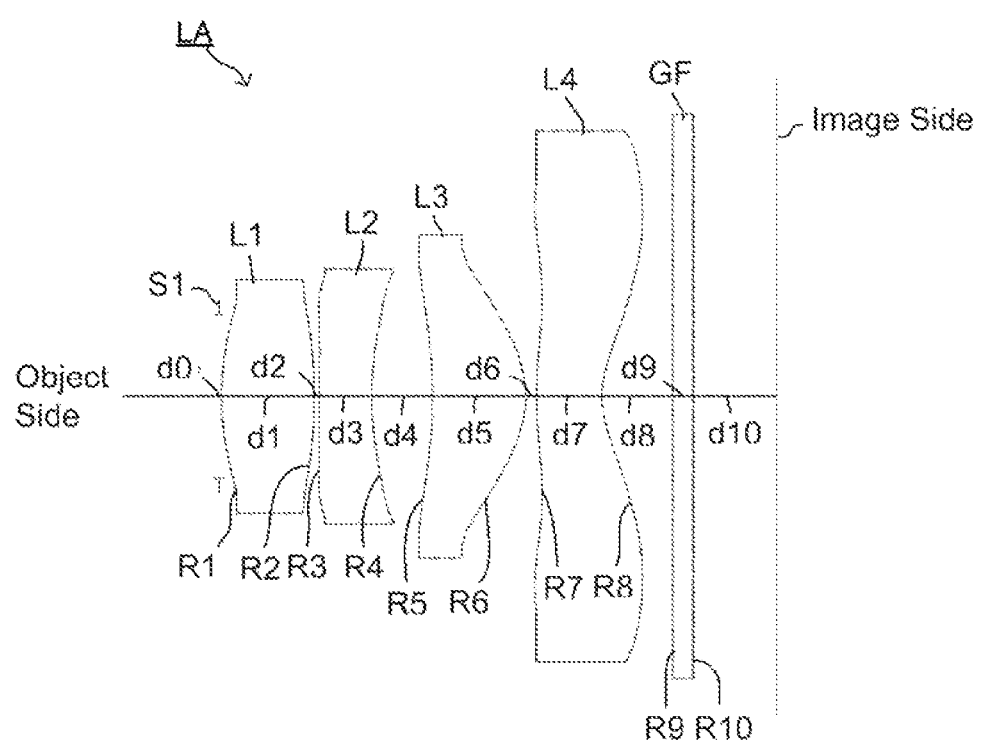
FIG. 6 is an illustration view of an image pickup lens of a second embodiment.

FIG. 6 is an illustration of the image pickup lens in accordance with a second embodiment of the present disclosure. Table 3 shows the curvature radiuses R of the object side surfaces and image side surfaces of the lenses L1~L4, center thickness of the lenses or distance d between lenses, index of refraction nd, the abbe coefficients vd. Table 4 shows the conic coefficients and aspherical coefficients.

TABLE 3

| | R | d | | nd | | vd |
|---|---|---|---|---|---|---|
| S1 | ∞ | d0 = 0.020 | | | | |
| R1 | 2.096 | d1 = 0.650 | n1 | 1.544 | v1 | 56.1 |
| R2 | −5.250 | d2 = 0.040 | | | | |
| R3 | 13.767 | d3 = 0.370 | n2 | 1.640 | v2 | 23.4 |
| R4 | 2.518 | d4 = 0.430 | | | | |
| R5 | −2.981 | d5 = 0.660 | n3 | 1.544 | v3 | 56.1 |
| R6 | −0.717 | d6 = 0.075 | | | | |

TABLE 3-continued

| | R | d | | nd | | vd |
|---|---|---|---|---|---|---|
| R7 | 2.832 | d7 = 0.465 | n4 | 1.544 | v4 | 56.1 |
| R8 | 0.675 | d8 = 0.500 | | | | |
| R9 | ∞ | d9 = 0.145 | n5 | 1.517 | v5 | 64.17 |
| R10 | ∞ | d10 = 0.586 | | | | |

TABLE 4

| | k | A4 | A6 | A8 | A10 | A12 | A14 | A16 |
|---|---|---|---|---|---|---|---|---|
| R1 | −1.4447E+00 | −4.2884E−03 | 3.8343E−02 | −6.2403E−01 | 1.2187E+00 | 8.7645E−01 | −4.5355E+00 | 2.8189E+00 |
| R2 | 1.1460E+01 | −1.3824E−01 | −9.5634E−02 | 5.6105E−01 | −1.4783E−01 | 1.0340E−01 | 1.6543E+00 | −2.9281E+00 |
| R3 | −1.8151E+01 | −1.3423E−01 | −2.3159E−01 | 3.9918E−01 | 1.0532E+00 | −2.7335E−01 | −1.5041E+00 | 5.5853E−01 |
| R4 | 7.1772E−01 | −1.8234E−02 | −9.9613E−02 | −1.7860E−02 | −1.4203E−03 | 2.0858E−01 | 4.3691E−01 | −5.1279E−01 |
| R5 | −1.1317E+01 | 5.3441E−02 | −3.4429E−02 | 3.3489E−02 | −4.9122E−02 | 1.5157E−03 | 5.2307E−02 | −1.7465E−02 |
| R6 | −3.8323E+00 | −1.7721E−01 | 9.8785E−02 | 1.3286E−02 | 1.2778E−02 | 1.2366E−02 | 3.6977E−03 | −8.4847E−03 |
| R7 | −2.0212E+01 | −1.6613E−01 | 5.3326E−02 | 1.0772E−02 | −4.4467E−03 | 1.3039E−05 | −1.6398E−04 | 4.5711E−05 |
| R8 | −5.5844E+00 | −1.2070E−01 | 5.2785E−02 | −1.6247E−02 | 2.1170E−03 | 8.7221E−05 | 2.4998E−05 | −1.5374E−05 |

Figure 7:
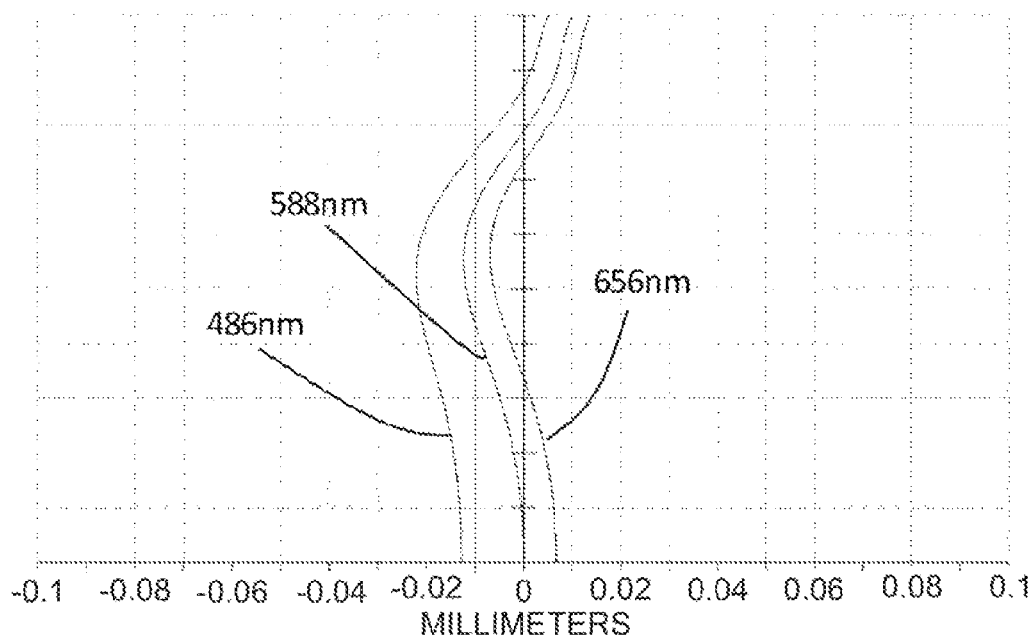
FIG. 7 is a spherical aberration diagram (Axial Chromatic Aberration) of the image pickup lens of the second embodiment.
Figure 8:
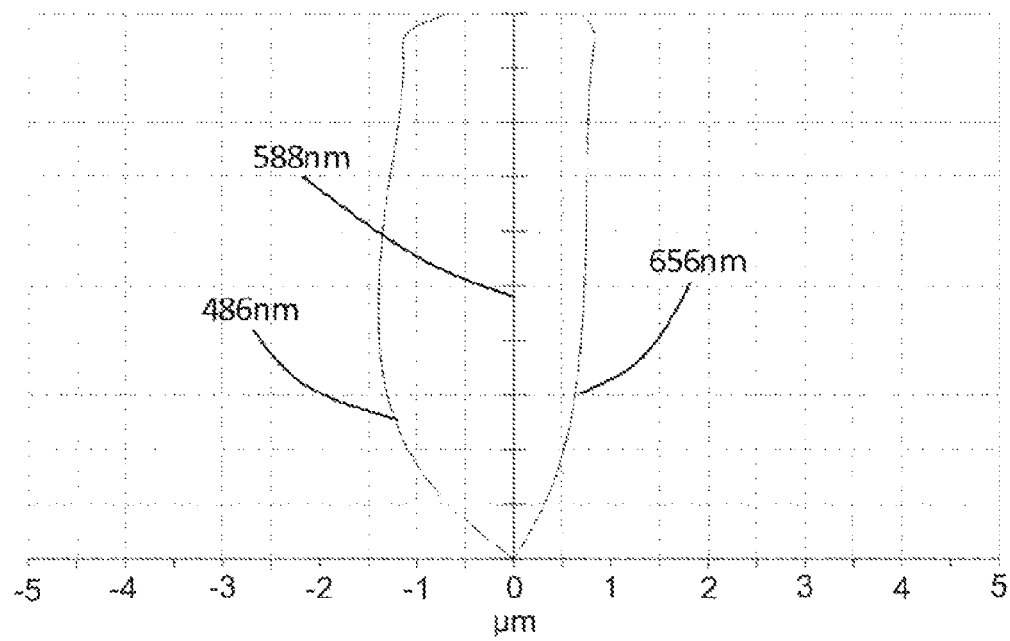
FIG. 8 is a magnification chromatic aberration diagram of the image pickup lens of the second embodiment.
Figure 9:
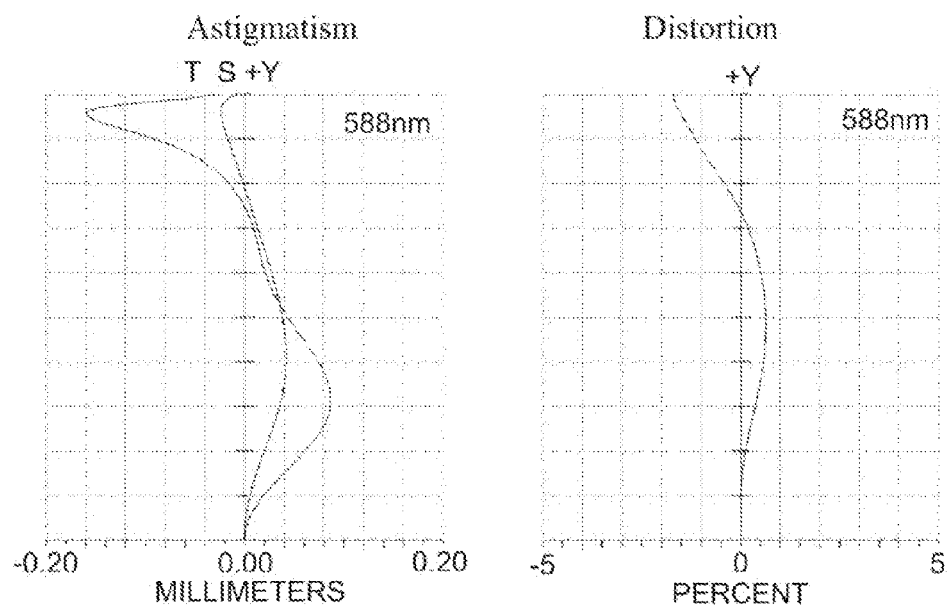
FIG. 9 is an aberration diagram of astigmatism and distortion of the image pickup lens of the second embodiment.

The image pickup lens in the second embodiment, as shown in Table 35, satisfies conditions (1)~(9). Spherical aberration of the image pickup lens LA in the second embodiment is shown in FIG. 7, and the magnification chromatism is shown in FIG. 8. Aberration of astigmatism and distortion of the image pickup lens LA is shown in FIG. 9. According to the figures and table above, the image pickup lens LA in the second embodiment has the characters: 2ω=79.1°, TTL=3.941 mm, which achieves wide angle and miniaturization. Further, the brightness thereof is lower than 2.6, i.e., Fno=2.4. According to FIGS. 7~9, the image pickup lens in the second embodiment has very good optical performance.

The Third Embodiment

Figure 10:
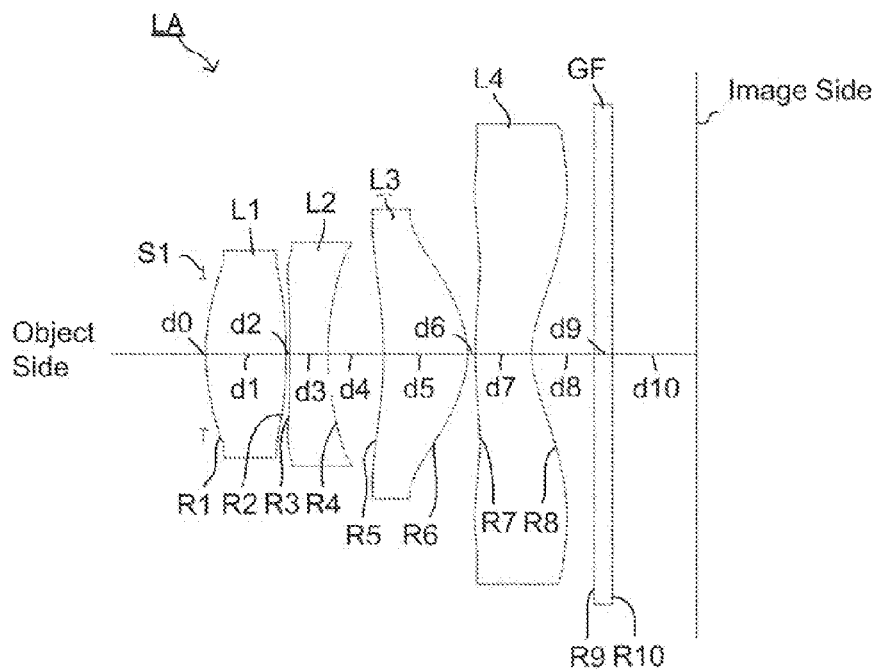
FIG. 10 is an illustration view of an image pickup lens of a third embodiment.

FIG. 10 is an illustration of the image pickup lens in accordance with a third embodiment of the present disclosure. Table 5 shows the curvature radiuses R of the object side surfaces and image side surfaces of the lenses L1~L4, center thickness of the lenses or distance d between lenses, index of refraction nd, the abbe coefficients vd. Table 6 shows the conic coefficients and aspherical coefficients.

TABLE 5

|  | R | d | nd |  | vd |  |
|---|---|---|---|---|---|---|
| S1 | ∞ | d0 = 0.020 |  |  |  |  |
| R1 | 1.807 | d1 = 0.640 | n1 | 1.544 | v1 | 56.1 |
| R2 | −4.375 | d2 = 0.030 |  |  |  |  |
| R3 | 85.279 | d3 = 0.305 | n2 | 1.640 | v2 | 23.4 |
| R4 | 2.228 | d4 = 0.445 |  |  |  |  |
| R5 | −2.845 | d5 = 0.670 | n3 | 1.544 | v3 | 56.1 |
| R6 | −0.712 | d6 = 0.060 |  |  |  |  |
| R7 | 2.900 | d7 = 0.450 | n4 | 1.544 | v4 | 56.1 |
| R8 | 0.689 | d8 = 0.500 |  |  |  |  |
| R9 | ∞ | d9 = 0.145 | n5 | 1.517 | v5 | 64.17 |
| R10 | ∞ | d10 = 0.673 |  |  |  |  |

TABLE 6

|  | k | A4 | A6 | A8 | A10 | A12 | A14 | A16 |
|---|---|---|---|---|---|---|---|---|
| R1 | −1.0861E+00 | −1.0332E−03 | 3.8452E−02 | −6.3025E−01 | 1.2106E+00 | 8.8710E−01 | −4.4490E+00 | 3.1633E+00 |
| R2 | 5.4166E+00 | −1.3591E−01 | −9.7892E−02 | 5.3638E−01 | −1.4362E−01 | 1.5537E−01 | 1.7507E+00 | −2.8143E+00 |
| R3 | −6.0486E+03 | −1.3887E−01 | −2.3353E−01 | 4.2110E−01 | 1.0703E+00 | −2.6807E−01 | −1.5073E+00 | 5.5186E−01 |
| R4 | 9.6174E−01 | −1.5471E−02 | −8.3567E−02 | −6.7147E−03 | −1.0076E−02 | 1.9240E−01 | 4.2486E−01 | −5.1439E−01 |
| R5 | −1.4097E+01 | 5.8204E−02 | −3.0383E−02 | 3.5064E−02 | −4.9773E−02 | −6.7748E−04 | 4.9999E−02 | −1.8442E−02 |
| R6 | −3.9503E+00 | −1.7456E−01 | 9.8222E−02 | 1.2172E−02 | 1.2096E−02 | 1.1977E−02 | 3.3277E−03 | −9.0152E−03 |
| R7 | −1.8983E+01 | −1.6497E−01 | 5.3320E−02 | 1.0753E−02 | −4.4437E−03 | 1.8172E−05 | −1.5966E−04 | 4.9679E−05 |
| R8 | −5.7052E+00 | −1.2144E−01 | 5.3381E−02 | −1.6089E−02 | 2.1375E−03 | 8.7857E−05 | 2.4117E−05 | −1.5867E−05 |

Figure 11:
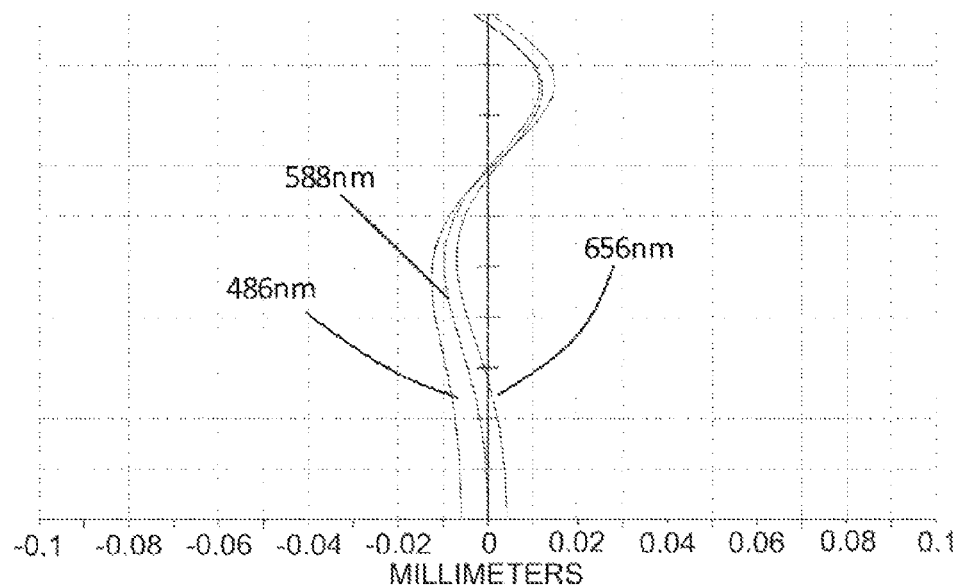
FIG. 11 is a spherical aberration diagram (Axial Chromatic Aberration) of the image pickup lens of the third embodiment.
Figure 12:
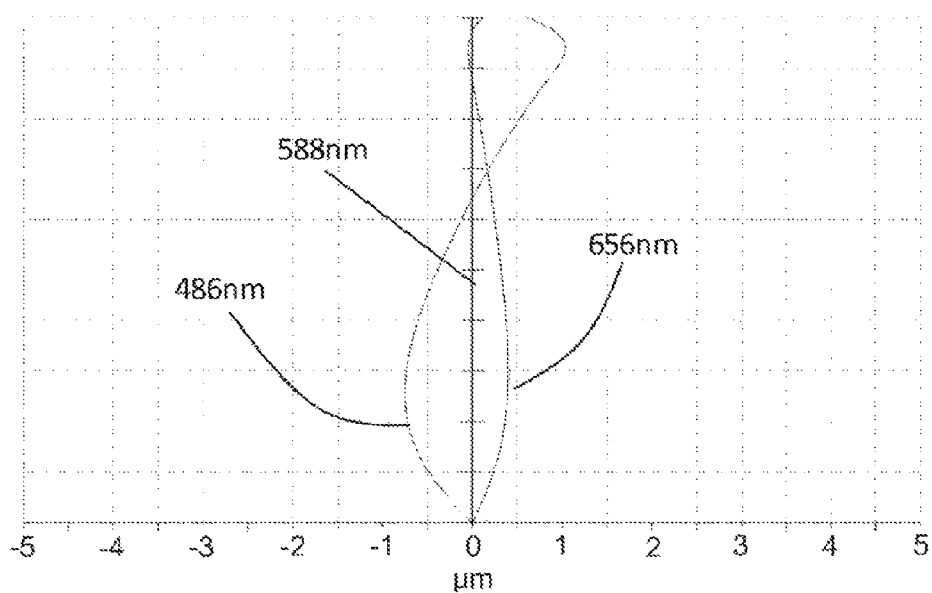
FIG. 12 is a magnification chromatic aberration diagram of the image pickup lens of the third embodiment.
Figure 13:
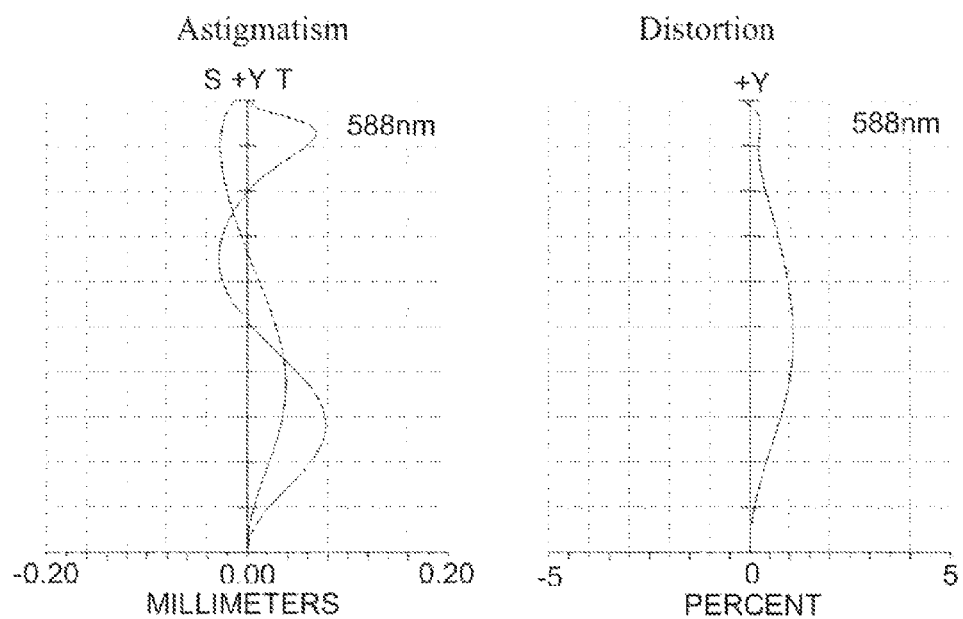
FIG. 13 is an aberration diagram of astigmatism and distortion of the image pickup lens of the third embodiment.

The image pickup lens in the third embodiment, as shown in Table 35, satisfies conditions (1)~(9). Spherical aberration of the image pickup lens LA in the third embodiment is shown in FIG. 11, and the magnification chromatism is shown in FIG. 12. Aberration of astigmatism and distortion of the image pickup lens LA is shown in FIG. 13. According to the figures and table above, the image pickup lens LA in the third embodiment has the characters: 2ω=74.2°, TTL=3.938 mm, which achieves wide angle and miniaturization. Further, the brightness thereof is lower than 2.6, i.e., Fno=2.4. According to FIGS. 11~13, the image pickup lens in the second embodiment has very good optical performance.

The Fourth Embodiment

Figure 14:
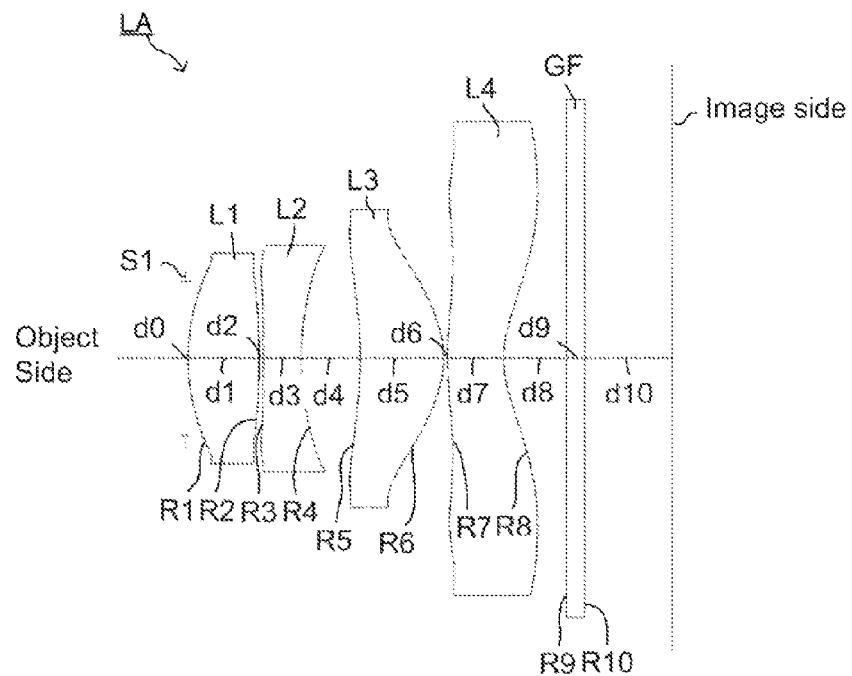
FIG. 14 is an illustration view of an image pickup lens of a fourth embodiment.

FIG. 14 is an illustration of the image pickup lens in accordance with a fourth embodiment of the present disclosure. Table 7 shows the curvature radiuses R of the object side surfaces and image side surfaces of the lenses L1~L4, center thickness of the lenses or distance d between lenses, index of refraction nd, the abbe coefficients vd. Table 8 shows the conic coefficients and aspherical coefficients.

TABLE 7

|  | R | d | nd |  | vd |  |
|---|---|---|---|---|---|---|
| S1 | ∞ | d0 = 0.020 |  |  |  |  |
| R1 | 1.559 | d1 = 0.560 | n1 | 1.544 | v1 | 56.1 |
| R2 | −8.203 | d2 = 0.035 |  |  |  |  |
| R3 | 65.917 | d3 = 0.300 | n2 | 1.640 | v2 | 23.4 |
| R4 | 2.255 | d4 = 0.465 |  |  |  |  |
| R5 | −2.969 | d5 = 0.660 | n3 | 1.544 | v3 | 56.1 |
| R6 | −0.714 | d6 = 0.030 |  |  |  |  |
| R7 | 2.908 | d7 = 0.440 | n4 | 1.544 | v4 | 56.1 |
| R8 | 0.714 | d8 = 0.500 |  |  |  |  |
| R9 | ∞ | d9 = 0.145 | n5 | 1.517 | v5 | 64.17 |
| R10 | ∞ | d10 = 0.688 |  |  |  |  |

TABLE 8

|  | k | A4 | A6 | A8 | A10 | A12 | A14 | A16 |
|---|---|---|---|---|---|---|---|---|
| R1 | −7.1283E−01 | 1.0171E−02 | 5.5329E−02 | −6.0455E−01 | 1.2539E+00 | 9.0638E−01 | −4.4884E+00 | 2.9014E+00 |
| R2 | 1.4053E+01 | −1.3883E−01 | −1.0279E−01 | 5.4989E−01 | −1.4063E−01 | 1.4384E−01 | 1.7310E+00 | −2.8006E+00 |
| R3 | −1.1601E+03 | −1.4629E−01 | −2.3936E−01 | 4.0617E−01 | 1.0708E+00 | −2.6085E−01 | −1.5093E+00 | 5.0135E−01 |
| R4 | 1.3850E+00 | −9.6531E−03 | −6.8058E−02 | 1.3020E−02 | −1.1032E−02 | 1.7189E−01 | 3.9979E−01 | −5.2506E−01 |
| R5 | −1.3396E+01 | 5.0049E−02 | −2.4539E−02 | 3.9386E−02 | −4.5216E−02 | 1.9754E−03 | 4.9530E−02 | −2.2097E−02 |
| R6 | −3.9757E+00 | −1.6695E−01 | 9.9414E−02 | 1.1260E−02 | 1.1425E−02 | 1.1889E−02 | 3.6746E−03 | −8.4129E−03 |
| R7 | −1.3369E+01 | −1.6378E−01 | 5.4566E−02 | 1.0248E−02 | −4.7711E−03 | 1.9908E−05 | −6.8241E−05 | 3.3500E−05 |
| R8 | −5.8278E+00 | −1.2222E−01 | 5.3266E−02 | −1.6002E−02 | 2.1762E−03 | 9.0824E−05 | 2.3320E−05 | −1.6489E−05 |

Figure 15:
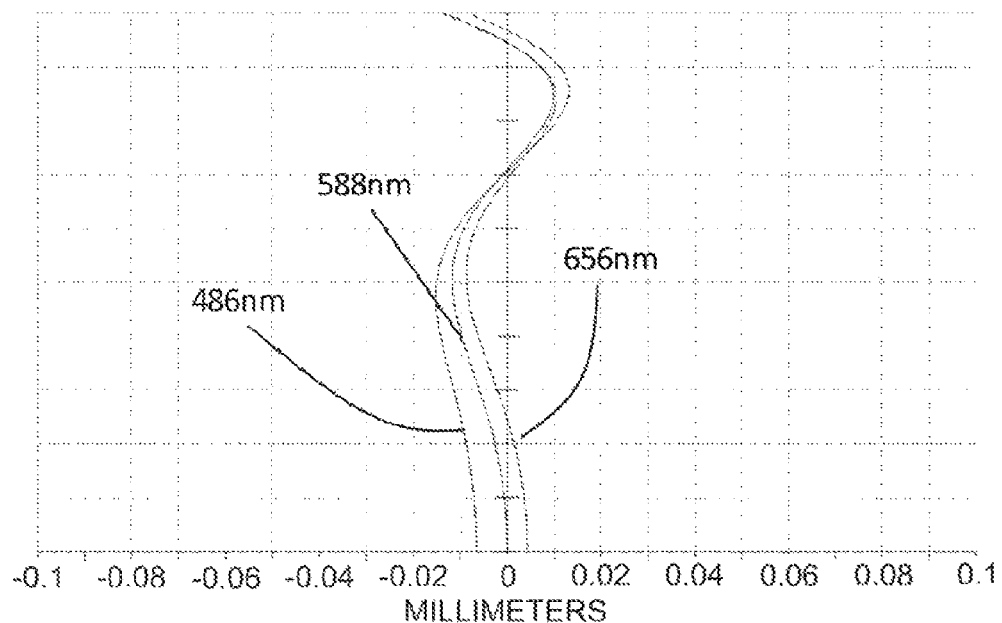
FIG. 15 is a spherical aberration diagram (Axial Chromatic Aberration) of the image pickup lens of the fourth embodiment.
Figure 16:
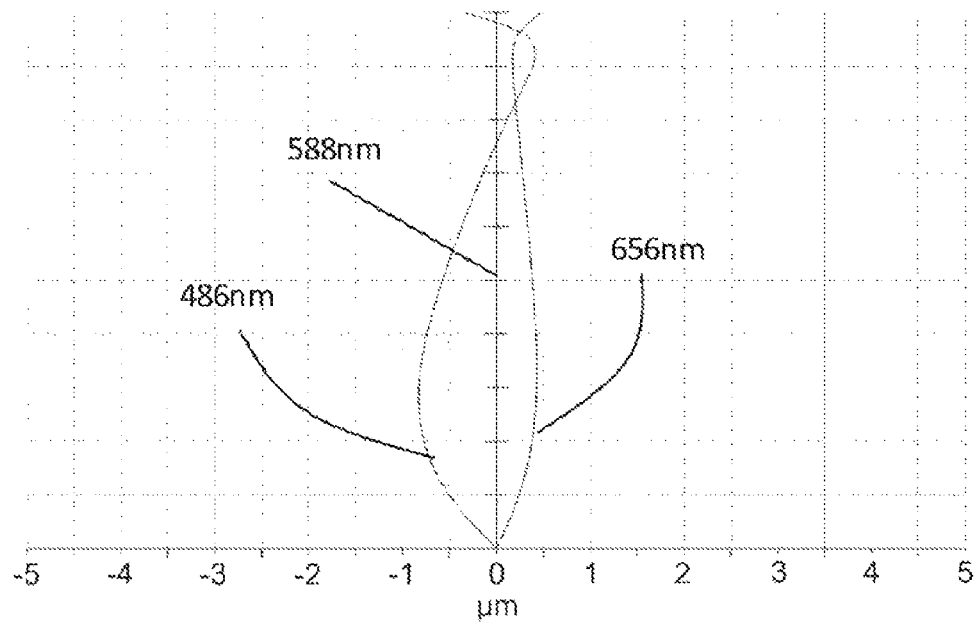
FIG. 16 is a magnification chromatic aberration diagram of the image pickup lens of the fourth embodiment.
Figure 17:
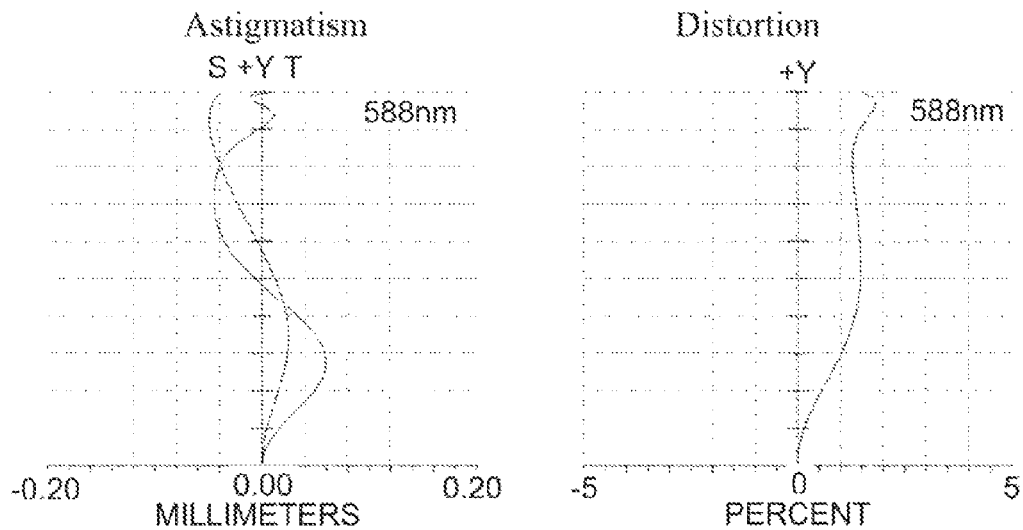
FIG. 17 is an aberration diagram of astigmatism and distortion of the image pickup lens of the fourth embodiment.

The image pickup lens in the fourth embodiment, as shown in Table 35, satisfies conditions (1)~(9). Spherical aberration of the image pickup lens LA in the fourth embodiment is shown in FIG. 15, and the magnification chromatism is shown in FIG. 16. Aberration of astigmatism and distortion of the image pickup lens LA is shown in FIG. 17. According to the figures and table above, the image pickup lens LA in the fourth embodiment has the characters: $2\omega=76.0°$, TTL=3.834 mm, which achieves wide angle and miniaturization. Further, the brightness thereof is lower than 2.6, i.e., Fno=2.4. According to FIGS. 15~17, the image pickup lens in the fourth embodiment has very good optical performance.

The Fifth Embodiment

Figure 18:
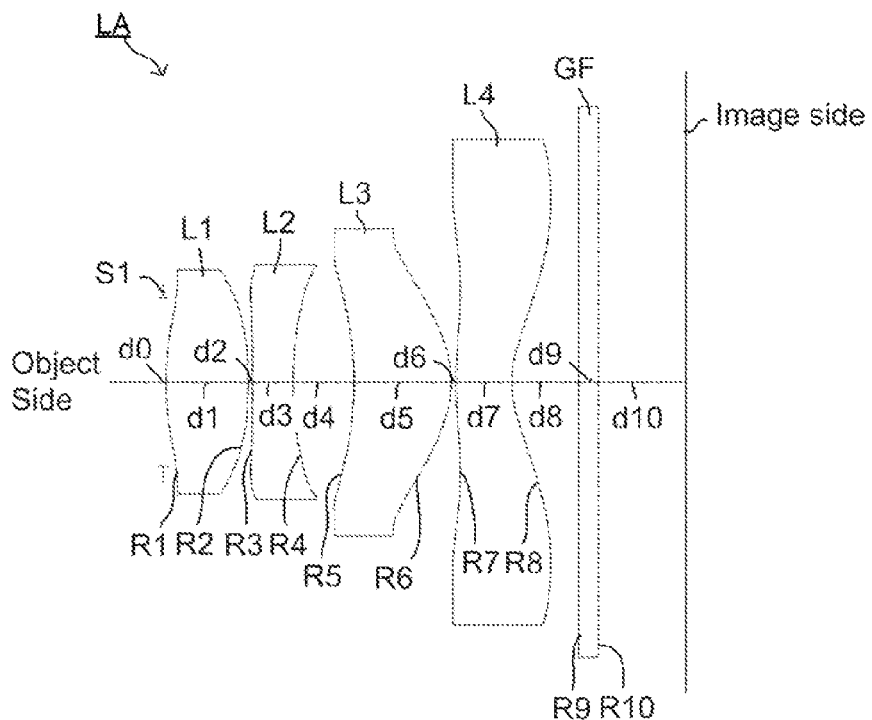
FIG. 18 is an illustration view of an image pickup lens of a fifth embodiment.

FIG. 18 is an illustration of the image pickup lens in accordance with a fifth embodiment of the present disclosure. Table 9 shows the curvature radiuses R of the object side surfaces and image side surfaces of the lenses L1~L4, center thickness of the lenses or distance d between lenses, index of refraction nd, the abbe coefficients vd. Table 10 shows the conic coefficients and aspherical coefficients.

TABLE 9

|     | R      | d          |    | nd    |    | vd    |
|-----|--------|------------|----|-------|----|-------|
| S1  | ∞      | d0 = 0.020 |    |       |    |       |
| R1  | 2.000  | d1 = 0.612 | n1 | 1.544 | v1 | 56.1  |
| R2  | −2.892 | d2 = 0.031 |    |       |    |       |
| R3  | 32.711 | d3 = 0.302 | n2 | 1.640 | v2 | 23.4  |
| R4  | 2.625  | d4 = 0.454 |    |       |    |       |
| R5  | −2.333 | d5 = 0.723 | n3 | 1.544 | v3 | 56.1  |
| R6  | −0.724 | d6 = 0.036 |    |       |    |       |
| R7  | 3.093  | d7 = 0.411 | n4 | 1.544 | v4 | 56.1  |
| R8  | 0.672  | d8 = 0.500 |    |       |    |       |
| R9  | ∞      | d9 = 0.145 | n5 | 1.517 | v5 | 64.17 |
| R10 | ∞      | d10 = 0.652|    |       |    |       | and table above, the image pickup lens LA in the fifth embodiment has the characters: $2\omega=74.5°$, TTL=3.886 mm, which achieves wide angle and miniaturization. Further, the brightness thereof is lower than 2.6, i.e., Fno=2.4. According to FIGS. 19~21, the image pickup lens in the fifth embodiment has very good optical performance.

The Sixth Embodiment

Figure 22:
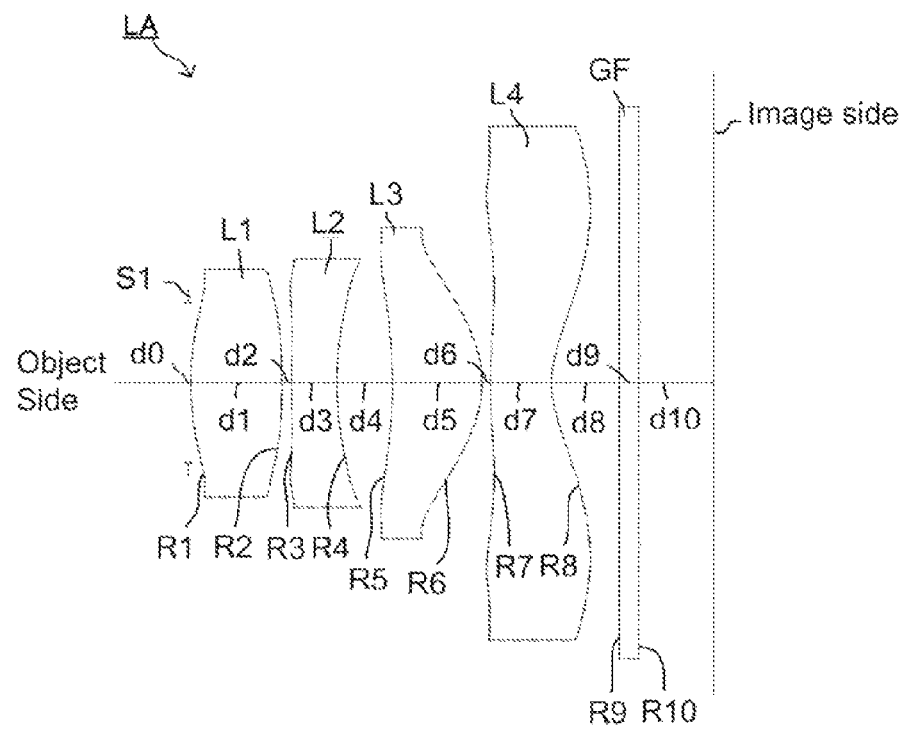
FIG. 22 is an illustration view of an image pickup lens of a sixth embodiment.

FIG. 22 is an illustration of the image pickup lens in accordance with a sixth embodiment of the present disclosure. Table 11 shows the curvature radiuses R of the object side surfaces and image side surfaces of the lenses L1~L4, center thickness of the lenses or distance d between lenses, index of refraction nd, the abbe coefficients vd. Table 12 shows the conic coefficients and aspherical coefficients.

TABLE 11

|     | R      | d           |    | nd    |    | vd    |
|-----|--------|-------------|----|-------|----|-------|
| S1  | ∞      | d0 = 0.020  |    |       |    |       |
| R1  | 2.006  | d1 = 0.674  | n1 | 1.544 | v1 | 56.1  |
| R2  | −5.135 | d2 = 0.070  |    |       |    |       |
| R3  | 9.929  | d3 = 0.336  | n2 | 1.640 | v2 | 23.4  |
| R4  | 2.359  | d4 = 0.412  |    |       |    |       |
| R5  | −2.903 | d5 = 0.661  | n3 | 1.544 | v3 | 56.1  |
| R6  | −0.718 | d6 = 0.059  |    |       |    |       |
| R7  | 2.977  | d7 = 0.454  | n4 | 1.544 | v4 | 56.1  |
| R8  | 0.684  | d8 = 0.500  |    |       |    |       |
| R9  | ∞      | d9 = 0.145  | n5 | 1.517 | v5 | 64.17 |
| R10 | ∞      | d10 = 0.557 |    |       |    |       |

TABLE 10

|    | k           | A4          | A6          | A8          | A10         | A12         | A14         | A16         |
|----|-------------|-------------|-------------|-------------|-------------|-------------|-------------|-------------|
| R1 | −3.8113E+00 | −3.2894E−02 | 5.9124E−02  | −7.6557E−01 | 7.8698E−01  | 1.2577E−01  | −4.7004E+00 | 7.4348E+00  |
| R2 | 1.0806E+01  | −1.6139E−01 | −1.7377E−01 | 4.9813E−01  | −2.8308E−01 | 1.8617E−02  | 1.8493E+00  | −1.8487E+00 |
| R3 | −4.4072E+03 | −1.2973E−01 | −2.2546E−01 | 3.7303E−01  | 1.0991E+00  | −2.3344E−01 | −1.5122E+00 | 5.4240E−01  |
| R4 | 3.2892E+00  | 6.9352E−03  | −8.6565E−02 | −6.0571E−03 | 4.5100E−02  | 3.4000E−01  | 5.3269E−01  | −7.4363E−01 |
| R5 | −2.0422E+00 | 2.0692E−02  | −3.9164E−02 | 4.6499E−02  | −3.8145E−02 | 1.1109E−02  | 6.6171E−02  | 7.9182E−03  |
| R6 | −3.9929E+00 | −1.6654E−01 | 1.0271E−01  | 1.1297E−02  | 1.0780E−02  | 1.2052E−02  | 4.0023E−03  | −8.3061E−03 |
| R7 | −2.3448E+01 | −1.6607E−01 | 5.3889E−02  | 1.0739E−02  | −4.5636E−03 | −2.1227E−05 | −1.6189E−04 | 5.3620E−05  |
| R8 | −5.5953E+00 | −1.1884E−01 | 5.3010E−02  | −1.6296E−02 | 2.1302E−03  | 8.9027E−05  | 2.3514E−05  | −1.6448E−05 |

Figure 19:
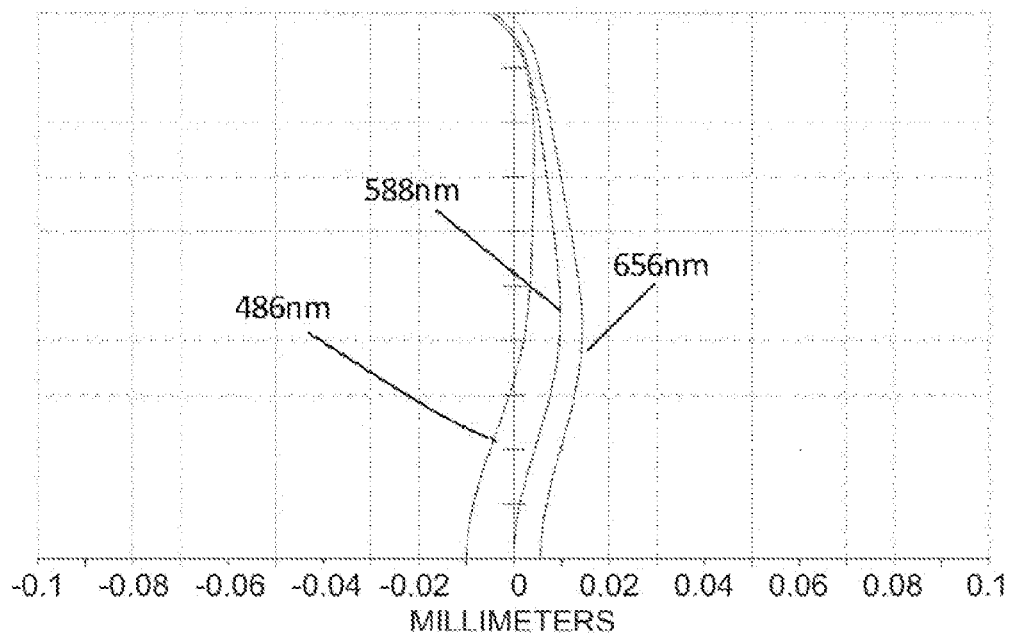
FIG. 19 is a spherical aberration diagram (Axial Chromatic Aberration) of the image pickup lens of the fifth embodiment.
Figure 20:
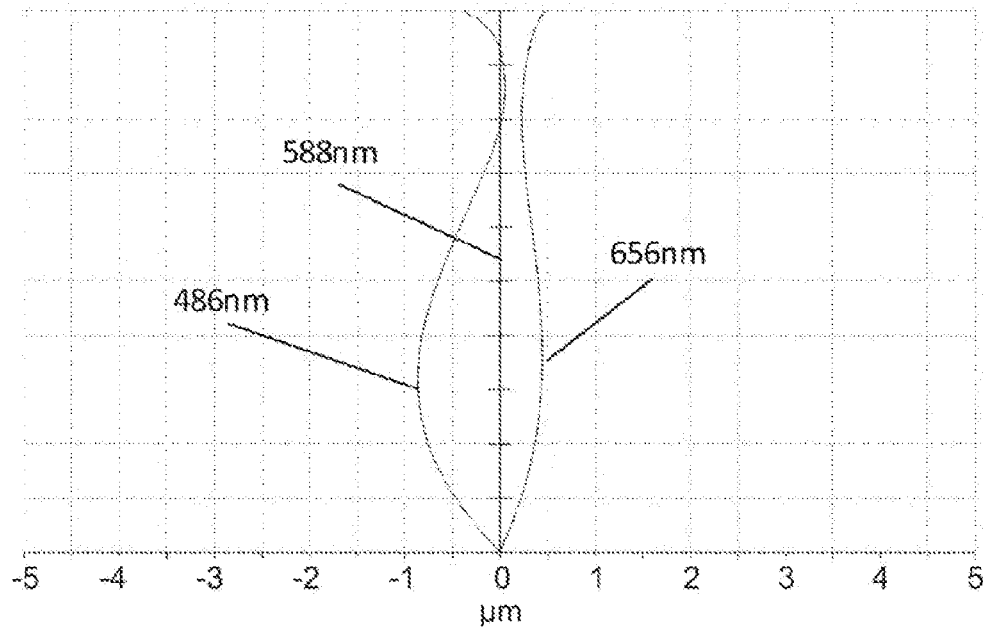
FIG. 20 is a magnification chromatic aberration diagram of the image pickup lens of the fifth embodiment.
Figure 21:
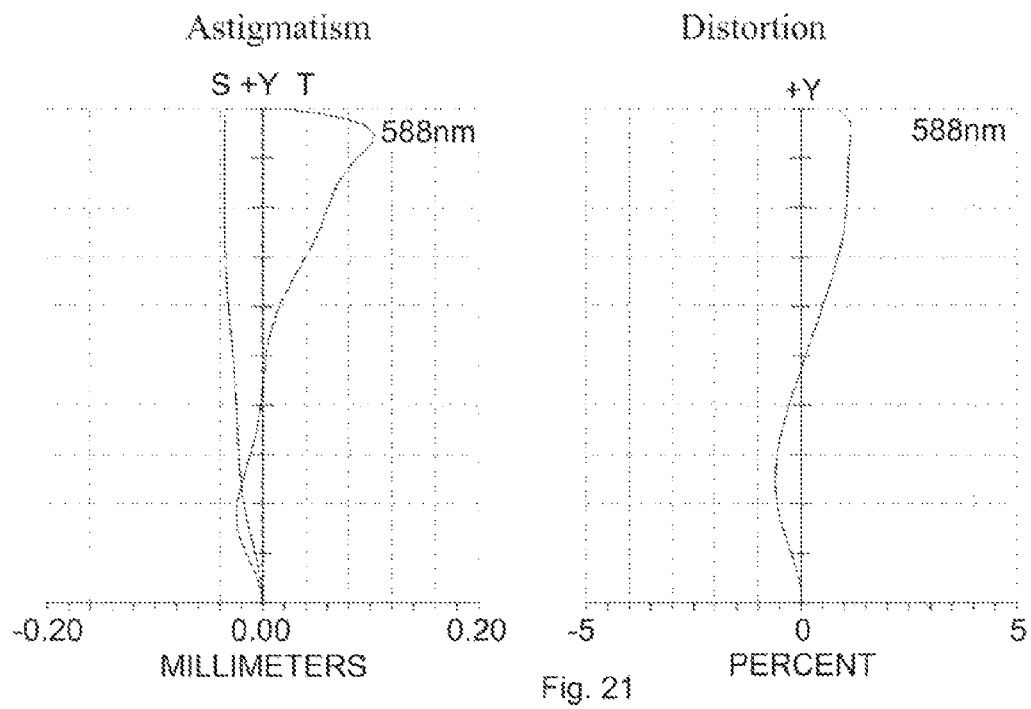
FIG. 21 is an aberration diagram of astigmatism and distortion of the image pickup lens of the fifth embodiment.

The image pickup lens in the fifth embodiment, as shown in Table 35, satisfies conditions (1)~(9). Spherical aberration of the image pickup lens LA in the fifth embodiment is shown in FIG. 19, and the magnification chromatism is shown in FIG. 20. Aberration of astigmatism and distortion of the image pickup lens LA is shown in FIG. 21. According to the figures

TABLE 12

|    | 円錐係数 | 非球面係数 | | | | | | |
|----|-------------|-------------|-------------|-------------|-------------|-------------|-------------|-------------|
|    | k           | A4          | A6          | A8          | A10         | A12         | A14         | A16         |
| R1 | −3.0850E+00 | 1.0909E−03  | 6.2223E−03  | −6.1975E−01 | 1.5383E+00  | 3.5499E−01  | −4.9874E+00 | 3.5140E+00  |
| R2 | 2.3229E+01  | −1.6778E−01 | −1.5605E−01 | 5.5423E−01  | −1.2046E−01 | 1.2988E−01  | 1.6667E+00  | −2.8902E+00 |
| R3 | −2.6339E+02 | −1.5474E−01 | −2.6215E−01 | 3.7749E−01  | 1.0642E+00  | −1.8997E−01 | −1.5389E+00 | 5.5894E−01  |
| R4 | 6.5845E−01  | −2.0751E−02 | −9.5428E−02 | 1.3237E−02  | −5.4360E−03 | 1.8393E−01  | 4.1844E−01  | −4.9672E−01 |
| R5 | −1.3862E+01 | 5.2773E−02  | −3.1833E−02 | 3.4303E−02  | −4.7160E−02 | 3.0535E−03  | 5.2965E−02  | −1.7846E−02 |
| R6 | −3.7424E+00 | −1.7210E−01 | 1.0134E−01  | 1.1650E−02  | 1.2493E−02  | 1.2014E−02  | 4.0014E−03  | −7.5429E−03 |
| R7 | −2.1134E+01 | −1.6927E−01 | 5.2933E−02  | 1.0831E−02  | −4.3550E−03 | 6.6891E−05  | −1.4337E−04 | 4.0899E−05  |
| R8 | −5.4421E+00 | −1.2200E−01 | 5.2247E−02  | −1.6268E−02 | 2.1164E−03  | 8.7858E−05  | 2.6247E−05  | −1.4474E−05 |

Figure 23:
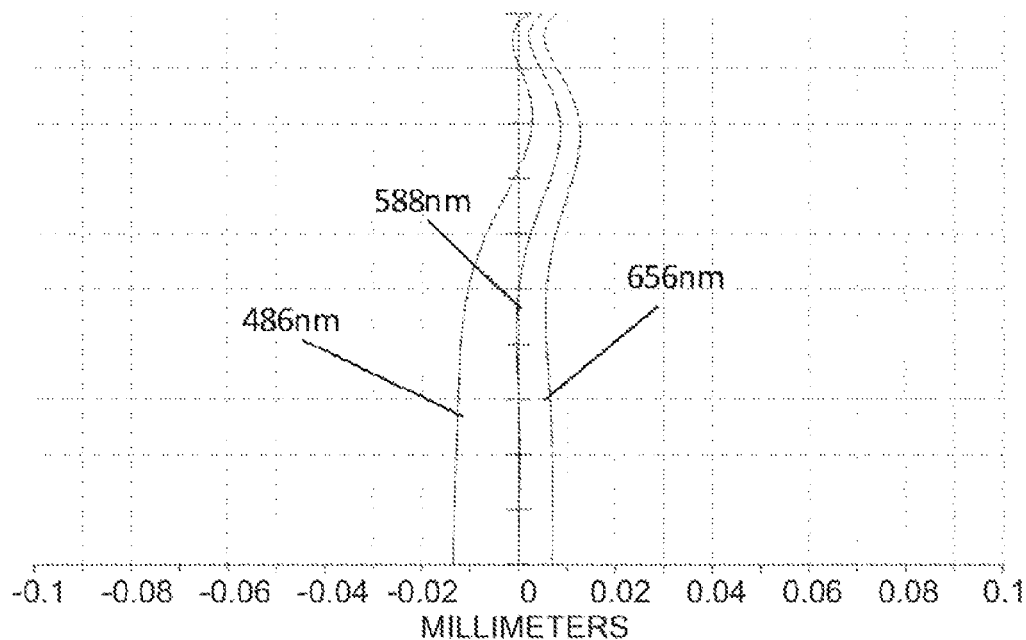
FIG. 23 is a spherical aberration diagram (Axial Chromatic Aberration) of the image pickup lens of the sixth embodiment.
Figure 24:
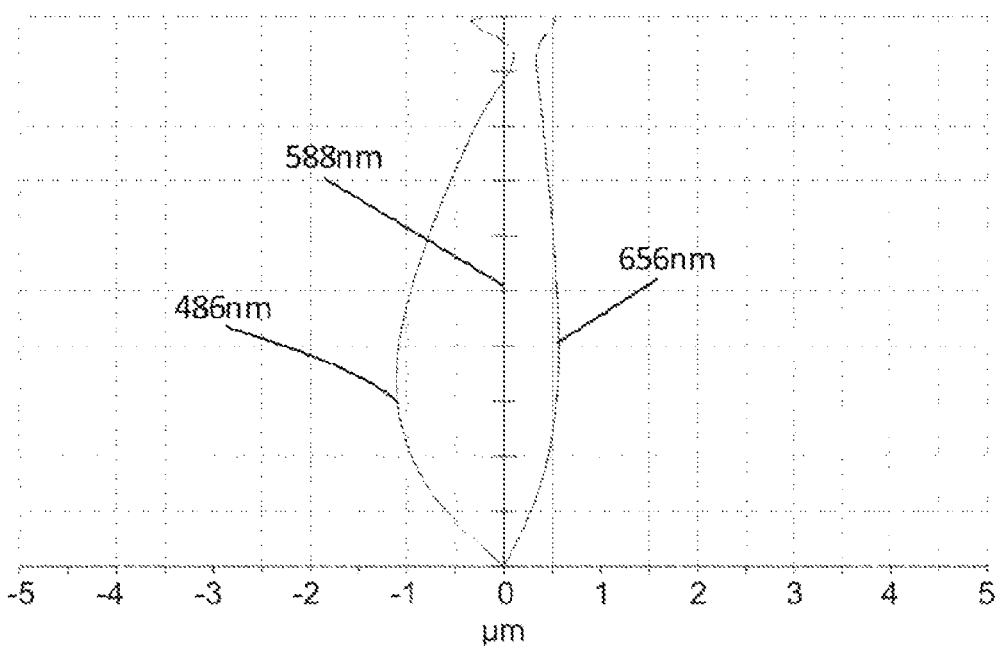
FIG. 24 is a magnification chromatic aberration diagram of the image pickup lens of the sixth embodiment.
Figure 25:
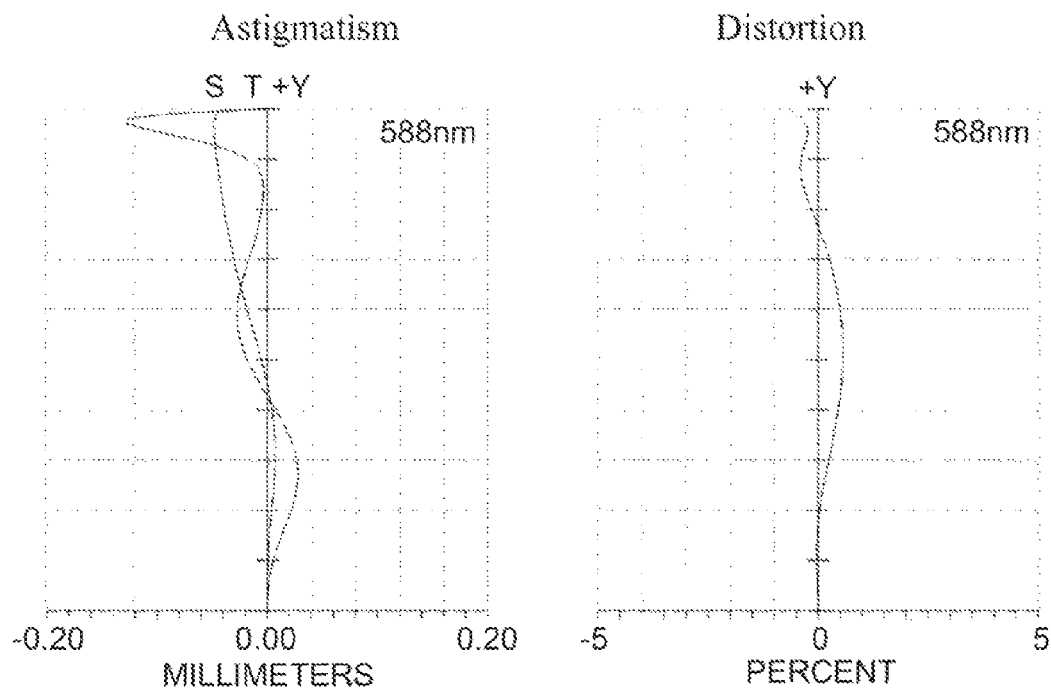
FIG. 25 is an aberration diagram of astigmatism and distortion of the image pickup lens of the sixth embodiment.

The image pickup lens in the sixth embodiment, as shown in Table 35, satisfies conditions (1)~(9). Spherical aberration of the image pickup lens LA in the sixth embodiment is shown in FIG. 23, and the magnification chromatism is shown in FIG. 24. Aberration of astigmatism and distortion of the image pickup lens LA is shown in FIG. 25. According to the figures and table above, the image pickup lens LA in the sixth embodiment has the characters: 2ω=74.3°, TTL=3.888 mm, which achieves wide angle and miniaturization. Further, the brightness thereof is lower than 2.6, i.e., Fno=2.4. According to FIGS. 23~25, the image pickup lens in the sixth embodiment has very good optical performance.

The Seventh Embodiment

Figure 26:
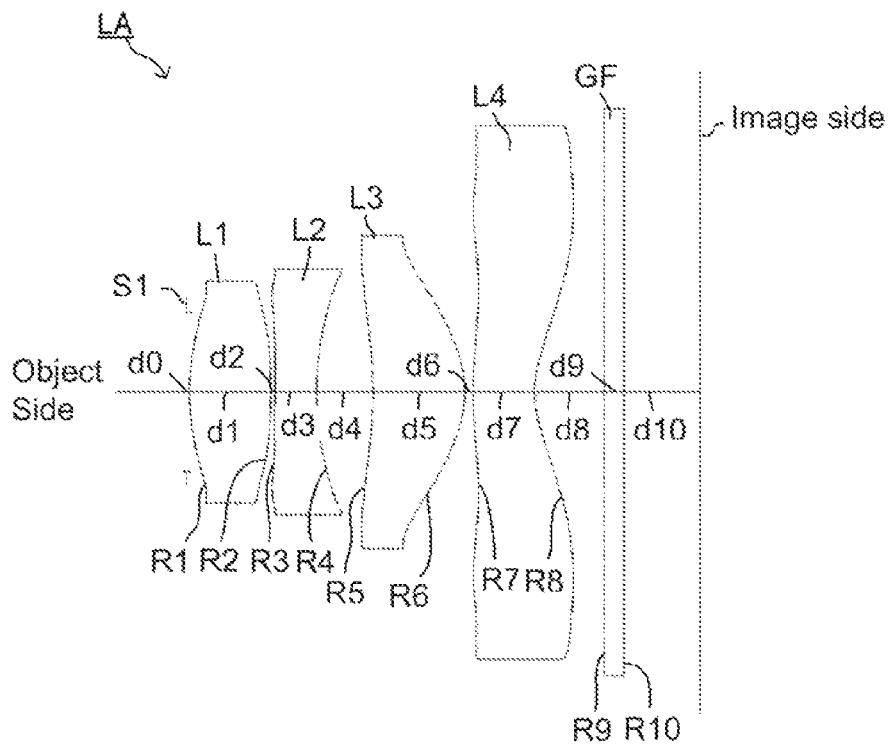
FIG. 26 is an illustration view of an image pickup lens of a seventh embodiment.

FIG. 26 is an illustration of the image pickup lens in accordance with a seventh embodiment of the present disclosure. Table 13 shows the curvature radiuses R of the object side surfaces and image side surfaces of the lenses L1~L4, center thickness of the lenses or distance d between lenses, index of refraction nd, the abbe coefficients vd. Table 14 shows the conic coefficients and aspherical coefficients.

TABLE 13

|     | R       | d           |    | nd    |    | vd    |
|-----|---------|-------------|----|-------|----|-------|
| S1  | ∞       | d0 = 0.020  |    |       |    |       |
| R1  | 1.725   | d1 = 0.589  | n1 | 1.544 | v1 | 56.1  |
| R2  | -3.630  | d2 = 0.030  |    |       |    |       |
| R3  | 114.197 | d3 = 0.300  | n2 | 1.640 | v2 | 23.4  |
| R4  | 2.078   | d4 = 0.408  |    |       |    |       |
| R5  | -2.858  | d5 = 0.666  | n3 | 1.544 | v3 | 56.1  |
| R6  | -0.711  | d6 = 0.059  |    |       |    |       |
| R7  | 2.767   | d7 = 0.445  | n4 | 1.544 | v4 | 56.1  |
| R8  | 0.683   | d8 = 0.500  |    |       |    |       |
| R9  | ∞       | d9 = 0.145  | n5 | 1.517 | v5 | 64.17 |
| R10 | ∞       | d10 = 0.549 |    |       |    |       |

TABLE 14

|    | k          | A4          | A6          | A8          | A10         | A12         | A14         | A16         |
|----|------------|-------------|-------------|-------------|-------------|-------------|-------------|-------------|
| R1 | -1.3823E+00 | -8.4534E-03 | 1.8469E-02  | -6.4652E-01 | 1.2259E+00  | 9.6986E-01  | -4.4859E+00 | 2.0628E+00  |
| R2 | 5.0859E+00  | -1.3084E-01 | -1.3862E-01 | 4.7321E-01  | -1.9799E-01 | 1.2179E-01  | 1.7665E+00  | -2.7605E+00 |
| R3 | -2.2058E+04 | -1.3958E-01 | -2.4654E-01 | 4.0426E-01  | 1.0459E+00  | -2.8625E-01 | -1.4414E+00 | 5.6350E-01  |
| R4 | 8.0935E-01  | -1.8529E-02 | -7.7065E-02 | 1.4596E-02  | -1.5610E-02 | 2.1551E-01  | 4.2438E-01  | -5.7754E-01 |
| R5 | -1.4567E+01 | 5.8122E-02  | -3.2915E-02 | 3.9744E-02  | -5.1668E-02 | -1.8391E-03 | 5.4262E-02  | -1.2712E-02 |
| R6 | -3.9218E+00 | -1.7595E-01 | 9.7538E-02  | 1.3213E-02  | 1.3190E-02  | 1.3136E-02  | 4.4755E-03  | -8.1678E-03 |
| R7 | -1.8078E+01 | -1.6496E-01 | 5.3261E-02  | 1.0590E-02  | -4.3881E-03 | 7.2491E-05  | -1.4852E-04 | 3.8933E-05  |
| R8 | -5.7068E+00 | -1.2289E-01 | 5.3549E-02  | -1.5924E-02 | 2.1838E-03  | 8.8834E-05  | 2.2948E-05  | -1.6525E-05 |

Figure 27:
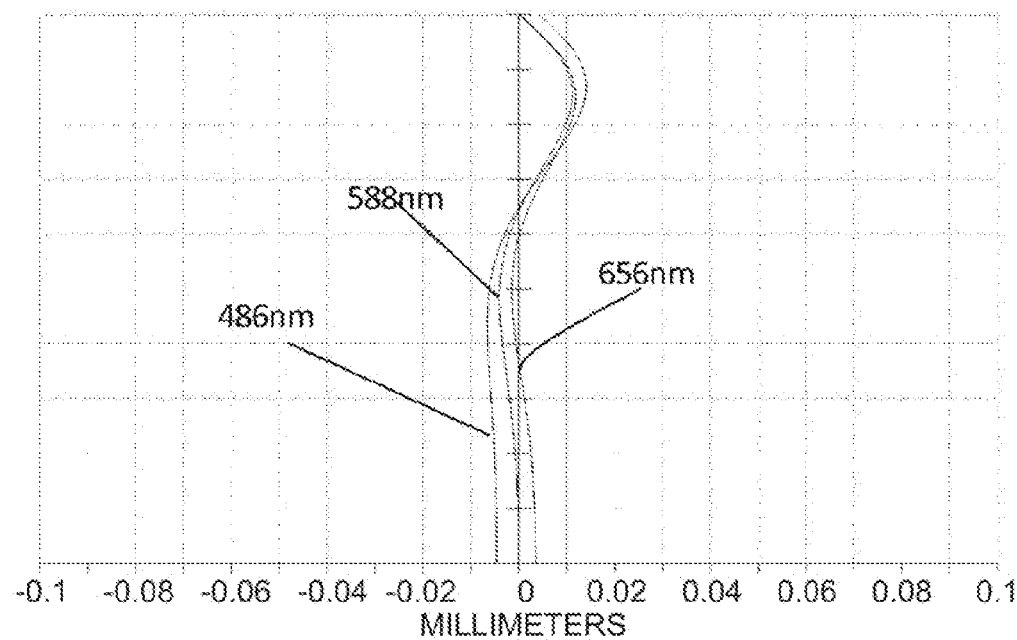
FIG. 27 is a spherical aberration diagram (Axial Chromatic Aberration) of the image pickup lens of the seventh embodiment.
Figure 28:
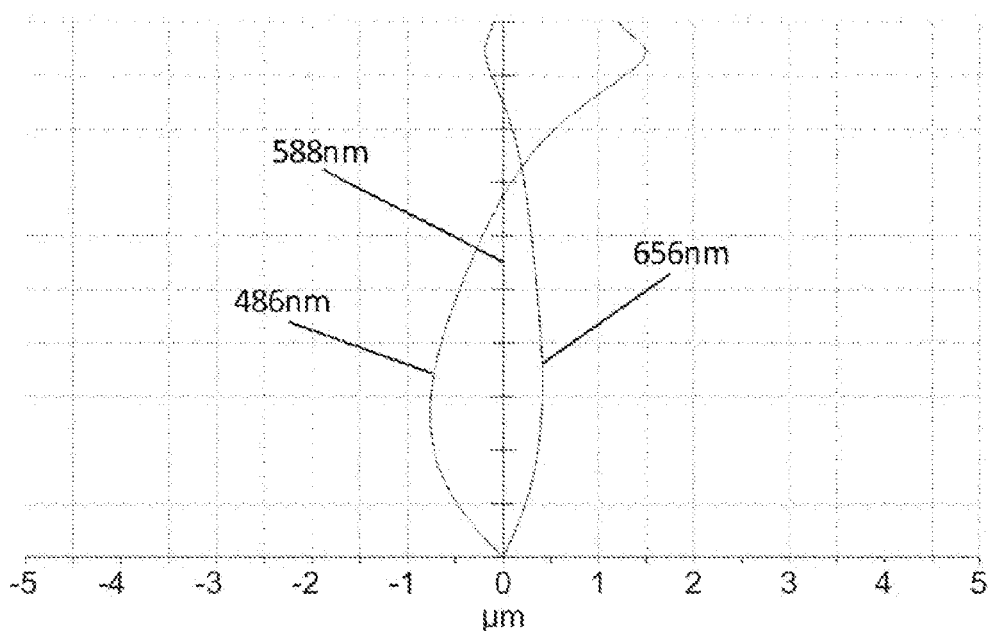
FIG. 28 is a magnification chromatic aberration diagram of the image pickup lens of the seventh embodiment.
Figure 29:
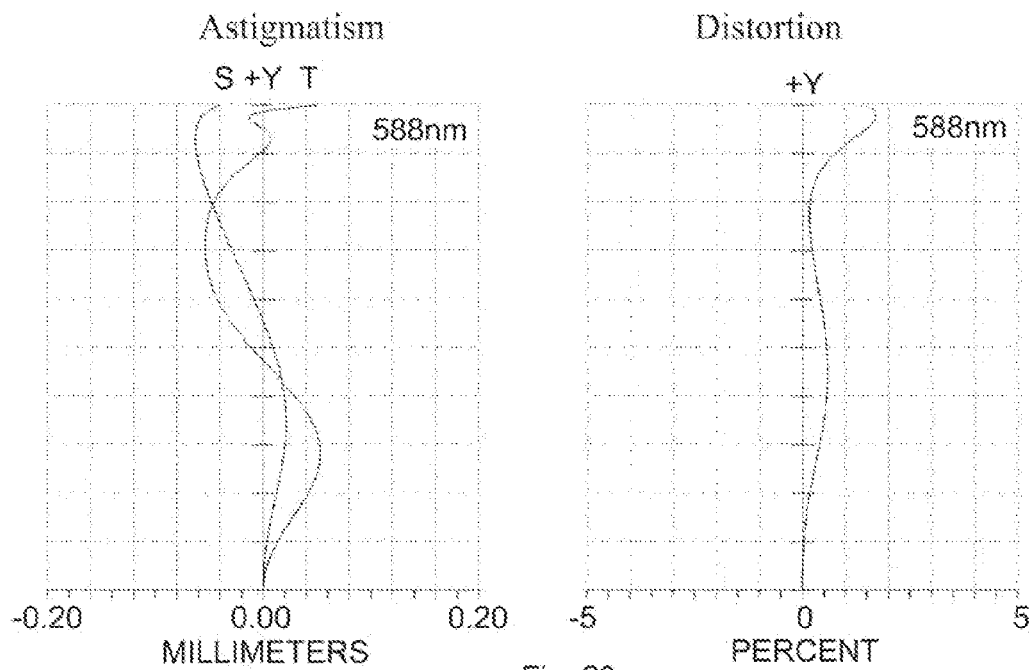
FIG. 29 is an aberration diagram of astigmatism and distortion of the image pickup lens of the seventh embodiment.

The image pickup lens in the seventh embodiment, as shown in Table 35, satisfies conditions (1)~(9). Spherical aberration of the image pickup lens LA in the seventh embodiment is shown in FIG. 27, and the magnification chromatism is shown in FIG. 28. Aberration of astigmatism and distortion of the image pickup lens LA is shown in FIG. 29. According to the figures and table above, the image pickup lens LA in the seventh embodiment has the characters: 2ω=79.2°, TTL=3.711 mm, which achieves wide angle and miniaturization. Further, the brightness thereof is lower than 2.6, i.e., Fno=2.4. According to FIGS. 27~29, the image pickup lens in the seventh embodiment has very good optical performance.

The Eighth Embodiment

Figure 30:
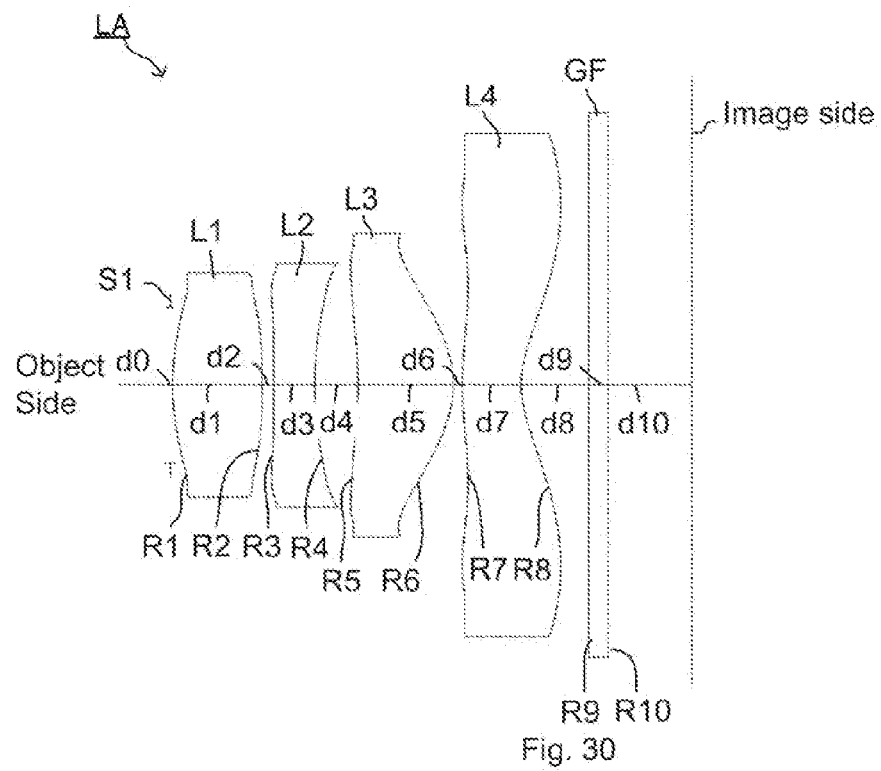
FIG. 30 is an illustration view of an image pickup lens of an eighth embodiment.

FIG. 30 is an illustration of the image pickup lens in accordance with an eighth embodiment of the present disclosure. Table 15 shows the curvature radiuses R of the object side surfaces and image side surfaces of the lenses L1~L4, center thickness of the lenses or distance d between lenses, index of refraction nd, the abbe coefficients vd. Table 16 shows the conic coefficients and aspherical coefficients.

TABLE 15

|     | R       | d           |    | nd    |    | vd    |
|-----|---------|-------------|----|-------|----|-------|
| S1  | ∞       | d0 = 0.020  |    |       |    |       |
| R1  | 1.960   | d1 = 0.662  | n1 | 1.544 | v1 | 56.1  |
| R2  | -5.621  | d2 = 0.085  |    |       |    |       |
| R3  | 17.003  | d3 = 0.303  | n2 | 1.640 | v2 | 23.4  |
| R4  | 2.586   | d4 = 0.321  |    |       |    |       |
| R5  | -2.989  | d5 = 0.704  | n3 | 1.544 | v3 | 55.1  |
| R6  | -0.719  | d6 = 0.069  |    |       |    |       |
| R7  | 2.856   | d7 = 0.433  | n4 | 1.544 | v4 | 56.1  |
| R8  | 0.691   | d8 = 0.500  |    |       |    |       |
| R9  | ∞       | d9 = 0.145  | n5 | 1.517 | v5 | 64.17 |
| R10 | ∞       | d10 = 0.618 |    |       |    |       |

TABLE 16

|    | k           | A4          | A6          | A8          | A10         | A12         | A14         | A16         |
|----|-------------|-------------|-------------|-------------|-------------|-------------|-------------|-------------|
| R1 | -2.0316E+00 | -1.6308E-02 | 5.6767E-02  | -6.1772E-01 | 1.2039E+00  | 7.7167E-01  | -4.5788E+00 | 2.8614E+00  |
| R2 | 2.2975E+01  | -1.5146E-01 | -1.3384E-01 | 5.4458E-01  | -1.3588E-01 | 1.2872E-01  | 1.6685E+00  | -2.8932E+00 |
| R3 | -2.1450E+03 | -1.5567E-01 | -2.3951E-01 | 3.9674E-01  | 1.0613E+00  | -2.5543E-01 | -1.4831E+00 | 6.0329E-01  |
| R4 | 9.5686E-01  | -1.6680E-02 | -9.0985E-02 | -9.4653E-03 | 1.5798E-03  | 2.0316E-01  | 4.3870E-01  | -4.9509E-01 |
| R5 | -3.0603E+01 | 6.6928E-02  | -3.0998E-02 | 3.6073E-02  | -4.5985E-02 | 4.5157E-03  | 5.4391E-02  | -1.6796E-02 |
| R6 | -3.9228E+00 | -1.6199E-01 | 1.1109E-01  | 1.8901E-02  | 1.4034E-02  | 1.2016E-02  | 3.1491E-03  | -8.7974E-03 |
| R7 | -1.5019E+01 | -1.6862E-01 | 5.3158E-02  | 1.0919E-02  | -4.4098E-03 | 2.0928E-05  | -1.5874E-04 | 4.7563E-05  |
| R8 | -5.5122E+00 | -1.1937E-01 | 5.3292E-02  | -1.6365E-02 | 2.0933E-03  | 8.6736E-05  | 2.6171E-05  | -1.5396E-05 |

Figure 31:
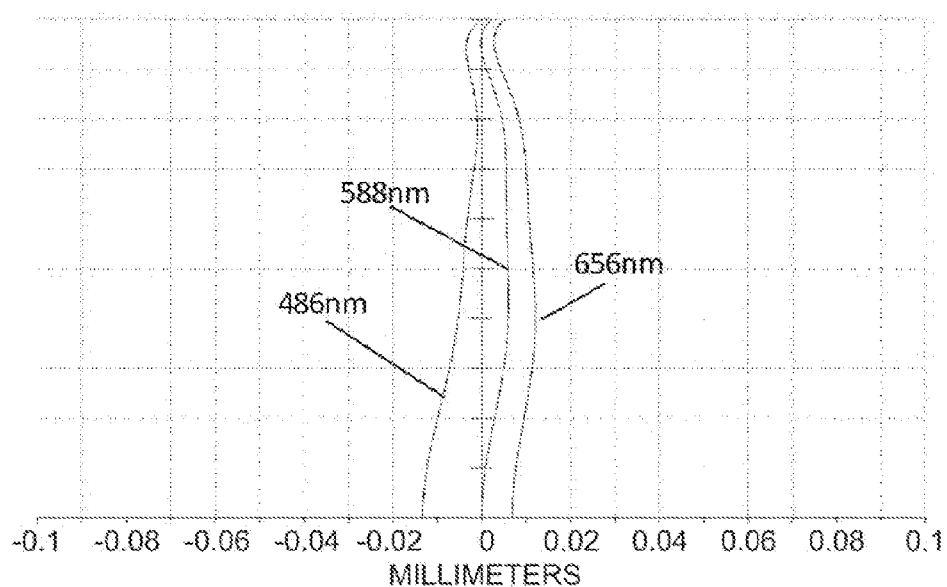
FIG. 31 is a spherical aberration diagram (Axial Chromatic Aberration) of the image pickup lens of the eighth embodiment.
Figure 32:
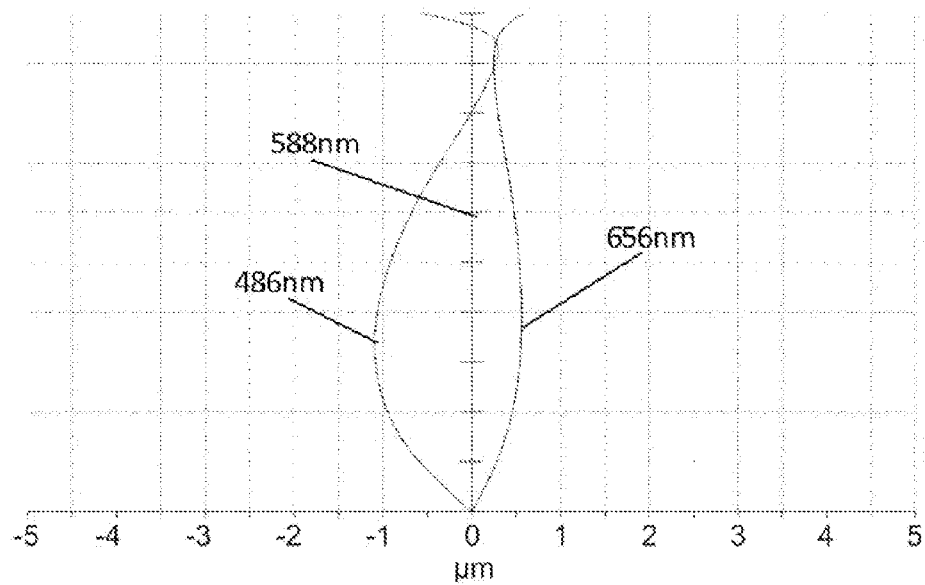
FIG. 32 is a magnification chromatic aberration diagram of the image pickup lens of the eighth embodiment.
Figure 33:
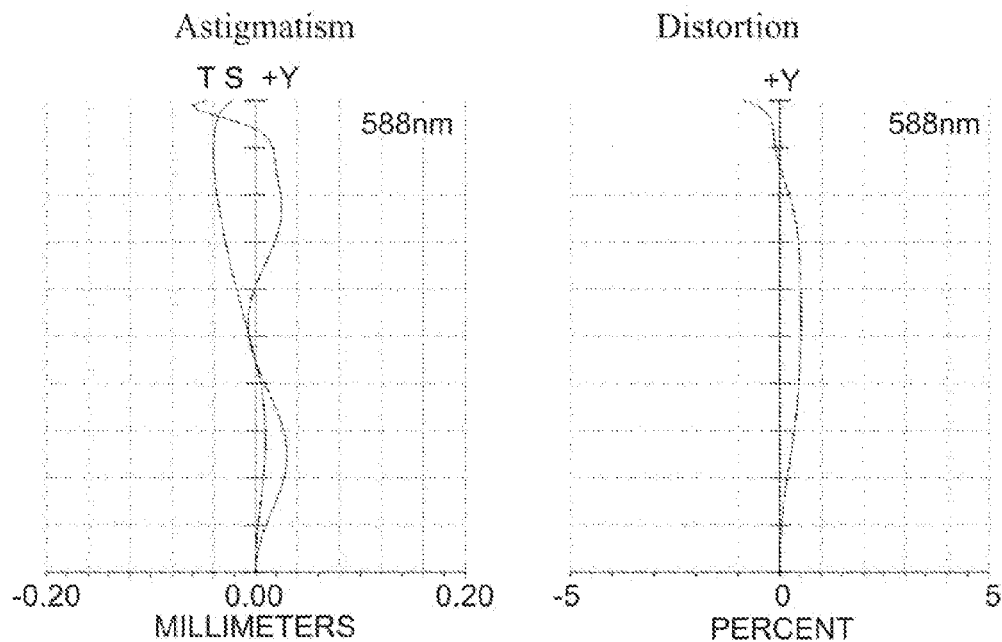
FIG. 33 is an aberration diagram of astigmatism and distortion of the image pickup lens of the eighth embodiment.

The image pickup lens in the eighth embodiment, as shown in Table 35, satisfies conditions (1)~(9). Spherical aberration of the image pickup lens LA in the eighth embodiment is shown in FIG. 31, and the magnification chromatism is shown in FIG. 32. Aberration of astigmatism and distortion of the image pickup lens LA is shown in FIG. 33. According to the figures and table above, the image pickup lens LA in the eighth embodiment has the characters: 2ω=79.1°, TTL=3.860 mm, which achieves wide angle and miniaturization. Further, the brightness thereof is lower than 2.6, i.e., Fno=2.4. According to FIGS. 31~33, the image pickup lens in the eighth embodiment has very good optical performance.

The Ninth Embodiment

Figure 34:
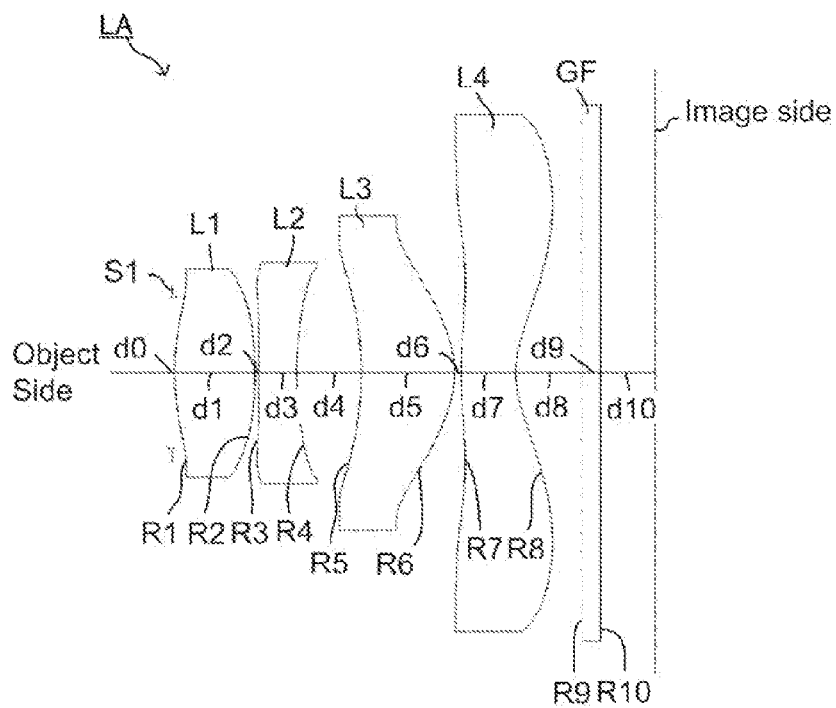
FIG. 34 is an illustration view of an image pickup lens of a ninth embodiment.

FIG. 34 is an illustration of the image pickup lens in accordance with a ninth embodiment of the present disclosure. Table 17 shows the curvature radiuses R of the object side surfaces and image side surfaces of the lenses L1~L4, center thickness of the lenses or distance d between lenses, index of refraction nd, the abbe coefficients vd. Table 18 shows the conic coefficients and aspherical coefficients.

TABLE 17

|  | R | d |  |  |  |  |
|---|---|---|---|---|---|---|
| S1 | ∞ | d0 = 0.020 |  |  |  |  |
| R1 | 1.884 | d1 = 0.609 | n1 | 1.544 | v1 | 56.1 |
| R2 | −2.913 | d2 = 0.027 |  |  |  |  |
| R3 | 22.381 | d3 = 0.290 | n2 | 1.640 | v2 | 23.4 |
| R4 | 2.651 | d4 = 0.492 |  |  |  |  |
| R5 | −2.301 | d5 = 0.708 | n3 | 1.544 | v3 | 56.1 |
| R6 | −0.723 | d6 = 0.050 |  |  |  |  |
| R7 | 3.058 | d7 = 0.415 | n4 | 1.544 | v4 | 56.1 |
| R8 | 0.670 | d8 = 0.500 |  |  |  |  |
| R9 | ∞ | d9 = 0.145 | n5 | 1.517 | v5 | 64.17 |
| R10 | ∞ | d10 = 0.415 |  |  |  |  |

TABLE 18

|  | k | A4 | A6 | A8 | A10 | A12 | A14 | A16 |
|---|---|---|---|---|---|---|---|---|
| R1 | −3.0911E+00 | −2.1818E−02 | 6.5784E−02 | −7.9545E−01 | 7.2885E−01 | 7.7923E−02 | −4.6395E+00 | 7.7985E+00 |
| R2 | 1.1285E+01 | −1.4933E−01 | −1.9987E−01 | 5.1070E−01 | −2.5887E−01 | 1.7891E−02 | 1.7694E+00 | −2.0900E+00 |
| R3 | −2.4229E+03 | −1.3154E−01 | −2.2411E−01 | 3.6392E−01 | 1.0928E+00 | −2.2096E−01 | −1.4695E+00 | 6.1381E−01 |
| R4 | 3.6037E+00 | 9.7945E−03 | −8.4344E−02 | −3.4616E−02 | 7.6908E−03 | 3.7881E−01 | 6.7224E−01 | −4.8899E−01 |
| R5 | −2.0303E+00 | 2.0456E−02 | −4.2783E−02 | 3.9805E−02 | −4.5521E−02 | 5.3099E−03 | 6.2706E−02 | 4.8790E−03 |
| R6 | −3.9413E+00 | −1.6748E−01 | 1.0292E−01 | 1.2809E−02 | 1.1239E−02 | 1.1549E−02 | 3.0423E−03 | −9.4369E−03 |
| R7 | −2.3728E+01 | −1.6578E−01 | 5.3751E−02 | 1.0580E−02 | −4.6401E−03 | −4.6253E−05 | −1.6473E−04 | 5.7312E−05 |
| R8 | −5.7857E+00 | −1.1912E−01 | 5.2128E−02 | −1.6498E−02 | 2.1121E−03 | 9.0927E−05 | 2.5222E−05 | −1.5873E−05 |

Figure 35:
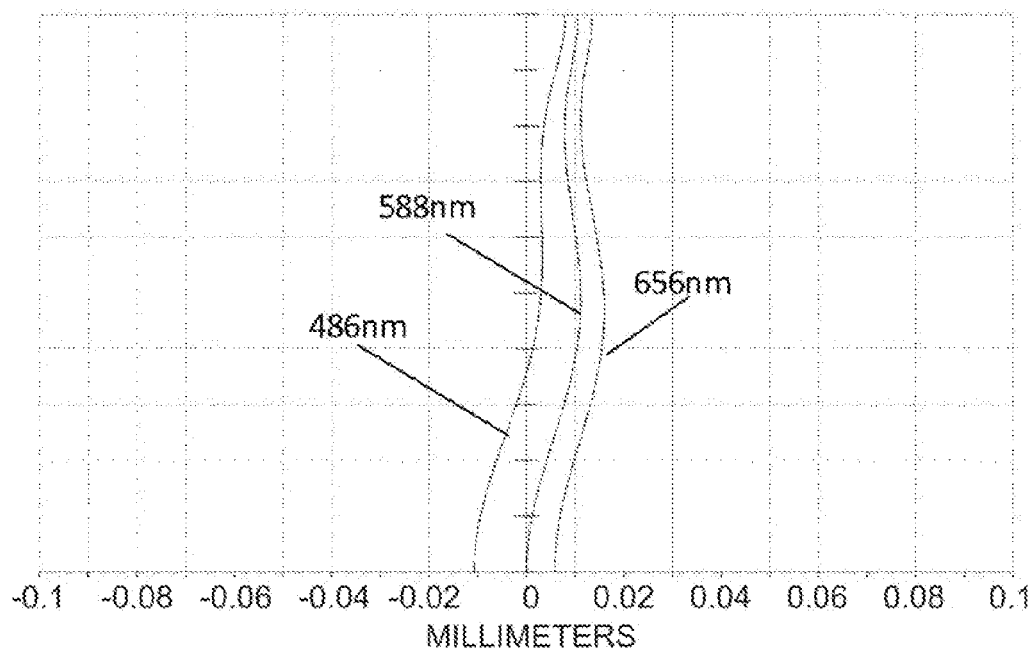
FIG. 35 is a spherical aberration diagram (Axial Chromatic Aberration) of the image pickup lens of the ninth embodiment.
Figure 36:
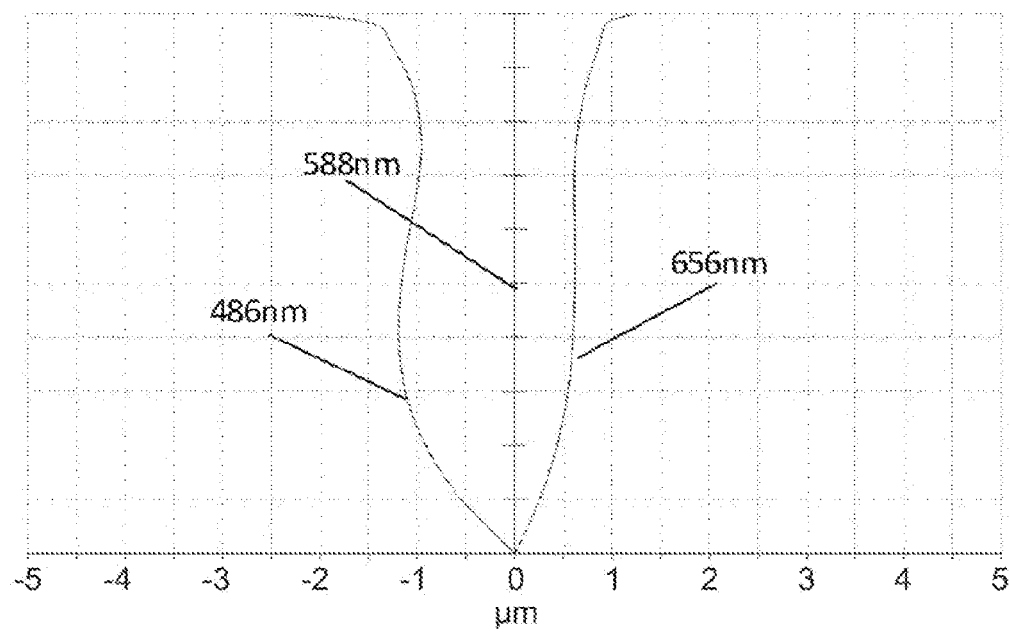
FIG. 36 is a magnification chromatic aberration diagram of the image pickup lens of the ninth embodiment.
Figure 37:
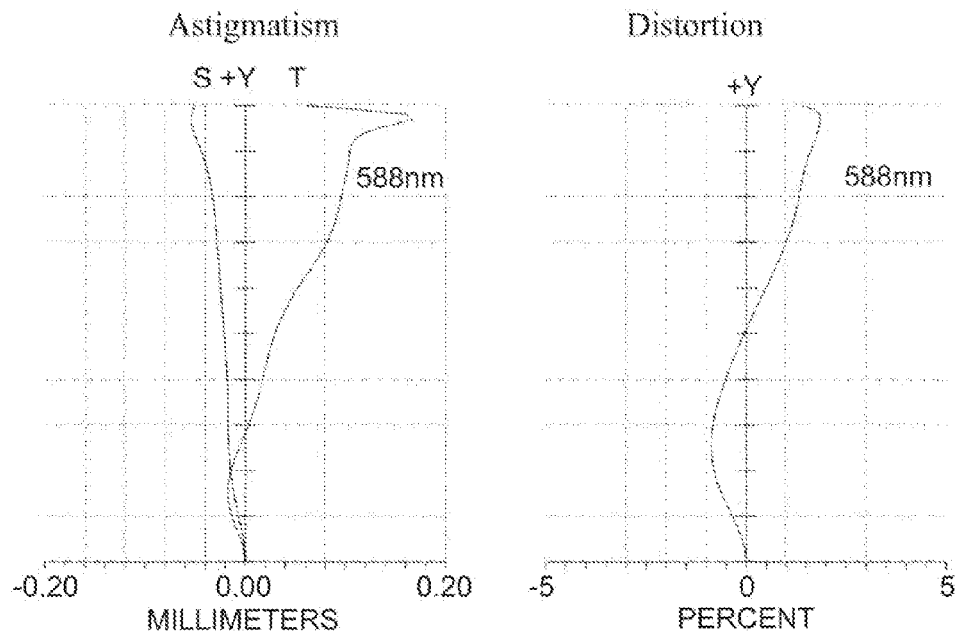
FIG. 37 is an aberration diagram of astigmatism and distortion of the image pickup lens of the ninth embodiment.

The image pickup lens in the ninth embodiment, as shown in Table 35, satisfies conditions (1)~(9). Spherical aberration of the image pickup lens LA in the ninth embodiment is shown in FIG. 35, and the magnification chromatism is shown in FIG. 36. Aberration of astigmatism and distortion of the image pickup lens LA is shown in FIG. 37. According to the figures and table above, the image pickup lens LA in the ninth embodiment has the characters: 2ω=79.1°, TTL=3.671 mm, which achieves wide angle and miniaturization. Further, the brightness thereof is lower than 2.6, i.e., Fno=2.4. According to FIGS. 35~37, the image pickup lens in the ninth embodiment has very good optical performance.

The Tenth Embodiment

Figure 38:
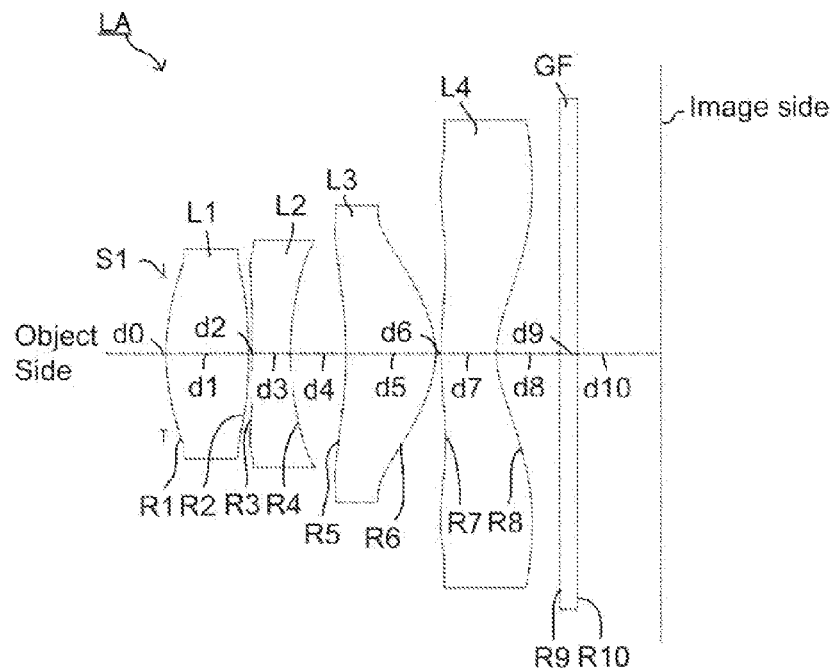
FIG. 38 is an illustration view of an image pickup lens of a tenth embodiment.

FIG. 38 is an illustration of the image pickup lens in accordance with a tenth embodiment of the present disclosure. Table 19 shows the curvature radiuses R of the object side surfaces and image side surfaces of the lenses L1~L4, center thickness of the lenses or distance d between lenses, index of refraction nd, the abbe coefficients vd. Table 20 shows the conic coefficients and aspherical coefficients.

TABLE 19

|  | R | d |  |  |  |  |
|---|---|---|---|---|---|---|
| S1 | ∞ | d0 = 0.020 |  |  |  |  |
| R1 | 1.781 | d1 = 0.652 | n1 | 1.544 | v1 | 56.1 |
| R2 | −4.265 | d2 = 0.030 |  |  |  |  |
| R3 | 63.040 | d3 = 0.301 | n2 | 1.640 | v2 | 23.4 |
| R4 | 2.230 | d4 = 0.440 |  |  |  |  |
| R5 | −2.871 | d5 = 0.707 | n3 | 1.544 | v3 | 56.1 |
| R6 | −0.698 | d6 = 0.044 |  |  |  |  |
| R7 | 3.058 | d7 = 0.436 | n4 | 1.544 | v4 | 56.1 |
| R8 | 0.683 | d8 = 0.500 |  |  |  |  |
| R9 | ∞ | d9 = 0.145 | n5 | 1.517 | v5 | 64.17 |
| R10 | ∞ | d10 = 0.658 |  |  |  |  |

TABLE 20

|  | k | A4 | A6 | A8 | A10 | A12 | A14 | A16 |
|---|---|---|---|---|---|---|---|---|
| R1 | −1.1338E+00 | −2.0298E−03 | 3.7309E−02 | −6.3322E−01 | 1.2098E+00 | 8.9511E−01 | −4.4208E+00 | 3.2410E+00 |
| R2 | 7.2347E+00 | −1.3899E−01 | −1.1024E−01 | 5.2977E−01 | −1.4203E−01 | 1.6069E−01 | 1.7526E+00 | −2.8122E+00 |
| R3 | −1.5577E+04 | −1.3982E−01 | −2.3612E−01 | 4.1425E−01 | 1.0633E+00 | −2.6968E−01 | −1.5055E+00 | 5.4081E−01 |
| R4 | 1.0515E+00 | −1.4994E−02 | −7.2696E−02 | 3.9821E−03 | −1.3669E−02 | 1.7734E−01 | 4.1262E−01 | −5.0777E−01 |
| R5 | −1.1869E+01 | 5.7596E−02 | −2.8251E−02 | 4.0325E−02 | −4.5657E−02 | 5.6535E−04 | 4.9191E−02 | −2.0571E−02 |
| R6 | −3.9550E+00 | −1.7090E−01 | 9.8548E−02 | 1.1510E−02 | 1.1389E−02 | 1.1843E−02 | 3.5815E−03 | −8.6519E−03 |
| R7 | −1.7503E+01 | −1.6481E−01 | 5.3335E−02 | 1.0743E−02 | −4.4460E−03 | 2.0778E−05 | −1.5704E−04 | 5.1253E−05 |
| R8 | −5.6657E+00 | −1.2141E−01 | 5.3418E−02 | −1.6052E−02 | 2.1492E−03 | 8.9859E−05 | 2.4207E−05 | −1.5973E−05 |

Figure 39:
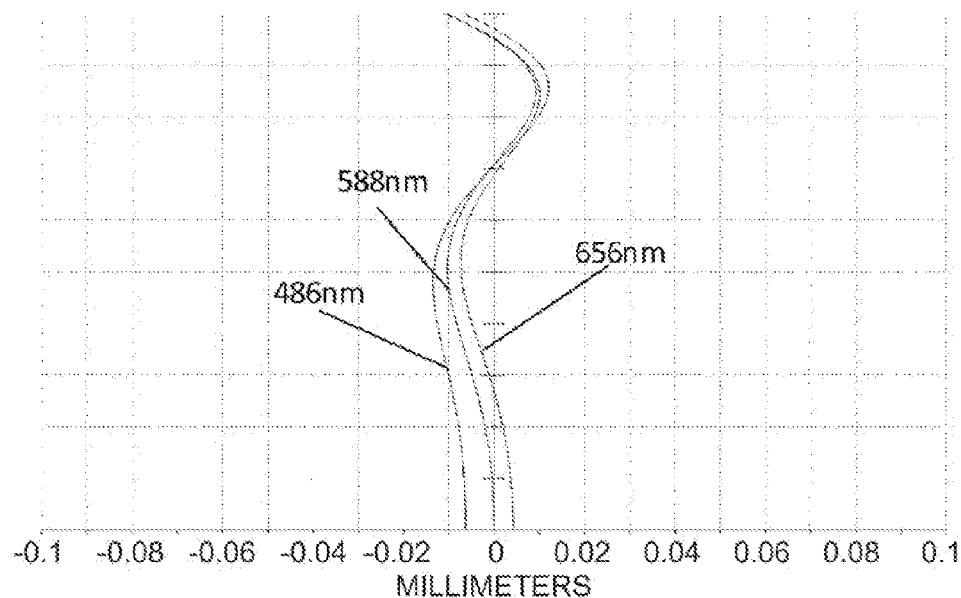
FIG. 39 is a spherical aberration diagram (Axial Chromatic Aberration) of the image pickup lens of the tenth embodiment.
Figure 40:
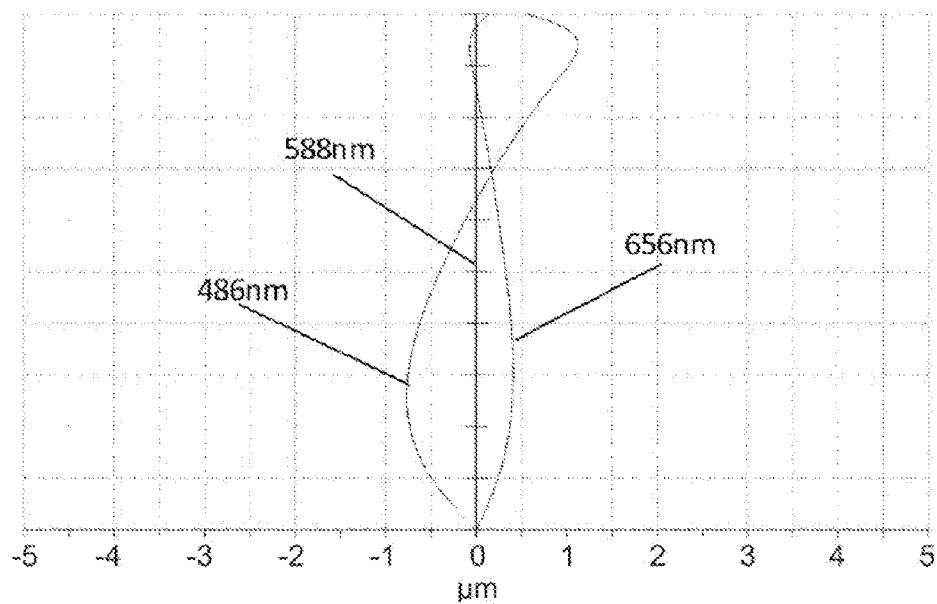
FIG. 40 is a magnification chromatic aberration diagram of the image pickup lens of the tenth embodiment.
Figure 41:
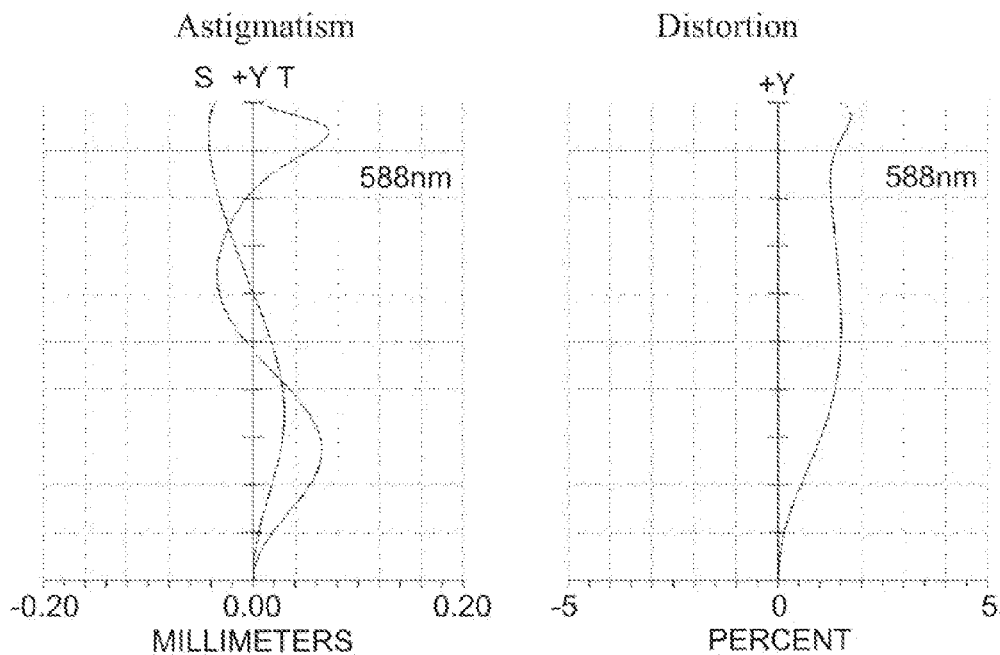
FIG. 41 is an aberration diagram of astigmatism and distortion of the image pickup lens of the tenth embodiment.

The image pickup lens in the tenth embodiment, as shown in Table 35, satisfies conditions (1)~(9). Spherical aberration of the image pickup lens LA in the tenth embodiment is shown in FIG. 39, and the magnification chromatism is shown in FIG. 40. Aberration of astigmatism and distortion of the image pickup lens LA is shown in FIG. 41. According to the figures and table above, the image pickup lens LA in the tenth embodiment has the characters: 2ω=75.7°, TTL=3.933 mm, which achieves wide angle and miniaturization. Further, the brightness thereof is lower than 2.6, i.e., Fno=2.4. According to FIGS. 39~41, the image pickup lens in the tenth embodiment has very good optical performance.

The Eleventh Embodiment

Figure 42:
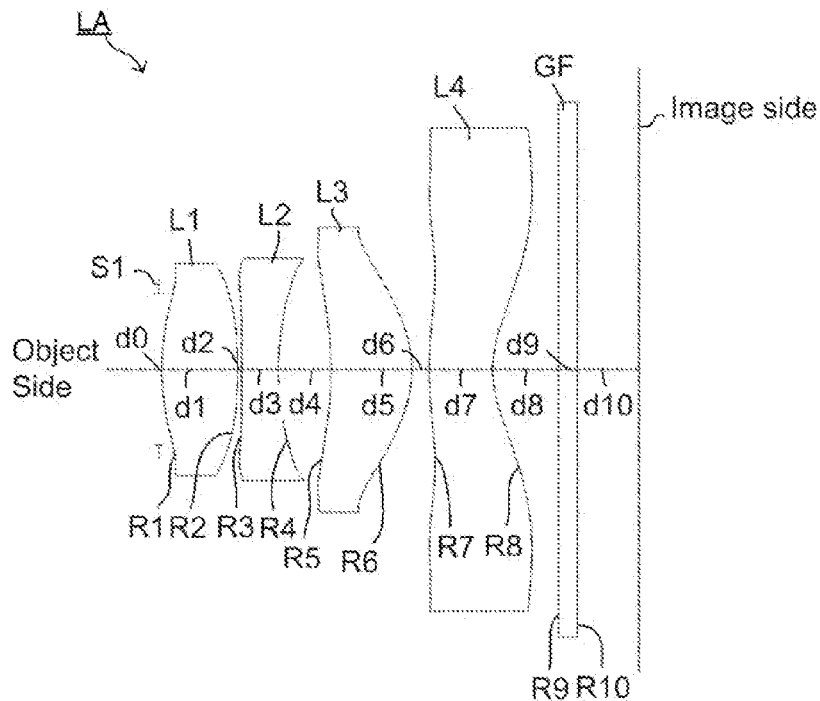
FIG. 42 is an illustration view of an image pickup lens of an eleventh embodiment.

FIG. 42 is an illustration of the image pickup lens in accordance with an eleventh embodiment of the present disclosure. Table 21 shows the curvature radiuses R of the object side surfaces and image side surfaces of the lenses L1~L4, center thickness of the lenses or distance d between lenses, index of refraction nd, the abbe coefficients vd. Table 22 shows the conic coefficients and aspherical coefficients.

TABLE 21

|  | R | d |  | nd |  | vd |
|---|---|---|---|---|---|---|
| S1 | ∞ | d0 = 0.020 |  |  |  |  |
| R1 | 1.739 | d1 = 0.578 | n1 | 1.544 | v1 | 56.1 |
| R2 | −3.421 | d2 = 0.030 |  |  |  |  |
| R3 | 42.101 | d3 = 0.280 | n2 | 1.640 | v2 | 23.4 |
| R4 | 2.137 | d4 = 0.399 |  |  |  |  |
| R5 | −2.426 | d5 = 0.616 | n3 | 1.544 | v3 | 56.1 |
| R6 | −0.784 | d6 = 0.130 |  |  |  |  |
| R7 | 2.503 | d7 = 0.481 | n4 | 1.544 | v4 | 56.1 |
| R8 | 0.707 | d8 = 0.500 |  |  |  |  |
| R9 | ∞ | d9 = 0.145 | n5 | 1.517 | v5 | 64.17 |
| R10 | ∞ | d10 = 0.469 |  |  |  |  |

TABLE 22

|  | k | A4 | A6 | A8 | A10 | A12 | A14 | A16 |
|---|---|---|---|---|---|---|---|---|
| R1 | −1.5995E+00 | −1.4350E−02 | −3.2623E−02 | −6.4945E−01 | 1.2055E+00 | 7.8933E−01 | −4.9651E+00 | 1.0301E+00 |
| R2 | 1.1471E+01 | −1.3873E−01 | −2.0268E−01 | 4.9656E−01 | −2.1564E−01 | −1.5247E−03 | 1.6149E+00 | −2.8500E+00 |
| R3 | −2.1884E+04 | −1.2486E−01 | −2.5105E−01 | 3.5811E−01 | 1.0499E+00 | −2.2498E−01 | −1.3779E+00 | 5.5578E−01 |
| R4 | 1.0790E+00 | −1.4837E−02 | −5.7912E−02 | 4.9757E−02 | −3.3677E−02 | 2.0173E−01 | 4.8364E−01 | −4.0354E−01 |
| R5 | −1.1088E+01 | 4.8757E−02 | −4.0940E−02 | 3.9154E−02 | −4.2638E−02 | 1.5226E−02 | 7.1731E−02 | −9.3214E−03 |
| R6 | −3.8371E+00 | −1.6673E−01 | 1.0314E−01 | 1.5468E−02 | 1.3781E−02 | 1.3121E−02 | 4.5939E−03 | −7.5833E−03 |
| R7 | −2.0926E+01 | −1.6515E−01 | 5.3335E−02 | 1.0617E−02 | −4.3870E−03 | 6.7002E−05 | −1.5374E−04 | 3.5000E−05 |
| R8 | −5.0432E+00 | −1.2367E−01 | 5.3244E−02 | −1.5985E−02 | 2.1766E−03 | 9.0310E−05 | 2.4372E−05 | −1.5840E−05 |

Figure 43:
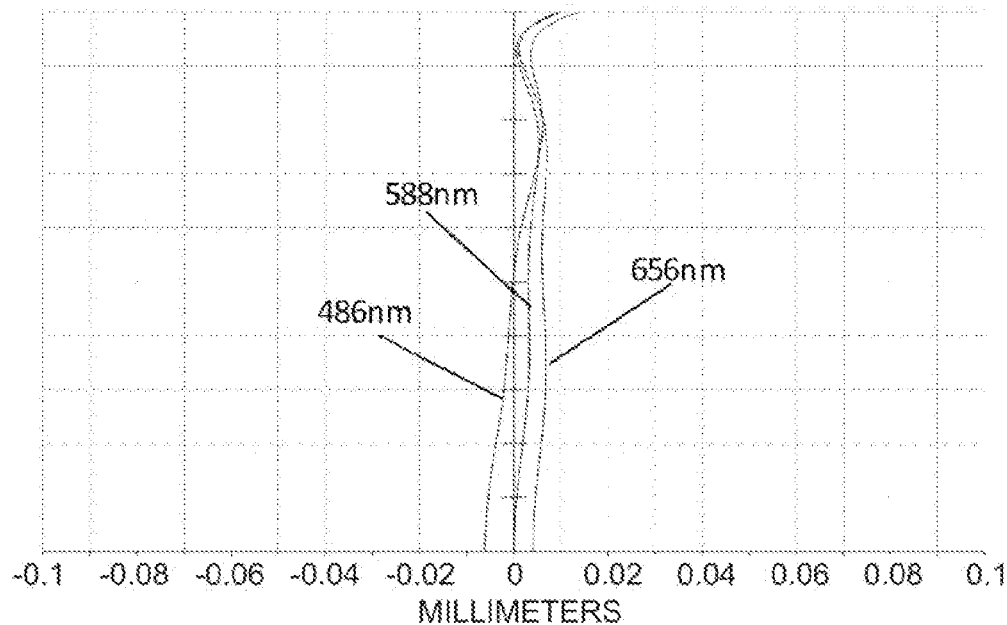
FIG. 43 is a spherical aberration diagram (Axial Chromatic Aberration) of the image pickup lens of the eleventh embodiment.
Figure 44:
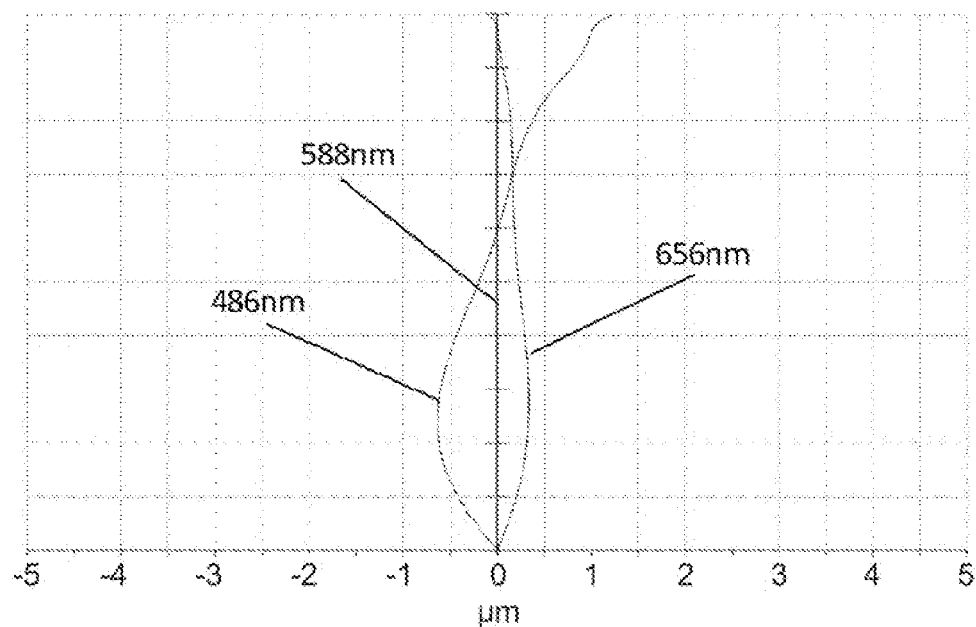
FIG. 44 is a magnification chromatic aberration diagram of the image pickup lens of the eleventh embodiment.
Figure 45:
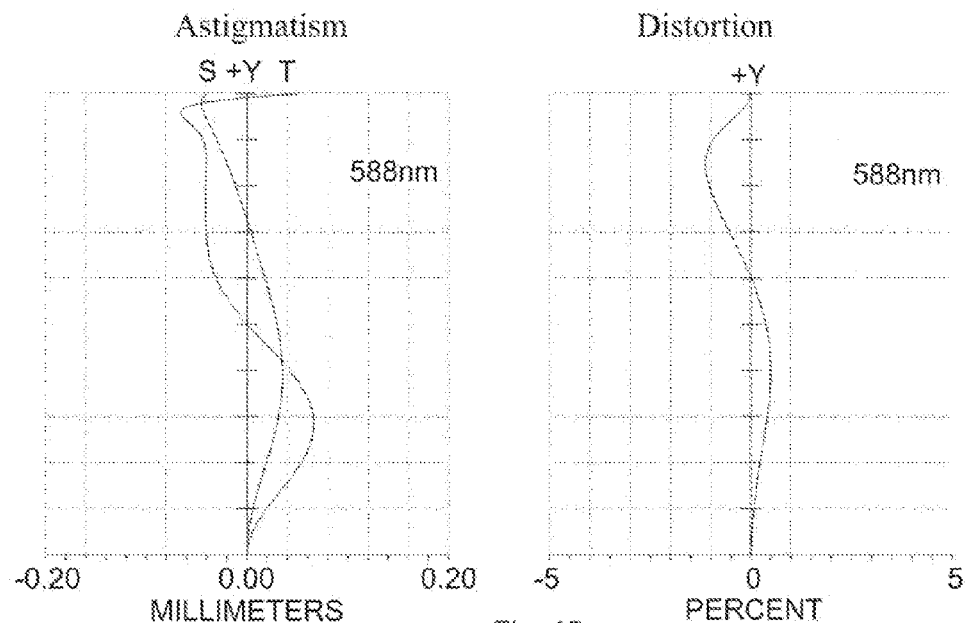
FIG. 45 is an aberration diagram of astigmatism and distortion of the image pickup lens of the eleventh embodiment.

The image pickup lens in the eleventh embodiment, as shown in Table 35, satisfies conditions (1)~(9). Spherical aberration of the image pickup lens LA in the eleventh embodiment is shown in FIG. 43, and the magnification chromatism is shown in FIG. 44. Aberration of astigmatism and distortion of the image pickup lens LA is shown in FIG. 45. According to the figures and table above, the image pickup lens LA in the eleventh embodiment has the characters: 2ω=79.4°, TTL=3.648 mm, which achieves wide angle and miniaturization. Further, the brightness thereof is lower than 2.6, i.e., Fno=2.4. According to FIGS. 43~45, the image pickup lens in the eleventh embodiment has very good optical performance.

The Twelfth Embodiment

Figure 46:
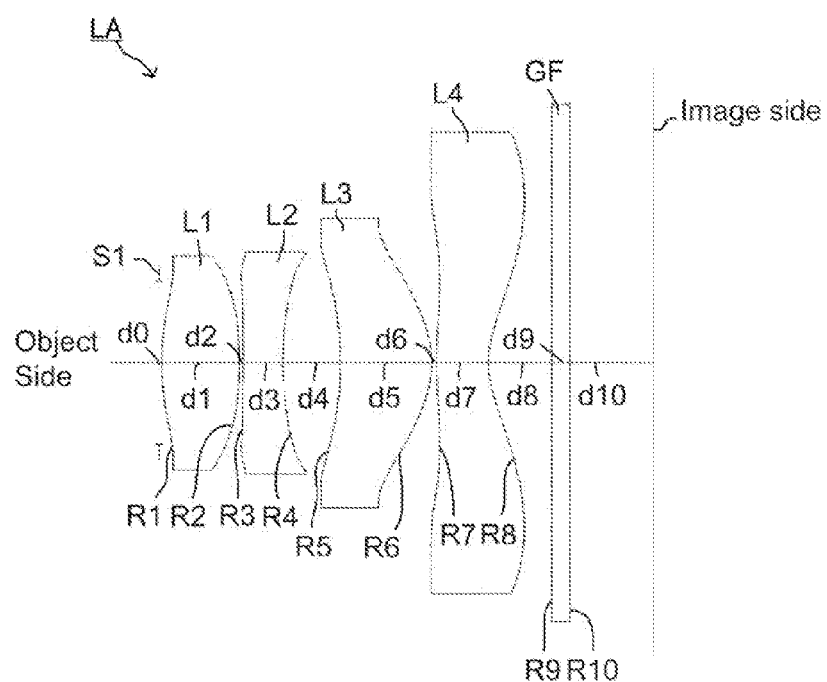
FIG. 46 is an illustration view of an image pickup lens of a twelfth embodiment.

FIG. 46 is an illustration of the image pickup lens in accordance with a twelfth embodiment of the present disclosure. Table 23 shows the curvature radiuses R of the object side surfaces and image side surfaces of the lenses L1~L4, center thickness of the lenses or distance d between lenses, index of refraction nd, the abbe coefficients vd. Table 24 shows the conic coefficients and aspherical coefficients.

TABLE 23

|  | R | d |  | nd |  | vd |
|---|---|---|---|---|---|---|
| S1 | ∞ | d0 = 0.020 |  |  |  |  |
| R1 | 1.907 | d1 = 0.615 | n1 | 1.544 | v1 | 56.1 |
| R2 | −3.005 | d2 = 0.030 |  |  |  |  |
| R3 | 44.527 | d3 = 0.312 | n2 | 1.640 | v2 | 23.4 |
| R4 | 2.604 | d4 = 0.458 |  |  |  |  |
| R5 | −2.273 | d5 = 0.721 | n3 | 1.544 | v3 | 56.1 |
| R6 | −0.720 | d6 = 0.037 |  |  |  |  |
| R7 | 3.253 | d7 = 0.410 | n4 | 1.544 | v4 | 56.1 |
| R8 | 0.667 | d8 = 0.500 |  |  |  |  |
| R9 | ∞ | d9 = 0.145 | n5 | 1.517 | v5 | 64.17 |
| R10 | ∞ | d10 = 0.660 |  |  |  |  |

TABLE 24

|  | k | A4 | A6 | A8 | A10 | A12 | A14 | A16 |
|---|---|---|---|---|---|---|---|---|
| R1 | −3.5502E+00 | −2.7703E−02 | 7.6333E−02 | −7.4852E−01 | 7.8541E−01 | 7.1117E−02 | −4.8856E+00 | 6.9807E+00 |
| R2 | 1.1120E+01 | −1.5525E−01 | −1.9979E−01 | 4.8276E−01 | −3.0004E−01 | −7.2413E−03 | 1.8043E+00 | −1.9168E+00 |
| R3 | 5.1746E+02 | −1.2763E−01 | −2.3577E−01 | 3.5991E−01 | 1.0887E+00 | −2.3595E−01 | −1.4988E+00 | 5.8373E−01 |
| R4 | 3.4201E+00 | 6.3415E−03 | −8.1341E−02 | 3.9342E−03 | 5.7523E−02 | 3.4774E−01 | 5.2321E−01 | −7.8971E−01 |
| R5 | −2.0067E+00 | 2.0476E−02 | −4.0863E−02 | 4.4406E−02 | −3.8687E−02 | 1.2079E−02 | 6.8840E−02 | 1.2404E−02 |
| R6 | −4.0735E+00 | −1.6372E−01 | 1.0379E−01 | 1.3098E−02 | 1.1445E−02 | 1.1864E−02 | 3.6275E−03 | −8.6228E−03 |
| R7 | −3.2293E+01 | −1.6604E−01 | 5.3920E−02 | 1.0757E−02 | −4.5386E−03 | −1.5473E−05 | −1.6298E−04 | 5.4241E−05 |
| R8 | −5.7166E+00 | −1.1865E−01 | 5.2228E−02 | −1.6476E−02 | 2.1120E−03 | 8.8173E−05 | 2.4441E−05 | −1.5911E−05 |

Figure 47:
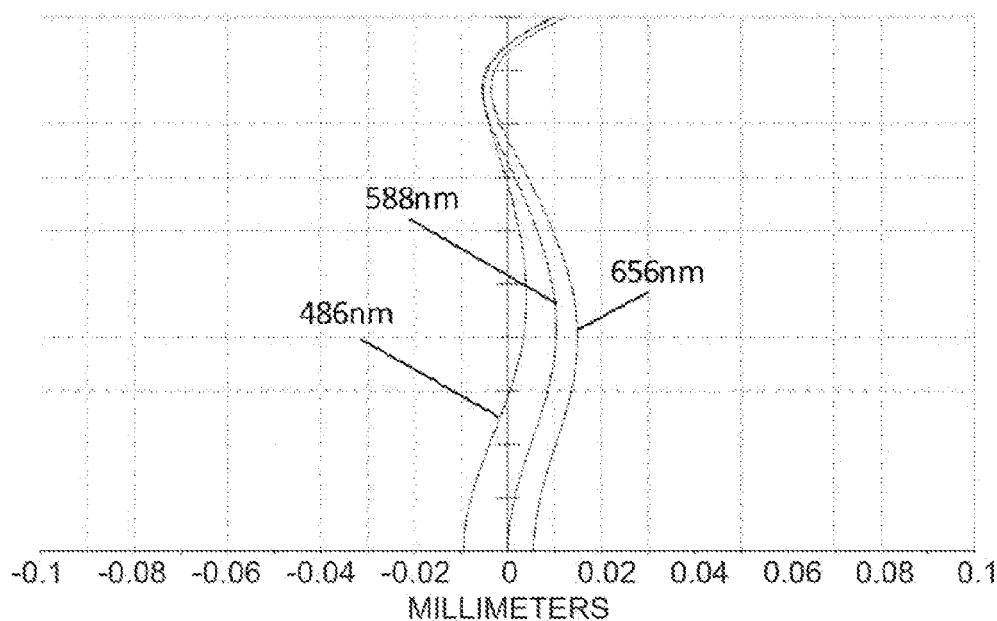
FIG. 47 is a spherical aberration diagram (Axial Chromatic Aberration) of the image pickup lens of the twelfth embodiment.
Figure 48:
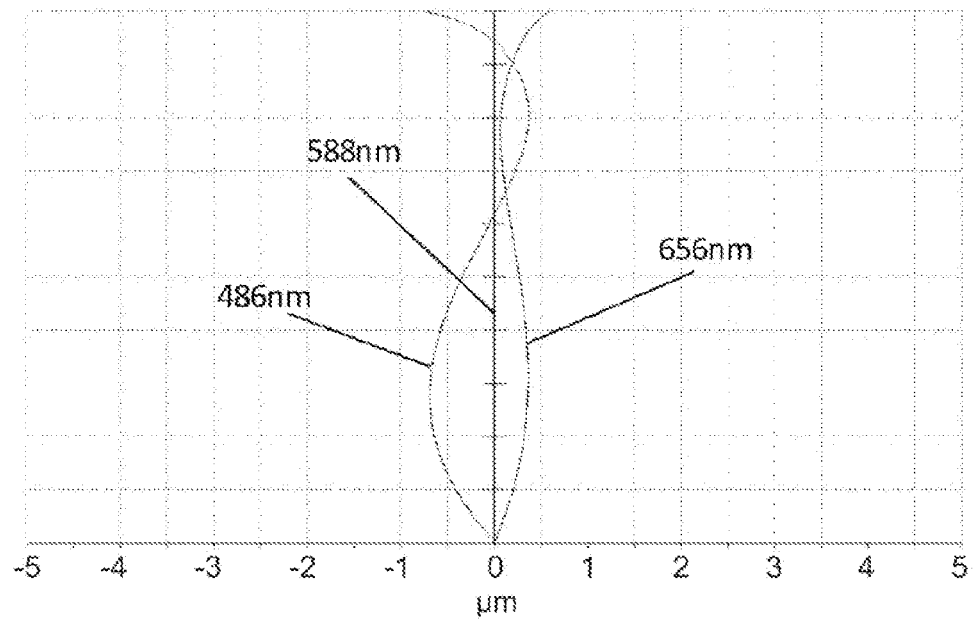
FIG. 48 is a magnification chromatic aberration diagram of the image pickup lens of the twelfth embodiment.
Figure 49:
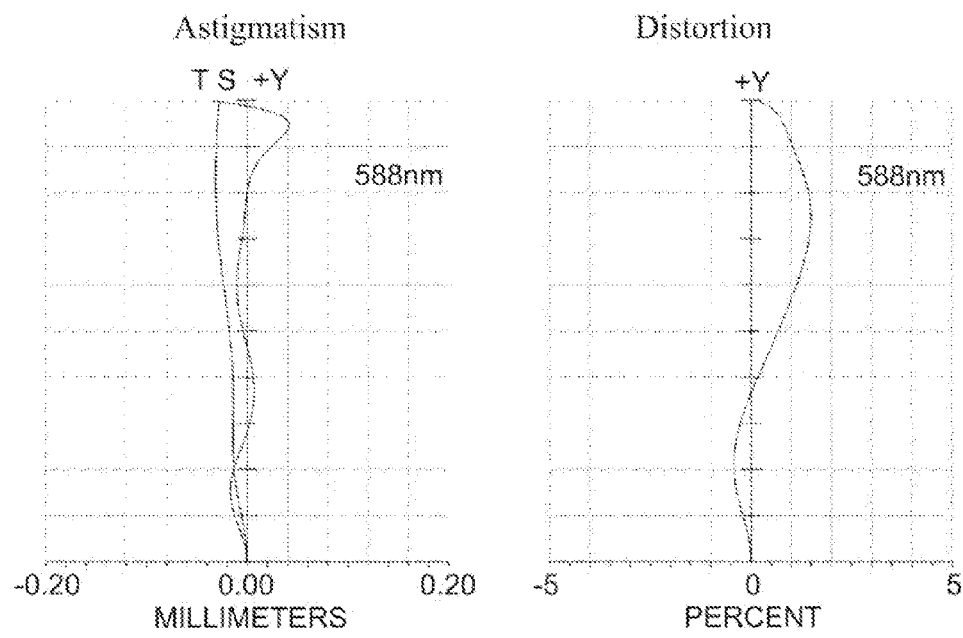
FIG. 49 is an aberration diagram of astigmatism and distortion of the image pickup lens of the twelfth embodiment.

The image pickup lens in the twelfth embodiment, as shown in Table 35, satisfies conditions (1)~(9). Spherical aberration of the image pickup lens LA in the twelfth embodiment is shown in FIG. 47, and the magnification chromatism is shown in FIG. 48. Aberration of astigmatism and distortion of the image pickup lens LA is shown in FIG. 49. According to the figures and table above, the image pickup lens LA in the twelfth embodiment has the characters: $2\omega=73.5°$, TTL=3.908 mm, which achieves wide angle and miniaturization. Further, the brightness thereof is lower than 2.6, i.e., Fno=2.4. According to FIGS. 47~49, the image pickup lens in the twelfth embodiment has very good optical performance.

The Thirteenth Embodiment

Figure 50:
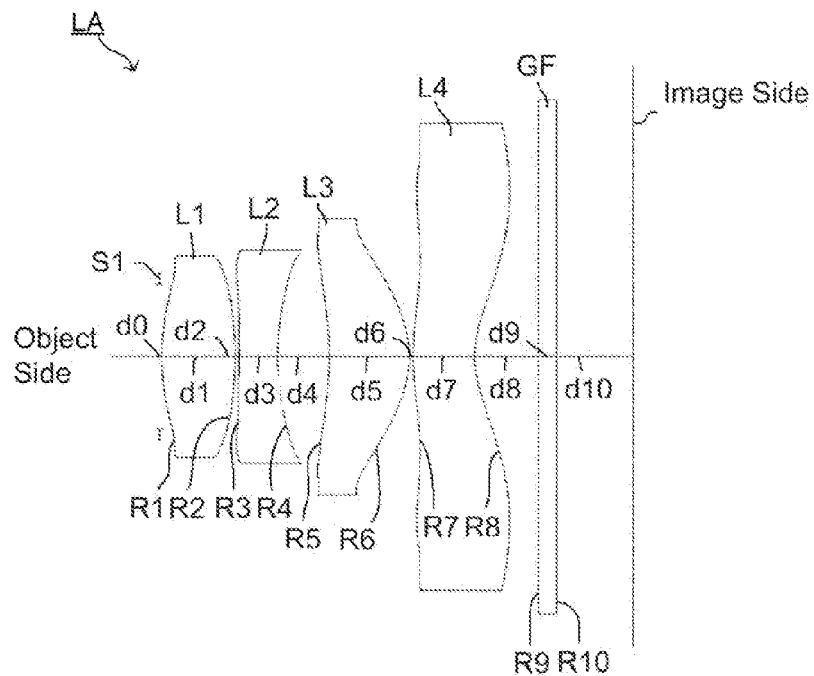
FIG. 50 is an illustration view of an image pickup lens of a thirteenth embodiment.

FIG. 50 is an illustration of the image pickup lens in accordance with a thirteenth embodiment of the present disclosure. Table 25 shows the curvature radiuses R of the object side surfaces and image side surfaces of the lenses L1~L4, center thickness of the lenses or distance d between lenses, index of refraction nd, the abbe coefficients vd. Table 26 shows the conic coefficients and aspherical coefficients.

TABLE 25

| | R | d | | nd | | vd |
|---|---|---|---|---|---|---|
| S1 | ∞ | d0 = 0.020 | | | | |
| R1 | 1.799 | d1 = 0.575 | n1 | 1.544 | v1 | 56.1 |
| R2 | −3.531 | d2 = 0.033 | | | | |
| R3 | 83.283 | d3 = 0.305 | n2 | 1.640 | v2 | 23.4 |
| R4 | 2.111 | d4 = 0.403 | | | | |
| R5 | −2.533 | d5 = 0.631 | n3 | 1.544 | v3 | 56.1 |
| R6 | −0.787 | d6 = 0.030 | | | | |
| R7 | 1.984 | d7 = 0.484 | n4 | 1.544 | v4 | 56.1 |
| R8 | 0.716 | d8 = 0.500 | | | | |
| R9 | ∞ | d9 = 0.145 | n5 | 1.517 | v5 | 64.17 |
| R10 | ∞ | d10 = 0.602 | | | | |

TABLE 26

| | k | A4 | A6 | A8 | A10 | A12 | A14 | A16 |
|---|---|---|---|---|---|---|---|---|
| R1 | −1.3701E+00 | −9.6451E−03 | −1.7702E−02 | −6.3917E−01 | 1.1902E+00 | 7.2645E−01 | −5.1020E+00 | 7.8654E−01 |
| R2 | 1.1218E+01 | −1.1862E−01 | −1.8785E−01 | 4.8711E−01 | −2.2807E−01 | −1.1381E−02 | 1.6102E+00 | −2.8439E+00 |
| R3 | −2.5835E+04 | −1.2468E−01 | −2.5230E−01 | 3.5929E−01 | 1.0500E+00 | −2.2691E−01 | −1.3813E+00 | 5.5242E−01 |
| R4 | 7.7010E−01 | −2.0185E−02 | −6.3986E−02 | 4.2197E−01 | −4.2800E−02 | 1.8948E−01 | 4.7268E−01 | −4.1040E−01 |
| R5 | −1.4336E+01 | 5.5306E−02 | −3.8118E−02 | 3.9628E−02 | −4.3861E−02 | 1.1826E−02 | 6.5468E−02 | −1.8580E−02 |
| R6 | −3.6696E+00 | −1.7076E−01 | 1.0145E−01 | 1.5166E−02 | 1.4083E−02 | 1.3744E−02 | 5.4399E−03 | −6.5173E−03 |
| R7 | −1.8813E+01 | −1.6461E−01 | 5.3415E−02 | 1.0639E−02 | −4.3747E−03 | 7.4438E−05 | −1.4922E−04 | 3.7815E−05 |
| R8 | −5.5307E+00 | −1.2442E−01 | 5.3195E−02 | −1.5994E−02 | 2.1735E−03 | 8.8963E−05 | 2.3798E−05 | −1.6085E−05 |

Figure 51:
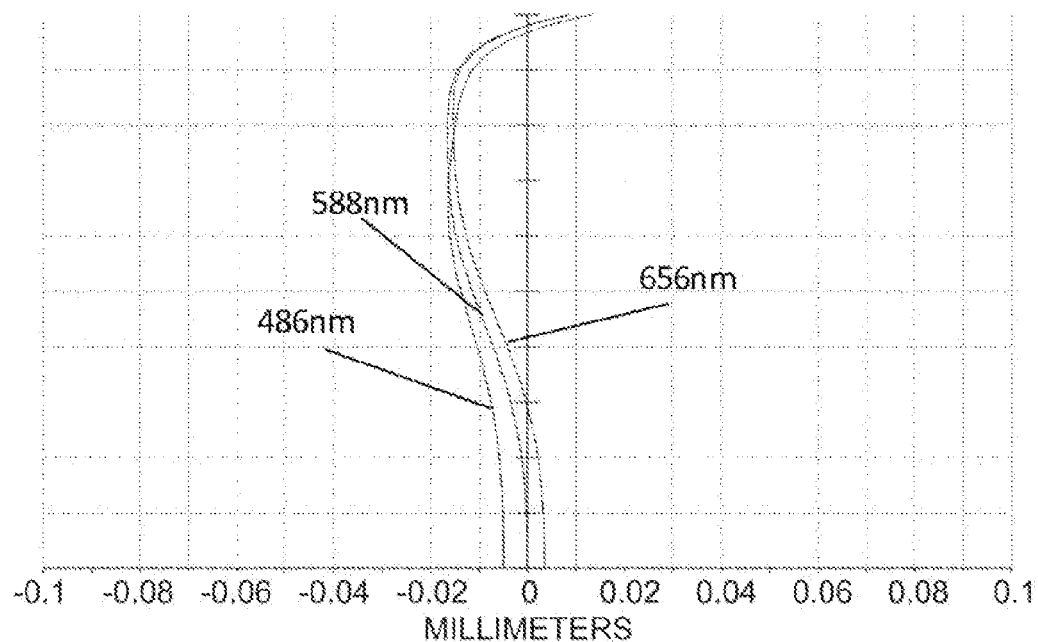
FIG. 51 is a spherical aberration diagram (Axial Chromatic Aberration) of the image pickup lens of the thirteenth embodiment.
Figure 52:
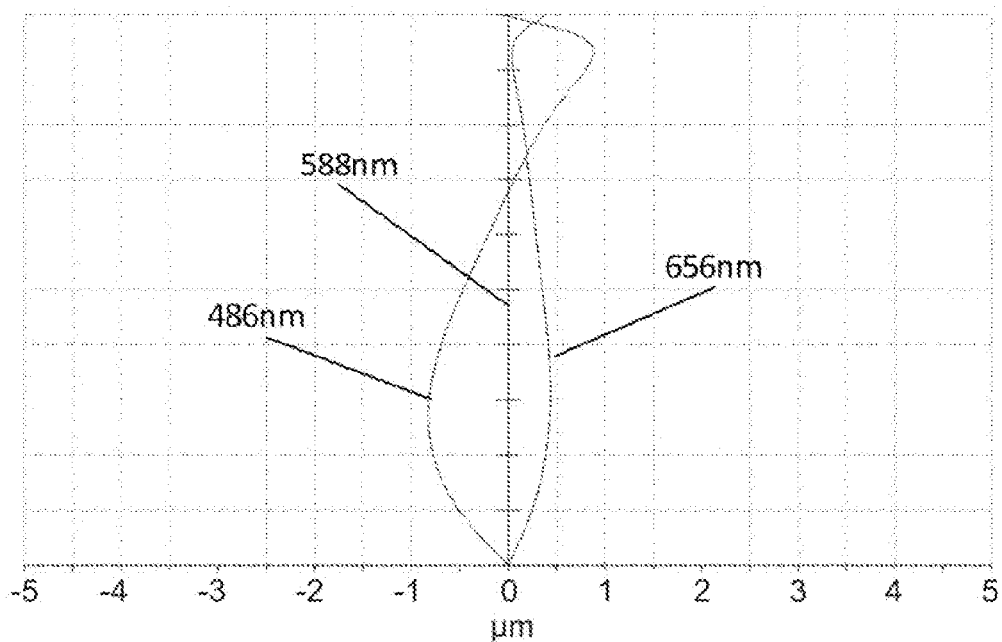
FIG. 52 is a magnification chromatic aberration diagram of the image pickup lens of the thirteenth embodiment.
Figure 53:
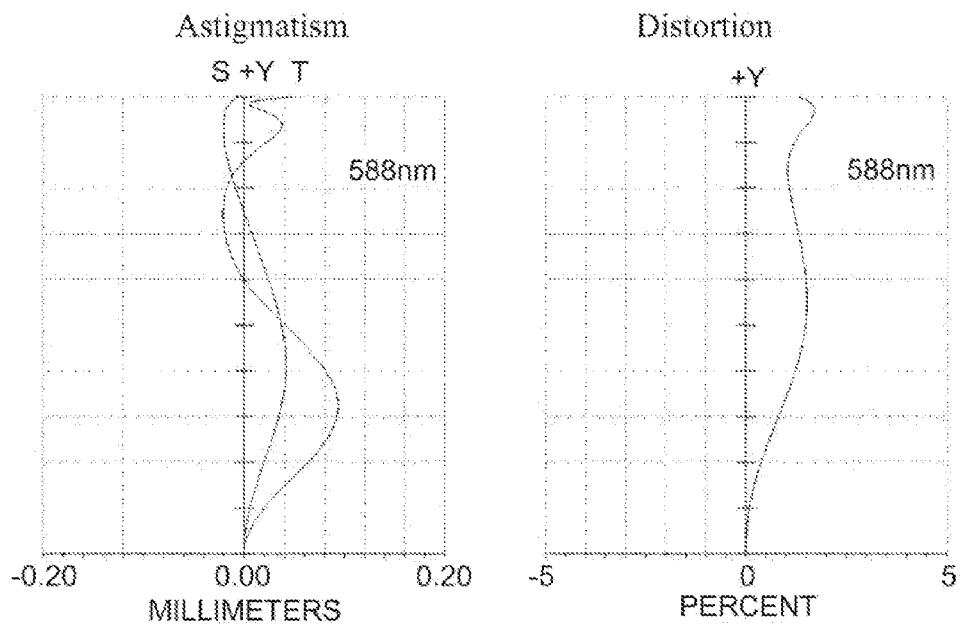
FIG. 53 is an aberration diagram of astigmatism and distortion of the image pickup lens of the thirteenth embodiment.

The image pickup lens in the thirteenth embodiment, as shown in Table 35, satisfies conditions (1)~(9). Spherical aberration of the image pickup lens LA in the thirteenth embodiment is shown in FIG. 51, and the magnification chromatism is shown in FIG. 52. Aberration of astigmatism and distortion of the image pickup lens LA is shown in FIG. 53. According to the figures and table above, the image pickup lens LA in the thirteenth embodiment has the characters: $2\omega=79.4°$, TTL=3.728 mm, which achieves wide angle and miniaturization. Further, the brightness thereof is lower than 2.6, i.e., Fno=2.4. According to FIGS. 51~53, the image pickup lens in the thirteenth embodiment has very good optical performance.

The Fourteenth Embodiment

Figure 54:
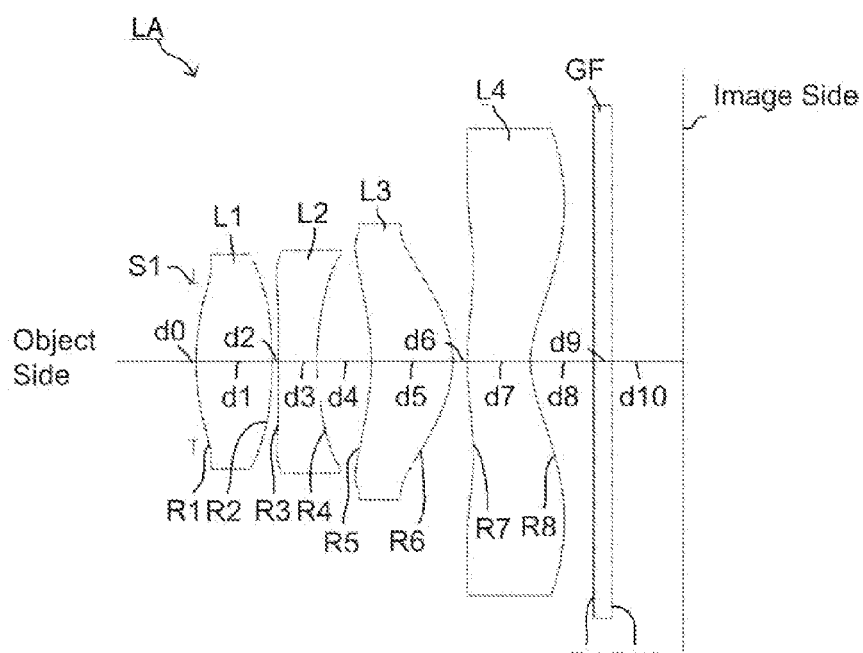
FIG. 54 is an illustration view of an image pickup lens of a fourteenth embodiment.

FIG. 54 is an illustration of the image pickup lens in accordance with a fourteenth embodiment of the present disclosure. Table 27 shows the curvature radiuses R of the object side surfaces and image side surfaces of the lenses L1~L4, center thickness of the lenses or distance d between lenses, index of refraction nd, the abbe coefficients vd. Table 28 shows the conic coefficients and aspherical coefficients.

TABLE 27

| | R | d | | nd | | vd |
|---|---|---|---|---|---|---|
| S1 | ∞ | d0 = 0.020 | | | | |
| R1 | 1.748 | d1 = 0.602 | n1 | 1.544 | v1 | 56.1 |
| R2 | −3.569 | d2 = 0.052 | | | | |
| R3 | 30.502 | d3 = 0.304 | n2 | 1.640 | v2 | 23.4 |
| R4 | 2.162 | d4 = 0.432 | | | | |
| R5 | −1.690 | d5 = 0.643 | n3 | 1.544 | v3 | 56.1 |
| R6 | −0.732 | d6 = 0.118 | | | | |
| R7 | 2.518 | d7 = 0.499 | n4 | 1.544 | v4 | 56.1 |
| R8 | 0.709 | d8 = 0.500 | | | | |
| R9 | ∞ | d9 = 0.145 | n5 | 1.517 | v5 | 64.17 |
| R10 | ∞ | d10 = 0.562 | | | | |

TABLE 28

| | k | A4 | A6 | A8 | A10 | A12 | A14 | A16 |
|---|---|---|---|---|---|---|---|---|
| R1 | −1.5565E+00 | −1.4867E−02 | −3.9802E−02 | −6.3035E−01 | 1.2831E+00 | 9.5568E−01 | −4.6686E+00 | 1.4741E+00 |
| R2 | 1.0717E+01 | −1.3675E−01 | −2.0363E−01 | 5.0643E−01 | −1.8411E−01 | 3.9781E−02 | 1.7148E+00 | −2.6918E+00 |
| R3 | −1.2107E+04 | −1.2846E−01 | −2.5024E−01 | 3.5749E−01 | 1.0471E+00 | −2.2770E−01 | −1.3769E+00 | 5.6849E−01 |
| R4 | 1.1026E+00 | −1.3668E−02 | −6.3437E−02 | 1.9132E−02 | −3.7913E−02 | 2.1902E−01 | 5.0352E−01 | −4.0579E−01 |
| R5 | −1.1823E+01 | 4.4961E−02 | −4.3140E−02 | 4.1813E−02 | −3.7808E−02 | 1.8281E−02 | 7.0897E−02 | −1.3310E−02 |
| R6 | −3.7418E+00 | −1.6458E−01 | 1.0707E−01 | 1.7999E−02 | 1.4677E−02 | 1.2884E−02 | 3.6546E−03 | −8.7239E−03 |
| R7 | −1.7065E+01 | −1.6710E−01 | 5.2270E−02 | 1.0309E−02 | −4.4511E−03 | 6.3972E−05 | −1.4636E−04 | 4.1540E−05 |
| R8 | −5.6151E+00 | −1.2715E−01 | 5.3148E−02 | −1.6024E−02 | 2.1656E−03 | 8.6726E−05 | 2.3102E−05 | −1.6294E−05 |

Figure 55:
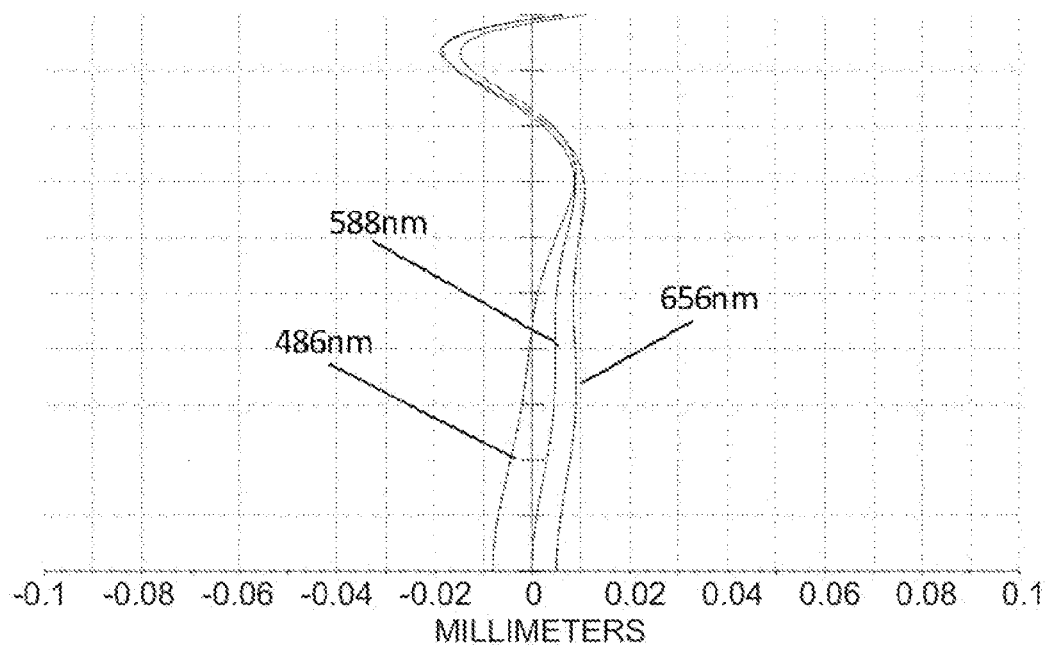
FIG. 55 is a spherical aberration diagram (Axial Chromatic Aberration) of the image pickup lens of the fourteenth embodiment.
Figure 56:
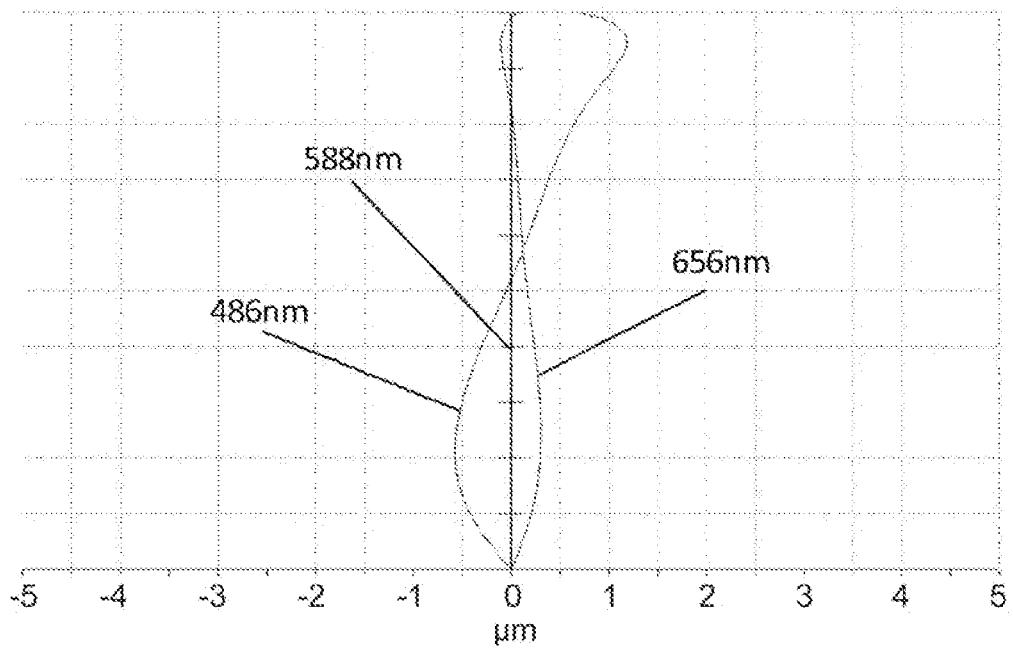
FIG. 56 is a magnification chromatic aberration diagram of the image pickup lens of the fourteenth embodiment.
Figure 57:
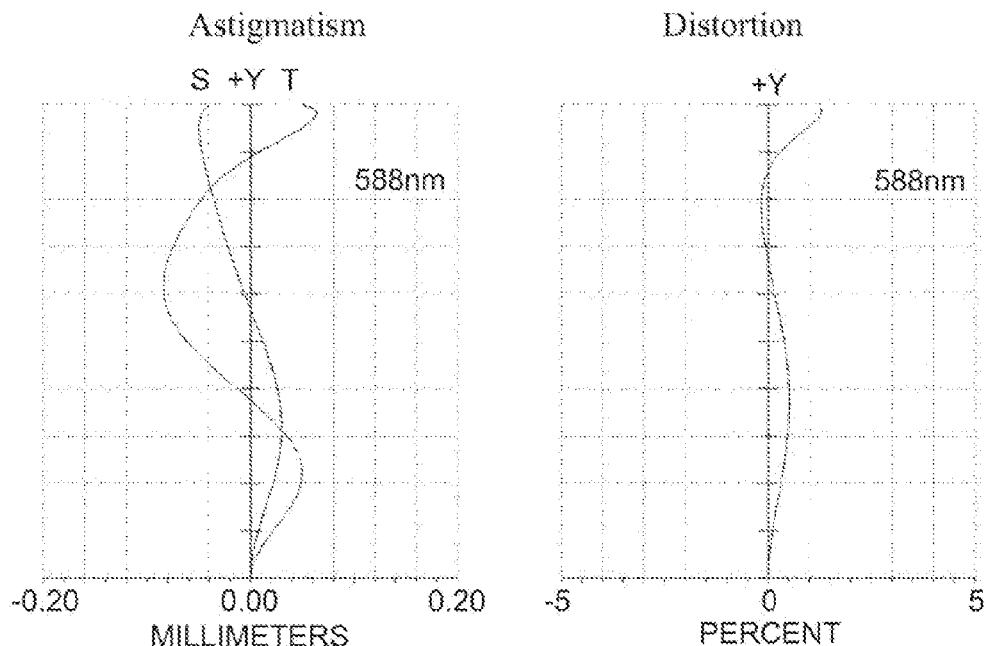
FIG. 57 is an aberration diagram of astigmatism and distortion of the image pickup lens of the fourteenth embodiment.

The image pickup lens in the fourteenth embodiment, as shown in Table 35, satisfies conditions (1)~(9). Spherical aberration of the image pickup lens LA in the fourteenth embodiment is shown in FIG. 55, and the magnification chromatism is shown in FIG. 56. Aberration of astigmatism and distortion of the image pickup lens LA is shown in FIG. 57. According to the figures and table above, the image pickup lens LA in the fourteenth embodiment has the characters: 2ω=74.3°, TTL=3.877 mm, which achieves wide angle and miniaturization. Further, the brightness thereof is lower than 2.6, i.e., Fno=2.4. According to FIGS. 55~57, the image pickup lens in the fourteenth embodiment has very good optical performance.

The Fifteenth Embodiment

Figure 58:
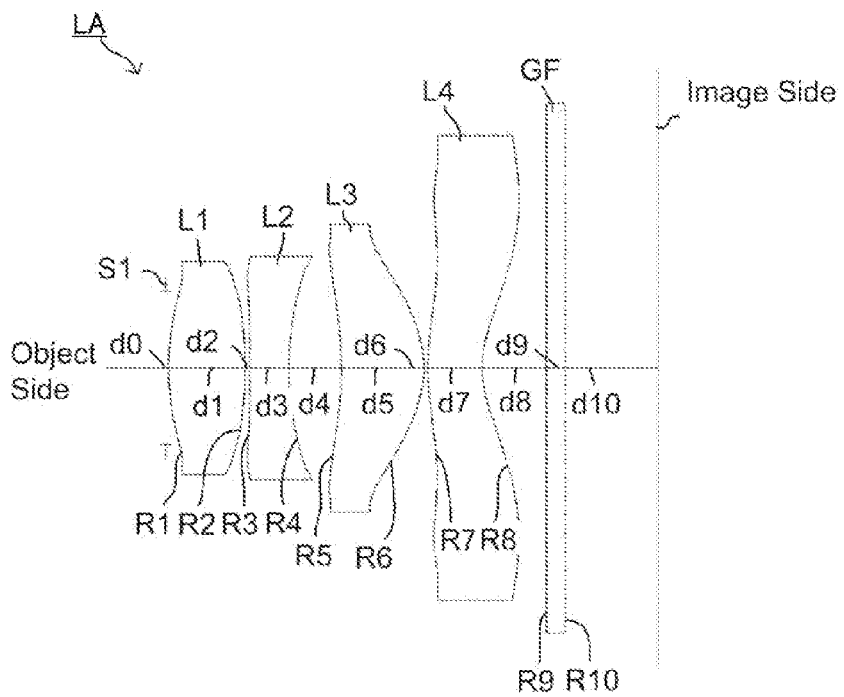
FIG. 58 is an illustration view of an image pickup lens of a fifteenth embodiment.

FIG. 58 is an illustration of the image pickup lens in accordance with n fifteenth embodiment of the present disclosure. Table 29 shows the curvature radiuses R of the object side surfaces and image side surfaces of the lenses L1~L4, center thickness of the lenses or distance d between lenses, index of refraction nd, the abbe coefficients vd. Table 30 shows the conic coefficients and aspherical coefficients.

TABLE 29

|     | R      | d           | nd |       | vd |       |
| --- | ------ | ----------- | -- | ----- | -- | ----- |
| S1  | ∞      | d0 = 0.020  |    |       |    |       |
| R1  | 1.840  | d1 = 0.590  | n1 | 1.544 | v1 | 56.1  |
| R2  | −3.710 | d2 = 0.038  |    |       |    |       |
| R3  | 45.048 | d3 = 0.300  | n2 | 1.640 | v2 | 23.4  |
| R4  | 2.189  | d4 = 0.406  |    |       |    |       |
| R5  | −2.507 | d5 = 0.636  | n3 | 1.544 | v3 | 56.1  |
| R6  | −0.797 | d6 = 0.030  |    |       |    |       |
| R7  | 1.730  | d7 = 0.418  | n4 | 1.544 | v4 | 56.1  |
| R8  | 0.692  | d8 = 0.500  |    |       |    |       |
| R9  | ∞      | d9 = 0.145  | n5 | 1.517 | v5 | 64.17 |
| R10 | ∞      | d10 = 0.711 |    |       |    |       |

TABLE 30

|    | k           | A4          | A6          | A8          | A10         | A12         | A14         | A16         |
| -- | ----------- | ----------- | ----------- | ----------- | ----------- | ----------- | ----------- | ----------- |
| R1 | −1.4846E+00 | −1.1595E−02 | −8.9084E−03 | −6.2142E−01 | 1.2196E+00  | 7.7992E−01  | −4.9867E+00 | 1.0565E+00  |
| R2 | 1.1363E+01  | −1.2364E−01 | −1.9346E−01 | 4.9046E−01  | −2.1289E−01 | 8.9673E−03  | 1.6245E+00  | −2.8472E+00 |
| R3 | −6.6410E+04 | −1.2711E−01 | −2.5502E−01 | 3.5461E−01  | 1.0437E+00  | −2.3338E−01 | −1.3864E+00 | 5.4871E−01  |
| R4 | 7.5229E−01  | −1.8565E−02 | −6.7085E−02 | 3.8713E−02  | −4.3852E−02 | 1.9030E−01  | 4.7465E−01  | −4.2037E−01 |
| R5 | −1.2976E+01 | 5.3900E−02  | −3.8646E−02 | 3.9439E−02  | −4.3553E−02 | 1.2221E−02  | 6.5480E−02  | −1.9208E−02 |
| R6 | −3.6261E+00 | −1.6745E−01 | 1.0253E−01  | 1.4388E−01  | 1.3091E−01  | 1.2981E−02  | 4.9770E−03  | −6.6523E−03 |
| R7 | −1.4491E+01 | −1.6725E−01 | 5.2957E−02  | 1.0489E−02  | −4.4200E−03 | 7.2899E−05  | −1.3888E−04 | 4.6084E−05  |
| R8 | −5.2252E+00 | −1.2610E−01 | 5.2928E−02  | −1.6059E−02 | 2.2041E−03  | 9.6753E−05  | 2.4161E−05  | −1.6521E−05 |

Figure 59:
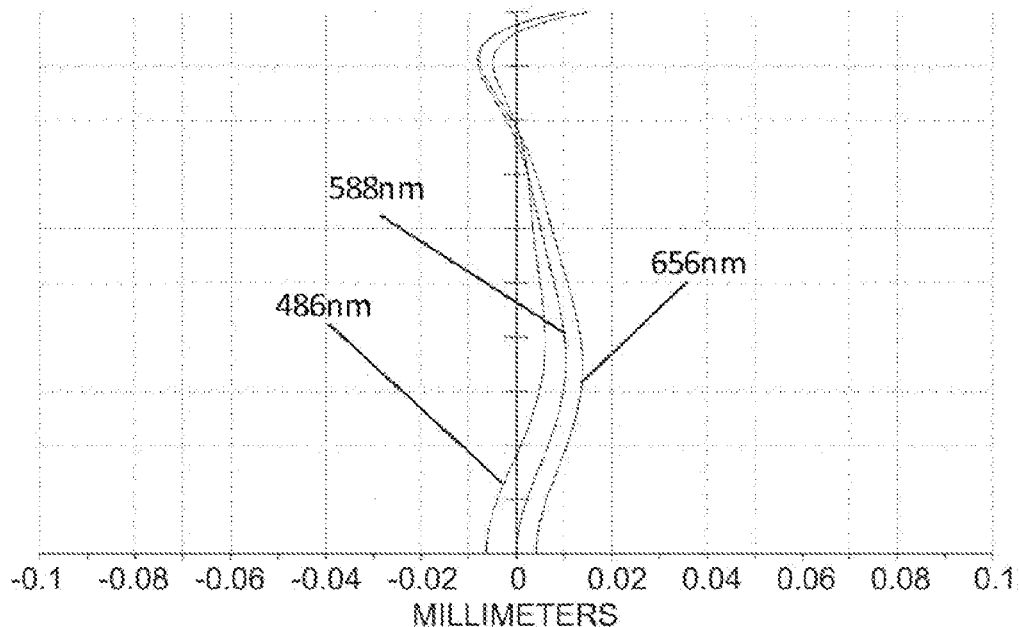
FIG. 59 is a spherical aberration diagram (Axial Chromatic Aberration) of the image pickup lens of the fifteenth embodiment.
Figure 60:
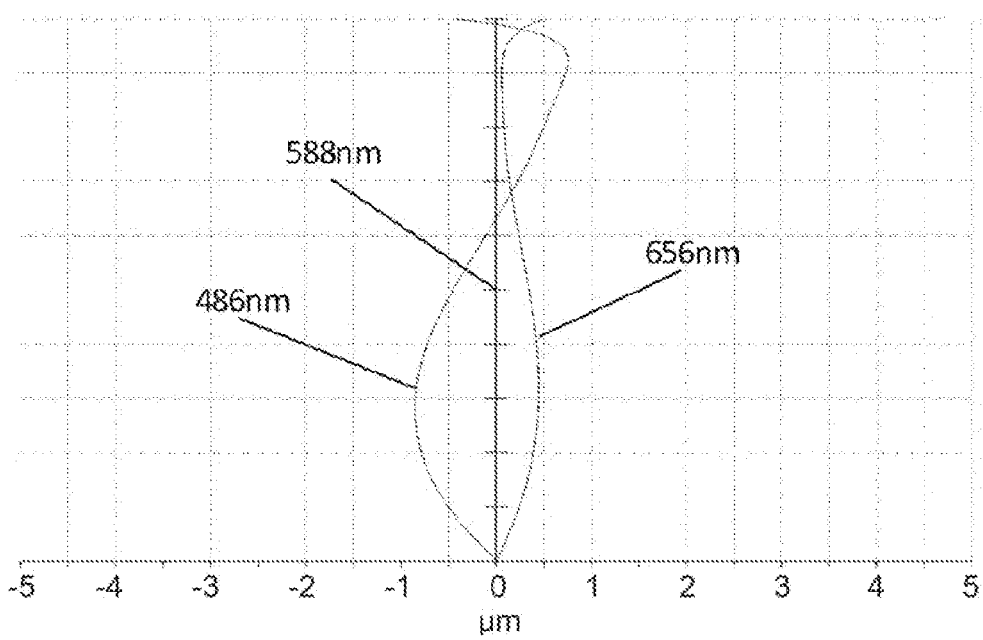
FIG. 60 is a magnification chromatic aberration diagram of the image pickup lens of the fifteenth embodiment.
Figure 61:
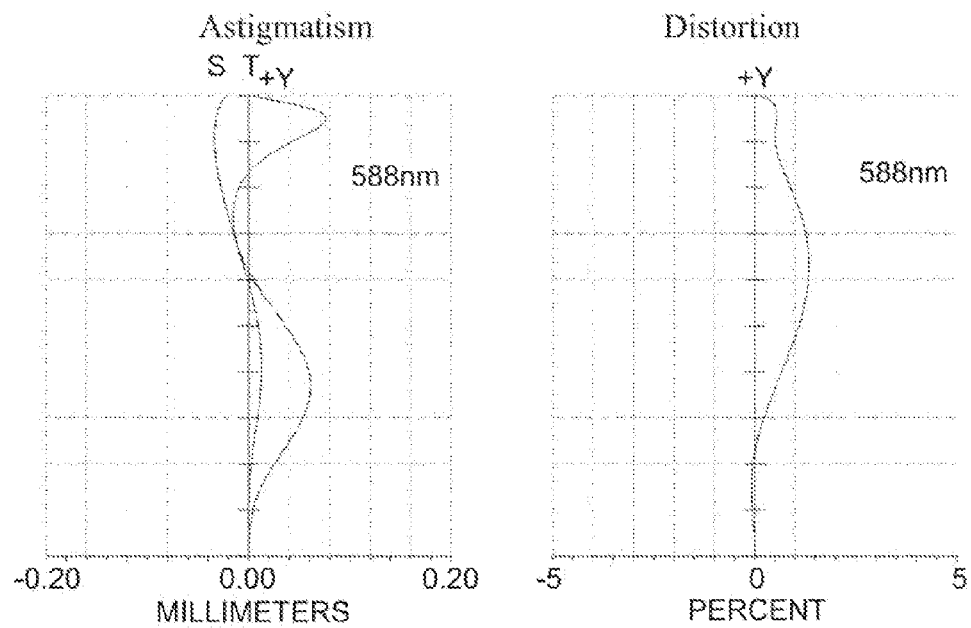
FIG. 61 is an aberration diagram of astigmatism and distortion of the image pickup lens of the fifteenth embodiment.

The image pickup lens in the fifteenth embodiment, as shown in Table 35, satisfies conditions (1)~(9). Spherical aberration of the image pickup lens LA in the fifteenth embodiment is shown in FIG. 59, and the magnification chromatism is shown in FIG. 60. Aberration of astigmatism and distortion of the image pickup lens LA is shown in FIG. 61. According to the figures and table above, the image pickup lens LA in the fifteenth embodiment has the characters: 2ω=78.3°, TTL=3.794 mm, which achieves wide angle and miniaturization. Further, the brightness thereof is lower than 2.6, i.e., Fno=2.4. According to FIGS. 59~61, the image pickup lens in the fifteenth embodiment has very good optical performance.

The Sixteenth Embodiment

Figure 62:
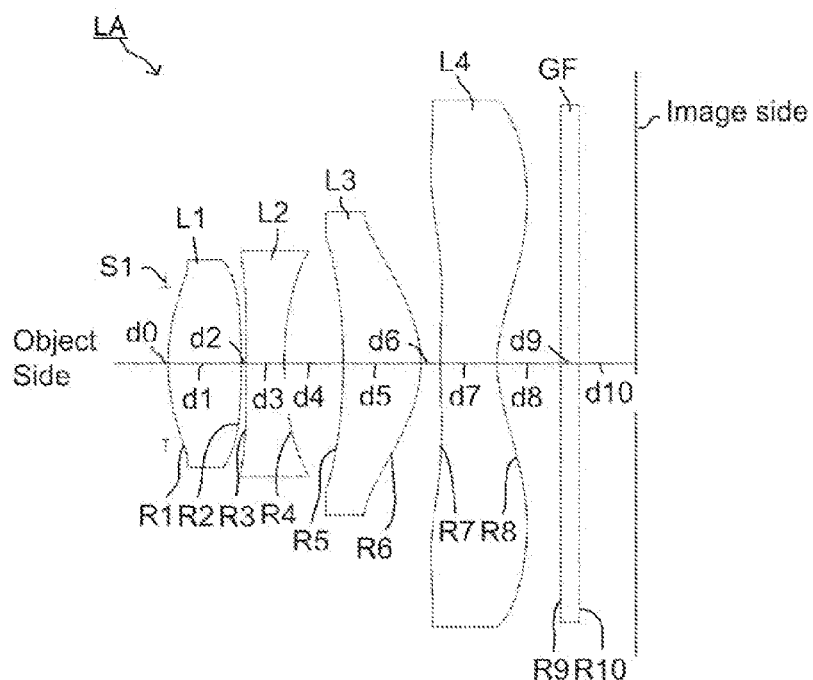
FIG. 62 is an illustration view of an image pickup lens of a sixteenth embodiment.

FIG. 62 is an illustration of the image pickup lens in accordance with a sixteenth embodiment of the present disclosure. Table 31 shows the curvature radiuses R of the object side surfaces and image side surfaces of the lenses L1~L4, center thickness of the lenses or distance d between lenses, index of refraction nd, the abbe coefficients vd. Table 32 shows the conic coefficients and aspherical coefficients.

TABLE 31

|     | R      | d           | nd |        | vd |       |
| --- | ------ | ----------- | -- | ------ | -- | ----- |
| S1  | ∞      | d0 = 0.020  |    |        |    |       |
| R1  | 1.569  | d1 = 0.574  | n1 | 1.544  | v1 | 56.1  |
| R2  | −6.639 | d2 = 0.038  |    |        |    |       |
| R3  | 32.148 | d3 = 0.300  | n2 | 1.6142 | v2 | 25.6  |
| R4  | 2.446  | d4 = 0.467  |    |        |    |       |
| R5  | −3.267 | d5 = 0.610  | n3 | 1.544  | v3 | 56.1  |
| R6  | −0.853 | d6 = 0.154  |    |        |    |       |
| R7  | 6.879  | d7 = 0.445  | n4 | 1.544  | v4 | 56.1  |
| R8  | 0.969  | d8 = 0.500  |    |        |    |       |
| R9  | ∞      | d9 = 0.145  | n5 | 1.517  | v5 | 64.17 |
| R10 | ∞      | d10 = 0.447 |    |        |    |       |

TABLE 32

|    | k           | A4          | A6          | A8          | A10         | A12         | A14         | A16         |
| -- | ----------- | ----------- | ----------- | ----------- | ----------- | ----------- | ----------- | ----------- |
| R1 | −1.8184E+00 | 1.1146E−02  | 1.5533E−01  | −7.9384E−01 | 4.5016E−01  | 8.4317E−01  | 8.5320E−01  | −3.1326E+00 |
| R2 | −1.0378E+01 | −8.8632E−02 | −3.0322E−01 | 3.1697E−01  | −1.4871E−01 | −3.4681E−01 | −3.6506E−01 | 9.7190E−01  |
| R3 | 7.4774E+02  | −7.2129E−02 | −1.6932E−01 | 2.3313E−02  | 5.6897E−01  | −6.4350E−01 | −2.4060E−01 | 6.2937E−01  |
| R4 | 4.6432E+00  | 4.2166E−02  | −1.6127E−01 | 1.0253E−01  | 7.1736E−02  | −4.2920E−02 | 5.1079E−02  | −1.4106E−01 |
| R5 | −8.8339E+00 | 4.0968E−02  | −5.4706E−02 | 3.5823E−02  | −6.6339E−02 | 2.1539E−02  | 5.7504E−02  | −5.5710E−02 |
| R6 | −3.7012E+00 | −1.1957E−01 | 1.0153E−01  | −6.4485E−03 | −3.0621E−03 | 2.8512E−03  | 6.5568E−04  | −7.5603E−04 |
| R7 | 1.2903E+01  | −1.6412E−01 | 5.8105E−02  | 6.7739E−03  | −7.6926E−03 | 1.3565E−03  | −3.1187E−05 | −1.2656E−05 |
| R8 | −5.8420E+00 | −1.2132E−01 | 5.4020E−02  | −1.8315E−02 | 3.9258E−03  | −3.7036E−04 | −1.1882E−05 | 2.6099E−06  |

Figure 63:
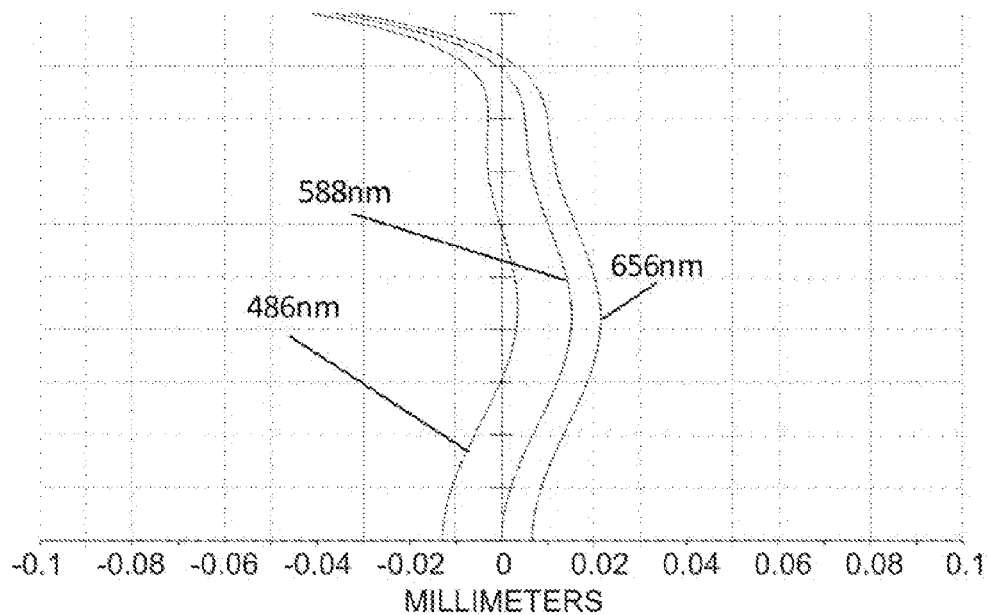
FIG. 63 is a spherical aberration diagram (Axial Chromatic Aberration) of the image pickup lens of the sixteenth embodiment.
Figure 64:
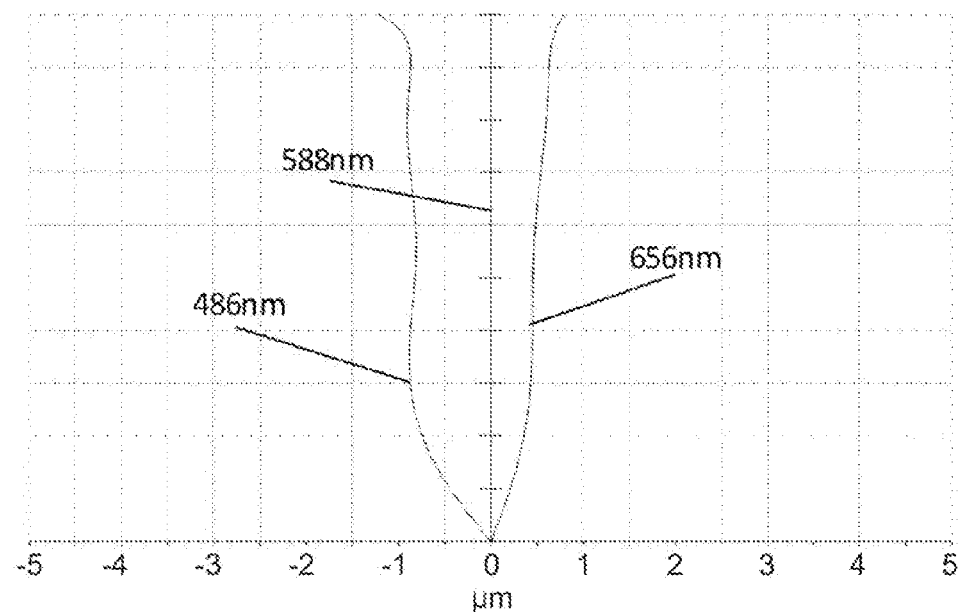
FIG. 64 is a magnification chromatic aberration diagram of the image pickup lens of the sixteenth embodiment.
Figure 65:
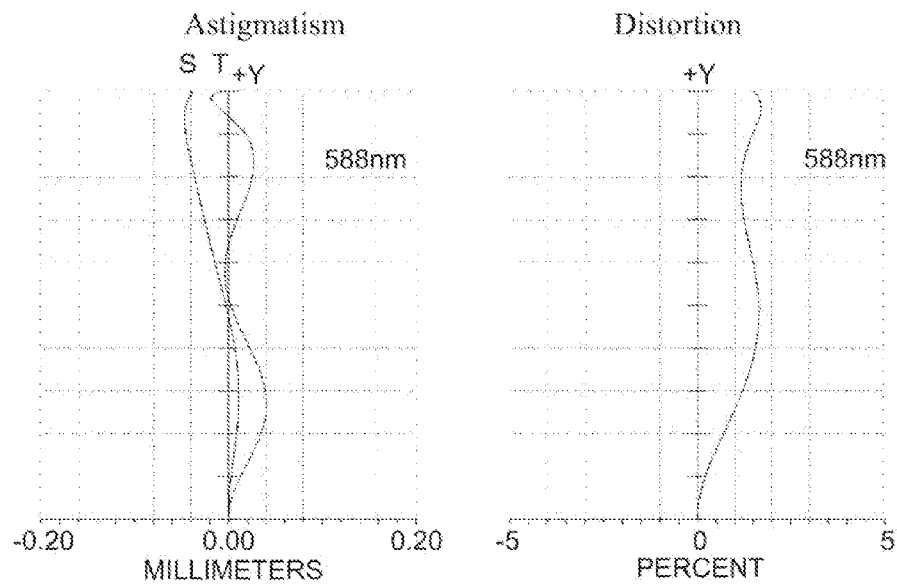
FIG. 65 is an aberration diagram of astigmatism and distortion of the image pickup lens of the sixteenth embodiment.

The image pickup lens in the sixteenth embodiment, as shown in Table 35, satisfies conditions (1)~(9). Spherical aberration of the image pickup lens LA in the sixteenth embodiment is shown in FIG. 63, and the magnification chromatism is shown in FIG. 64. Aberration of astigmatism and distortion of the image pickup lens LA is shown in FIG. 65. According to the figures and table above, the image pickup lens LA in the sixteenth embodiment has the characters: 2ω=76.5°, TTL=3.700 mm, which achieves wide angle and miniaturization. Further, the brightness thereof is lower than 2.6, i.e., Fno=2.4. According to FIGS. 64~65, the image pickup lens in the sixteenth embodiment has very good optical performance.

The Seventeenth Embodiment

Figure 66:
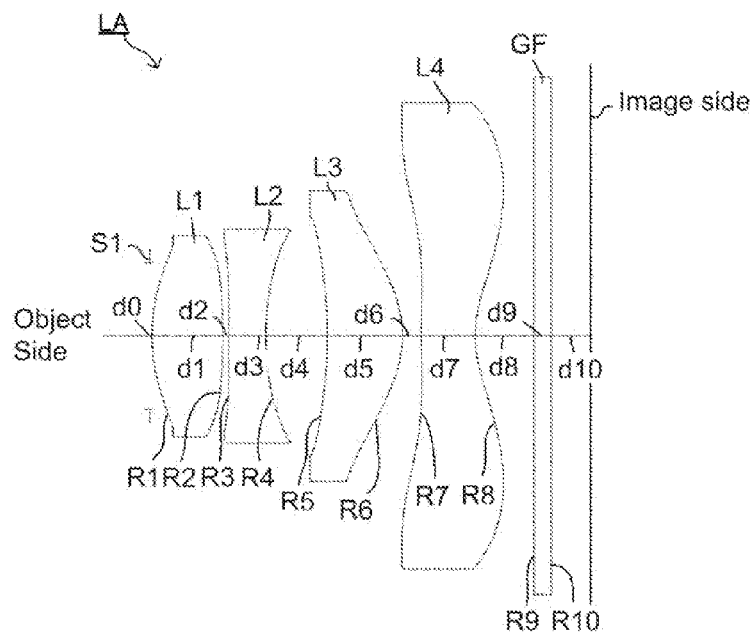
FIG. 66 is an illustration view of an image pickup lens of a seventeenth embodiment.
Figure 67:
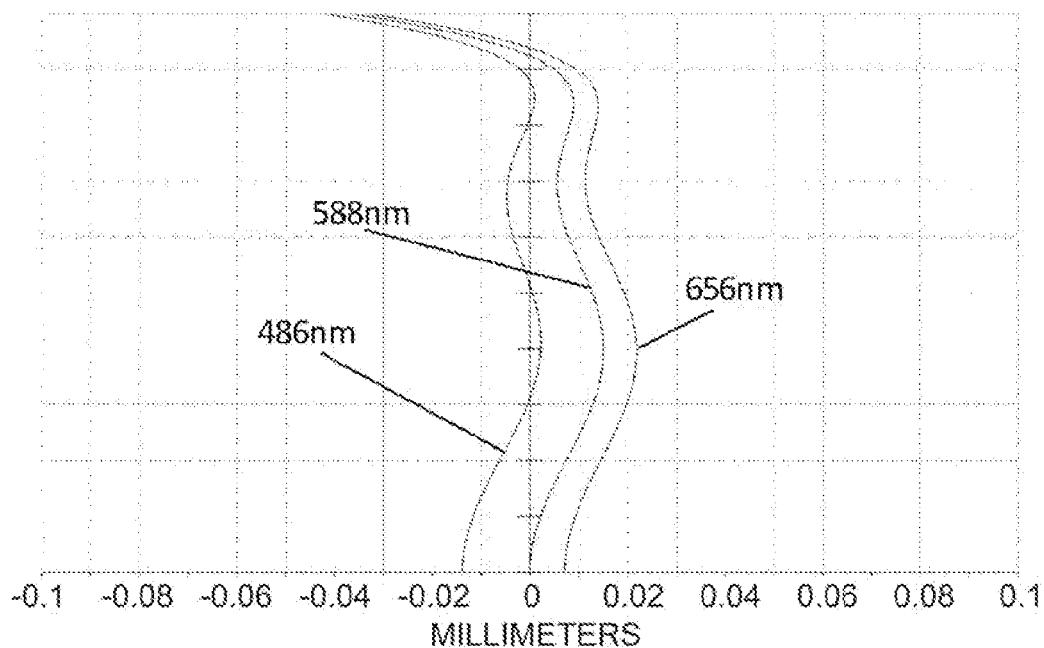
FIG. 67 is a spherical aberration diagram (Axial Chromatic Aberration) of the image pickup lens of the seventeenth embodiment.
Figure 68:
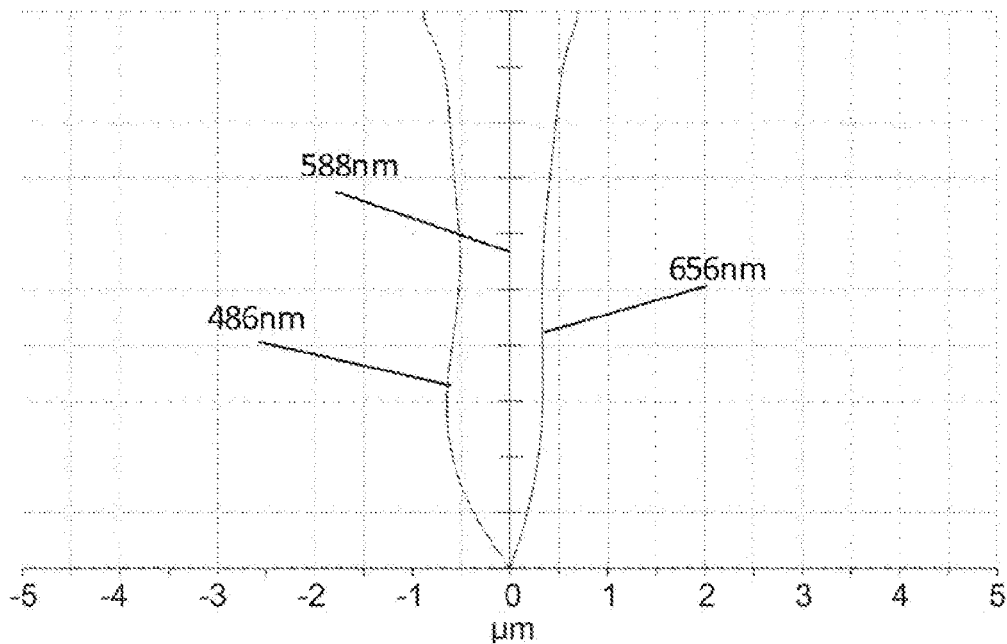
FIG. 68 is a magnification chromatic aberration diagram of the image pickup lens of the seventeenth embodiment.
Figure 69:
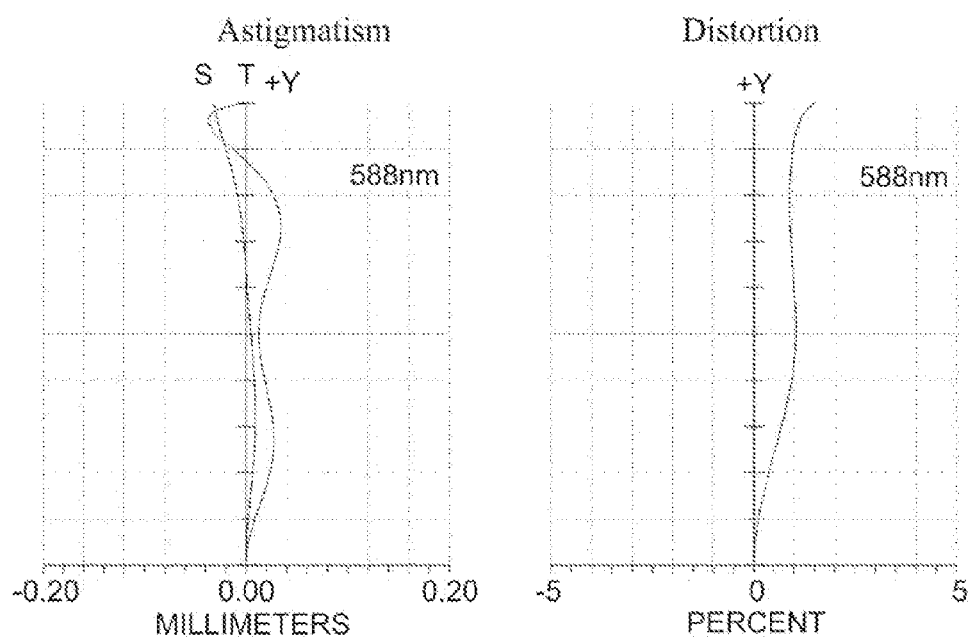
FIG. 69 is an aberration diagram of astigmatism and distortion of the image pickup lens of the seventeenth embodiment.

FIG. 66 is an illustration of the image pickup lens in accordance with a seventeenth embodiment of the present disclosure. Table 33 shows the curvature radiuses R of the object side surfaces and image side surfaces of the lenses L1~L4, center thickness of the lenses or distance d between lenses, index of refraction nd, the abbe coefficients vd. Table 34 shows the conic coefficients and aspherical coefficients.

aberration of the image pickup lens LA in the seventeenth embodiment is shown in FIG. 67, and the magnification chromatism is shown in FIG. 68. Aberration of astigmatism and distortion of the image pickup lens LA is shown in FIG. 69. According to the figures and table above, the image pickup lens LA in the seventeenth embodiment has the characters: 2ω=74.4°, TTL=3.736 mm, which achieves wide angle and miniaturization. Further, the brightness thereof is lower than 2.6, i.e., Fno=2.4. According to FIGS. 67~69, the image pickup lens in the seventeenth embodiment has very good optical performance.

Table 35 shows each parameter of the embodiments and the numerical values in conditions (1)~(9). The units of the numerical values are as follows: f(mm), f1(mm), f2(mm), f3(mm), f4(mm), 2ω(°), TTL(mm), LB(mm), IH(mm). In table 35, E1 represents the first embodiment, E2 represents the second embodiment, and so on.

TABLE 33

|  | R | d |  | nd |  | vd |
|---|---|---|---|---|---|---|
| S1 | ∞ | d0 = 0.020 |  |  |  |  |
| R1 | 1.512 | d1 = 0.598 | n1 | 1.544 | v1 | 56.1 |
| R2 | −7.326 | d2 = 0.050 |  |  |  |  |
| R3 | 30.293 | d3 = 0.317 | n2 | 1.6142 | v2 | 25.6 |
| R4 | 2.448 | d4 = 0.521 |  |  |  |  |
| R5 | −3.477 | d5 = 0.636 | n3 | 1.544 | v3 | 56.1 |
| R6 | −0.843 | d6 = 0.161 |  |  |  |  |
| R7 | 11.040 | d7 = 0.454 | n4 | 1.544 | v4 | 56.1 |
| R8 | 0.876 | d8 = 0.500 |  |  |  |  |
| R9 | ∞ | d9 = 0.145 | n5 | 1.517 | v5 | 64.17 |
| R10 | ∞ | d10 = 0.334 |  |  |  |  |

TABLE 34

|  | k | A4 | A6 | A8 | A10 | A12 | A14 | A16 |
|---|---|---|---|---|---|---|---|---|
| R1 | −1.4146E+00 | 1.0725E−02 | 1.7247E−01 | −7.8884E−01 | 4.4556E−01 | 8.3714E−01 | 8.6449E−01 | −2.8657E+00 |
| R2 | −1.8384E+01 | −8.3801E−02 | −3.0168E−01 | 3.5090E−01 | −1.2732E−01 | −3.3971E−01 | −3.7154E−01 | 1.0125E+00 |
| R3 | 7.6291E+02 | −7.1501E−02 | −1.6992E−01 | 1.4827E−02 | 5.5588E−01 | −6.2662E−01 | −2.2758E−01 | 6.9270E−01 |
| R4 | 4.7559E+00 | 4.6588E−02 | −1.5071E−01 | 1.0084E−01 | 7.2697E−02 | −4.3960E−02 | 5.2941E−02 | −1.3227E−01 |
| R5 | −6.9992E+00 | 3.8092E−02 | −4.7226E−02 | 4.5973E−02 | −7.0119E−02 | 1.1486E−02 | 6.0332E−02 | −5.4867E−02 |
| R6 | −3.9337E+00 | −1.1493E−01 | 1.0182E−01 | −7.8491E−03 | −4.6847E−03 | 1.1987E−03 | 3.2475E−04 | −1.0093E−03 |
| R7 | 1.3410E+01 | −1.6385E−01 | 5.8611E−02 | 6.9189E−03 | −7.6619E−03 | 1.3656E−03 | −2.6611E−05 | −1.0385E−05 |
| R8 | −5.8315E+00 | −1.2122E−01 | 5.2869E−02 | −1.8693E−02 | 3.8745E−03 | −3.7070E−04 | −9.8164E−06 | 3.5414E−06 |

The image pickup lens in the seventeenth embodiment, as shown in Table 35, satisfies conditions (1)~(9). Spherical

TABLE 35

|  | E1 | E2 | E3 | E4 | E5 | E6 | E7 | E8 |
|---|---|---|---|---|---|---|---|---|
| f1/f | 0.745 | 1.020 | 0.845 | 0.862 | 0.772 | 0.981 | 0.831 | 0.999 |
| f2/f | −1.437 | −1.750 | −1.240 | −1.283 | −1.519 | −1.760 | −1.230 | −1.741 |
| R1/R2 | −0.627 | −0.399 | −0.413 | −0.190 | −0.692 | −0.391 | −0.475 | −0.349 |
| R3/R4 | 20.000 | 5.468 | 38.280 | 29.226 | 12.463 | 4.210 | 54.950 | 6.576 |
| d4/f | 0.154 | 0.154 | 0.154 | 0.163 | 0.154 | 0.147 | 0.152 | 0.116 |
| f3/f | 0.567 | 0.564 | 0.545 | 0.549 | 0.566 | 0.567 | 0.582 | 0.568 |
| f4/f | −0.565 | −0.633 | −0.621 | −0.656 | −0.570 | −0.628 | −0.670 | −0.654 |
| R5/R6 | 3.310 | 4.160 | 3.994 | 4.159 | 3.220 | 4.043 | 4.019 | 4.160 |

TABLE 35-continued

|  |  |  |  |  |  |  |  |  |
|---|---|---|---|---|---|---|---|---|
| R7/R8 | 4.661 | 4.194 | 4.207 | 4.074 | 4.603 | 4.351 | 4.049 | 4.131 |
| Fno | 2.4 | 2.4 | 2.4 | 2.4 | 2.4 | 2.4 | 2.4 | 2.4 |
| 2ω | 74.9 | 79.1 | 74.2 | 76.0 | 74.5 | 74.3 | 79.2 | 79.1 |
| f | 2.963 | 2.787 | 2.886 | 2.850 | 2.947 | 2.795 | 2.692 | 2.759 |
| f1 | 2.208 | 2.842 | 2.440 | 2.458 | 2.274 | 2.742 | 2.236 | 2.757 |
| f2 | −4.258 | −4.877 | −3.579 | −3.656 | −4.476 | −4.918 | −3.311 | −4.804 |
| f3 | 1.680 | 1.573 | 1.573 | 1.566 | 1.667 | 1.585 | 1.568 | 1.568 |
| f4 | −1.674 | −1.764 | −1.791 | −1.871 | −1.679 | −1.756 | −1.804 | −1.804 |
| TTL | 3.864 | 3.941 | 3.938 | 3.843 | 3.886 | 3.888 | 3.711 | 3.860 |
| LB | 1.274 | 1.231 | 1.318 | 1.333 | 1.297 | 1.202 | 1.194 | 1.263 |
| IH | 2.26 | 2.26 | 2.26 | 2.26 | 2.26 | 2.26 | 2.26 | 2.26 |

|  | E9 | E10 | E11 | E12 | E13 | E14 | E15 | E16 | E17 |
|---|---|---|---|---|---|---|---|---|---|
| f1/f | 0.816 | 0.837 | 0.811 | 0.742 | 0.848 | 0.762 | 0.847 | 0.847 | 0.805 |
| f2/f | −1.752 | −1.262 | −1.295 | −1.435 | −1.262 | −1.238 | −1.300 | −1.532 | −1.485 |
| R1/R2 | −0.647 | −0.417 | −0.508 | −0.635 | −0.510 | −0.490 | −0.496 | −0.236 | −0.206 |
| R3/R4 | 8.441 | 28.268 | 19.703 | 17.101 | 39.450 | 14.111 | 20.578 | 13.146 | 12.375 |
| d4/f | 0.182 | 0.153 | 0.147 | 0.152 | 0.150 | 0.146 | 0.146 | 0.165 | 0.178 |
| f3/f | 0.620 | 0.531 | 0.690 | 0.551 | 0.694 | 0.650 | 0.685 | 0.690 | 0.643 |
| f4/f | −0.627 | −0.603 | −0.735 | −0.541 | −0.886 | −0.682 | −0.890 | −0.754 | −0.606 |
| R5/R6 | 3.182 | 4.112 | 3.096 | 3.156 | 3.217 | 2.310 | 3.144 | 3.832 | 4.122 |
| R7/R8 | 4.562 | 4.479 | 3.539 | 4.874 | 2.769 | 3.551 | 2.501 | 7.100 | 12.600 |
| Fno | 2.4 | 2.4 | 2.4 | 2.4 | 2.4 | 2.4 | 2.4 | 2.4 | 2.4 |
| 2ω | 79.1 | 75.7 | 79.4 | 73.5 | 79.4 | 74.3 | 78.3 | 76.5 | 74.4 |
| f | 2.698 | 2.868 | 2.723 | 3.021 | 2.686 | 2.949 | 2.774 | 2.823 | 2.932 |
| f1 | 2.201 | 2.400 | 2.207 | 2.243 | 2.277 | 2.246 | 2.349 | 2.392 | 2.360 |
| f2 | −4.726 | −3.619 | −3.527 | −4.334 | −3.389 | −3.650 | −3.605 | −4.326 | −4.355 |
| f3 | 1.674 | 1.522 | 1.879 | 1.665 | 1.863 | 1.918 | 1.900 | 1.947 | 1.886 |
| f4 | −1.691 | −1.728 | −2.001 | −1.635 | −2.381 | −2.010 | −2.469 | −2.129 | −1.777 |
| TTL | 3.671 | 3.933 | 3.648 | 3.908 | 3.728 | 3.877 | 3.794 | 3.700 | 3.736 |
| LB | 1.060 | 1.303 | 1.114 | 1.305 | 1.247 | 1.207 | 1.356 | 1.092 | 0.979 |
| IH | 2.26 | 2.26 | 2.26 | 2.26 | 2.26 | 2.26 | 2.26 | 2.26 | 2.26 |

While the present invention has been described with reference to specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. An image pickup lens comprising, in sequence from an object side to an image side:
   an aperture stop;
   a first lens having two convex surfaces and having a positive refractive power;
   a second lens in a meniscus shape whose convex surface faces to the object side having a negative refractive power;
   a third lens in a meniscus shape with the convex surface facing to the image side having a positive refractive power;
   a fourth lens in a meniscus shape with the convex surface facing to the object side having a negative refractive power; wherein
   the following conditions (1)~(5) are satisfied:

$$0.80 \leq f1/f \leq 1.05 \quad (1)$$

$$-1.80 \leq f2/f \leq -1.20 \quad (2)$$

$$-0.70 \leq R1/R2 \leq -0.17 \quad (3)$$

$$4.00 \leq R3/R4 \leq 70.00 \quad (4)$$

$$0.10 \leq d4/f \leq 0.20 \quad (5) \text{ where}$$

f is the focal length of the entire lens;
   f1 is the focal length of the first lens;
   f2 is the focal length of the second lens;
   R1 is the curvature radius of the object side surface of the first lens;
   R2 is the curvature radius of the image side surface of the first lens;
   R3 is the curvature radius of the object side surface of the second lens;
   R4 is the curvature radius of the image side surface of the second lens;
   d4 is the distance along the optical axis between the image side of the second lens and the object side of the third lens.

2. The image pickup lens as described in claim 1 further satisfying the following condition (6):

$$0.50 \leq f3/f \leq 0.70 \quad (6) \text{ where}$$

f is the focal length of the entire lens;
   f3 is the focal length of the third lens.

3. The image pickup lens as described in claim 1 further satisfying the following condition (7):

$$-0.90 \leq f4/f \leq 0.50 \quad (7) \text{ where}$$

f is the focal length of the entire lens;
   f4 is the focal length of the fourth lens.

4. The image pickup lens as described in claim 1 further satisfying the following condition (8):

$$2.00 \leq R5/R6 \leq 4.20 \quad (8) \text{ where}$$

R5 is the curvature radius of the object side surface of the third lens;
   R6 is the curvature radius of the image side surface of the third lens.

5. The image pickup lens as described in claim 1 further satisfying the following condition (9):

$$2.00 \leq R7/R8 \leq 13.00 \quad (9) \text{ where}$$

R7 is the curvature radius of the object side surface of the fourth lens;
   R8 is the curvature radius of the image side surface of the fourth lens.

* * * * *